United States Patent
Robinson et al.

(10) Patent No.: US 11,061,181 B2
(45) Date of Patent: Jul. 13, 2021

(54) WIDE ANGLE IMAGING DIRECTIONAL BACKLIGHTS

(71) Applicant: RealD Spark, LLC, Beverly Hills, CA (US)

(72) Inventors: Michael G. Robinson, Boulder, CO (US); Graham J. Woodgate, Henley-on-Thames (GB)

(73) Assignee: RealD Spark, LLC, Beverly Hills, CA (US)

( * ) Notice: Subject to any disclaimer, the term of this patent is extended or adjusted under 35 U.S.C. 154(b) by 0 days.

(21) Appl. No.: 16/596,935

(22) Filed: Oct. 9, 2019

(65) Prior Publication Data

US 2020/0096694 A1    Mar. 26, 2020

Related U.S. Application Data

(63) Continuation of application No. 15/098,084, filed on Apr. 13, 2016, now Pat. No. 10,459,152.

(Continued)

(51) Int. Cl.
 *F21V 8/00* (2006.01)
 *G02B 5/09* (2006.01)
 *B29D 11/00* (2006.01)

(52) U.S. Cl.
 CPC .............. *G02B 6/0055* (2013.01); *G02B 5/09* (2013.01); *G02B 6/009* (2013.01); *G02B 6/0038* (2013.01);
(Continued)

(58) Field of Classification Search
 CPC ...... G02B 6/0038; G02B 6/002; G02B 6/003; G02B 6/005
(Continued)

(56) References Cited

U.S. PATENT DOCUMENTS

| 1,128,979 A | 2/1915 | Hess |
| 1,970,311 A | 8/1934 | Ives |

(Continued)

FOREIGN PATENT DOCUMENTS

| CN | 1142869 A | 2/1997 |
| CN | 1377453 A | 10/2002 |

(Continued)

OTHER PUBLICATIONS

3M™ ePrivacy Filter software professional version; http://mw.cdw.com/shop/products/3M-ePrivacy-Filter-software-professional-version/3239412.aspx?cm_mmc=ShoppingFeeds-_-ChannelIntelligence-_-Software-_-3239412_3MT%20ePrivacy%20Filter%20software%20professional%20version_3MF-EPFPRO&cpncode=37-7582919&srccode=cii_10191459#PO; Copyright 2007-2016.

(Continued)

*Primary Examiner* — William J Carter
(74) *Attorney, Agent, or Firm* — Penny L. Lowry

(57) ABSTRACT

An imaging directional backlight apparatus including a waveguide, a light source array, for providing large area directed illumination from localized light sources. The waveguide may include a stepped structure, in which the steps may further include extraction features optically hidden to guided light, propagating in a first forward direction. Returning light propagating in a second backward direction may be refracted, diffracted, or reflected by the features to provide discrete illumination beams exiting from the top surface of the waveguide. In operation, luminance streaks and bright illumination regions may be formed due to undesirable imaging characteristics from the structure of the Fresnel mirror. Fresnel mirror draft facets and reflective facet microstructures are provided that achieve reduction of visibility of light streaks and bright illumination regions.

15 Claims, 42 Drawing Sheets

Related U.S. Application Data

(60) Provisional application No. 62/146,648, filed on Apr. 13, 2015, provisional application No. 62/154,932, filed on Apr. 30, 2015, provisional application No. 62/167,185, filed on May 27, 2015, provisional application No. 62/167,203, filed on May 27, 2015, provisional application No. 62/255,248, filed on Nov. 13, 2015.

(52) U.S. Cl.
 CPC ...... *G02B 6/0048* (2013.01); *B29D 11/00269* (2013.01); *B29D 11/00596* (2013.01); *G02B 6/0031* (2013.01); *G02B 6/0043* (2013.01); *G02B 6/0061* (2013.01); *G02B 6/0065* (2013.01); *G02B 6/0068* (2013.01)

(58) Field of Classification Search
 USPC .................................. 362/623, 626, 628
 See application file for complete search history.

(56) References Cited

U.S. PATENT DOCUMENTS

| | | | |
|---|---|---|---|
| 2,133,121 A | 10/1938 | Stearns | |
| 2,247,969 A | 7/1941 | Lemuel | |
| 2,480,178 A | 8/1949 | Zinberg | |
| 2,810,905 A | 10/1957 | Barlow | |
| 3,409,351 A | 11/1968 | Winnek | |
| 3,715,154 A | 2/1973 | Bestenreiner | |
| 4,057,323 A | 11/1977 | Ward | |
| 4,528,617 A | 7/1985 | Blackington | |
| 4,542,958 A | 9/1985 | Young | |
| 4,804,253 A | 2/1989 | Stewart | |
| 4,807,978 A | 2/1989 | Grinberg et al. | |
| 4,829,365 A | 5/1989 | Eichenlaub | |
| 4,914,553 A | 4/1990 | Hamada et al. | |
| 5,050,946 A | 9/1991 | Hathaway et al. | |
| 5,278,608 A | 1/1994 | Taylor et al. | |
| 5,347,644 A | 9/1994 | Sedlmayr | |
| 5,349,419 A | 9/1994 | Taguchi et al. | |
| 5,459,592 A | 10/1995 | Shibatani et al. | |
| 5,466,926 A | 11/1995 | Sasano et al. | |
| 5,510,831 A | 4/1996 | Mayhew | |
| 5,528,720 A | 6/1996 | Winston et al. | |
| 5,581,402 A | 12/1996 | Taylor | |
| 5,588,526 A | 12/1996 | Fantone et al. | |
| 5,676,453 A | 10/1997 | Parkyn et al. | |
| 5,697,006 A | 12/1997 | Taguchi et al. | |
| 5,703,667 A | 12/1997 | Ochiai | |
| 5,727,107 A | 3/1998 | Umemoto et al. | |
| 5,771,066 A | 6/1998 | Barnea | |
| 5,796,451 A | 8/1998 | Kim | |
| 5,808,792 A | 9/1998 | Woodgate et al. | |
| 5,850,580 A | 12/1998 | Taguchi et al. | |
| 5,875,055 A | 2/1999 | Morishima et al. | |
| 5,896,225 A | 4/1999 | Chikazawa | |
| 5,903,388 A | 5/1999 | Sedlmayr | |
| 5,933,276 A | 8/1999 | Magee | |
| 5,956,001 A | 9/1999 | Sumida et al. | |
| 5,959,664 A | 9/1999 | Woodgate | |
| 5,959,702 A | 9/1999 | Goodman | |
| 5,969,850 A | 10/1999 | Harrold et al. | |
| 5,971,559 A | 10/1999 | Ishikawa et al. | |
| 6,008,484 A | 12/1999 | Woodgate et al. | |
| 6,014,164 A | 1/2000 | Woodgate et al. | |
| 6,023,315 A | 2/2000 | Harrold et al. | |
| 6,044,196 A | 3/2000 | Winston et al. | |
| 6,055,013 A | 4/2000 | Woodgate et al. | |
| 6,061,179 A | 5/2000 | Inoguchi et al. | |
| 6,061,489 A | 5/2000 | Ezra et al. | |
| 6,064,424 A | 5/2000 | Berkel et al. | |
| 6,075,557 A | 6/2000 | Holliman et al. | |
| 6,094,216 A | 7/2000 | Taniguchi et al. | |
| 6,108,059 A | 8/2000 | Yang | |
| 6,118,584 A | 9/2000 | Berkel et al. | |
| 6,128,054 A | 10/2000 | Schwarzenberger | |
| 6,144,118 A | 11/2000 | Cahill et al. | |
| 6,172,723 B1 | 1/2001 | Inoue et al. | |
| 6,199,995 B1 | 3/2001 | Umemoto et al. | |
| 6,219,113 B1 | 4/2001 | Takahara | |
| 6,224,214 B1 | 5/2001 | Martin et al. | |
| 6,232,592 B1 | 5/2001 | Sugiyama | |
| 6,256,447 B1 | 7/2001 | Laine | |
| 6,262,786 B1 | 7/2001 | Perlo et al. | |
| 6,295,109 B1 | 9/2001 | Kubo et al. | |
| 6,302,541 B1 | 10/2001 | Grossmann | |
| 6,305,813 B1 | 10/2001 | Lekson et al. | |
| 6,335,999 B1 | 1/2002 | Winston et al. | |
| 6,373,637 B1 | 4/2002 | Gulick et al. | |
| 6,377,295 B1 | 4/2002 | Woodgate et al. | |
| 6,422,713 B1 | 7/2002 | Fohl et al. | |
| 6,456,340 B1 | 9/2002 | Margulis | |
| 6,464,365 B1 | 10/2002 | Gunn et al. | |
| 6,476,850 B1 | 11/2002 | Erbey | |
| 6,481,849 B2 | 11/2002 | Martin et al. | |
| 6,654,156 B1 | 11/2003 | Crossland et al. | |
| 6,663,254 B2 | 12/2003 | Ohsumi | |
| 6,724,452 B1 | 4/2004 | Takeda et al. | |
| 6,731,355 B2 | 5/2004 | Miyashita | |
| 6,736,512 B2 | 5/2004 | Balogh | |
| 6,798,406 B1 | 9/2004 | Jones et al. | |
| 6,801,243 B1 | 10/2004 | Berkel | |
| 6,816,158 B1 | 11/2004 | Lemelson et al. | |
| 6,825,985 B2 | 11/2004 | Brown et al. | |
| 6,847,354 B2 | 1/2005 | Vranish | |
| 6,847,488 B2 | 1/2005 | Travis | |
| 6,859,240 B1 | 2/2005 | Brown et al. | |
| 6,867,828 B2 | 3/2005 | Taira et al. | |
| 6,870,671 B2 | 3/2005 | Travis | |
| 6,883,919 B2 | 4/2005 | Travis | |
| 7,001,058 B2 | 2/2006 | Inditsky | |
| 7,052,168 B2 | 5/2006 | Epstein et al. | |
| 7,058,252 B2 | 6/2006 | Woodgate et al. | |
| 7,073,933 B2 | 7/2006 | Gotoh et al. | |
| 7,091,931 B2 | 8/2006 | Yoon | |
| 7,101,048 B2 | 9/2006 | Travis | |
| 7,136,031 B2 | 11/2006 | Lee et al. | |
| 7,215,391 B2 | 5/2007 | Kuan et al. | |
| 7,215,415 B2 | 5/2007 | Maehara et al. | |
| 7,215,475 B2 | 5/2007 | Woodgate et al. | |
| 7,227,567 B1 | 6/2007 | Beck et al. | |
| 7,239,293 B2 | 7/2007 | Perlin et al. | |
| 7,365,908 B2 | 4/2008 | Dolgoff | |
| 7,375,886 B2 | 5/2008 | Lipton et al. | |
| 7,410,286 B2 | 8/2008 | Travis | |
| 7,430,358 B2 | 9/2008 | Qi et al. | |
| 7,492,346 B2 | 2/2009 | Manabe et al. | |
| 7,528,893 B2 | 5/2009 | Schultz et al. | |
| 7,545,429 B2 | 6/2009 | Travis | |
| 7,587,117 B2 | 9/2009 | Winston et al. | |
| 7,614,777 B2 | 11/2009 | Koganezawa et al. | |
| 7,660,047 B1 | 2/2010 | Travis et al. | |
| 7,750,981 B2 | 7/2010 | Shestak et al. | |
| 7,750,982 B2 | 7/2010 | Nelson et al. | |
| 7,771,102 B2 | 8/2010 | Iwasaki | |
| 7,798,698 B2 | 9/2010 | Segawa | |
| 7,798,699 B2 | 9/2010 | Laitinen et al. | |
| 7,944,428 B2 | 5/2011 | Travis | |
| 7,970,246 B2 | 6/2011 | Travis et al. | |
| 7,976,208 B2 | 7/2011 | Travis | |
| 8,016,475 B2 | 9/2011 | Travis | |
| 8,179,361 B2 | 5/2012 | Sugimoto et al. | |
| 8,216,405 B2 | 7/2012 | Emerton et al. | |
| 8,223,296 B2 | 7/2012 | Lee et al. | |
| 8,251,562 B2 | 8/2012 | Kuramitsu et al. | |
| 8,325,295 B2 | 12/2012 | Sugita et al. | |
| 8,354,806 B2 | 1/2013 | Travis et al. | |
| 8,477,261 B2 | 7/2013 | Travis et al. | |
| 8,502,253 B2 | 8/2013 | Min | |
| 8,534,901 B2 | 9/2013 | Panagotacos et al. | |
| 8,556,491 B2 | 10/2013 | Lee | |
| 8,651,725 B2 | 2/2014 | Ie et al. | |

(56) References Cited

U.S. PATENT DOCUMENTS

| | | | |
|---|---|---|---|
| 8,654,443 B2 * | 2/2014 | Ito | G02B 27/2235 359/462 |
| 8,684,588 B2 | 4/2014 | Ajichi et al. | |
| 8,714,804 B2 | 5/2014 | Kim et al. | |
| 8,752,995 B2 | 6/2014 | Park | |
| 8,760,762 B1 | 6/2014 | Kelly et al. | |
| 8,926,112 B2 | 1/2015 | Uchiike et al. | |
| 8,942,434 B1 | 1/2015 | Karakotsios et al. | |
| 9,188,731 B2 | 11/2015 | Woodgate et al. | |
| 9,197,884 B2 | 11/2015 | Lee et al. | |
| 9,350,980 B2 | 5/2016 | Robinson et al. | |
| 9,519,153 B2 | 12/2016 | Robinson et al. | |
| 2001/0001566 A1 | 5/2001 | Moseley et al. | |
| 2001/0050686 A1 | 12/2001 | Allen | |
| 2002/0018299 A1 | 2/2002 | Daniell | |
| 2002/0113246 A1 | 8/2002 | Nagai et al. | |
| 2002/0113866 A1 | 8/2002 | Taniguchi et al. | |
| 2003/0046839 A1 | 3/2003 | Oda et al. | |
| 2003/0117790 A1 | 6/2003 | Lee et al. | |
| 2003/0133191 A1 | 7/2003 | Morita et al. | |
| 2003/0137738 A1 | 7/2003 | Ozawa et al. | |
| 2003/0137821 A1 | 7/2003 | Gotoh et al. | |
| 2004/0008877 A1 | 1/2004 | Leppard et al. | |
| 2004/0015729 A1 | 1/2004 | Elms et al. | |
| 2004/0021809 A1 | 2/2004 | Sumiyoshi et al. | |
| 2004/0042233 A1 | 3/2004 | Suzuki et al. | |
| 2004/0046709 A1 | 3/2004 | Yoshino | |
| 2004/0105264 A1 | 6/2004 | Spero | |
| 2004/0108971 A1 | 6/2004 | Waldern et al. | |
| 2004/0109303 A1 | 6/2004 | Olczak | |
| 2004/0135741 A1 | 7/2004 | Tomisawa et al. | |
| 2004/0170011 A1 | 9/2004 | Kim et al. | |
| 2004/0263968 A1 | 12/2004 | Kobayashi et al. | |
| 2004/0263969 A1 | 12/2004 | Lipton et al. | |
| 2005/0007753 A1 | 1/2005 | Hees et al. | |
| 2005/0094295 A1 | 5/2005 | Yamashita et al. | |
| 2005/0110980 A1 | 5/2005 | Maehara et al. | |
| 2005/0135116 A1 | 6/2005 | Epstein et al. | |
| 2005/0174768 A1 | 8/2005 | Conner | |
| 2005/0180167 A1 | 8/2005 | Hoelen et al. | |
| 2005/0190180 A1 | 9/2005 | Jin et al. | |
| 2005/0190345 A1 | 9/2005 | Dubin et al. | |
| 2005/0237488 A1 | 10/2005 | Yamasaki et al. | |
| 2005/0254127 A1 | 11/2005 | Evans et al. | |
| 2005/0264717 A1 | 12/2005 | Chien et al. | |
| 2005/0274956 A1 | 12/2005 | Bhat | |
| 2005/0276071 A1 | 12/2005 | Sasagawa et al. | |
| 2005/0280637 A1 | 12/2005 | Ikeda et al. | |
| 2006/0002678 A1 | 1/2006 | Weber et al. | |
| 2006/0012845 A1 | 1/2006 | Edwards | |
| 2006/0056166 A1 | 3/2006 | Yeo et al. | |
| 2006/0114664 A1 | 6/2006 | Sakata et al. | |
| 2006/0132423 A1 | 6/2006 | Travis | |
| 2006/0139447 A1 | 6/2006 | Unkrich | |
| 2006/0158729 A1 | 7/2006 | Vissenberg et al. | |
| 2006/0176912 A1 | 8/2006 | Anikitchev | |
| 2006/0203200 A1 | 9/2006 | Koide | |
| 2006/0215129 A1 | 9/2006 | Alasaarela et al. | |
| 2006/0221642 A1 | 10/2006 | Daiku | |
| 2006/0227427 A1 | 10/2006 | Dolgoff | |
| 2006/0244918 A1 | 11/2006 | Cossairt et al. | |
| 2006/0250580 A1 | 11/2006 | Silverstein et al. | |
| 2006/0262376 A1 | 11/2006 | Mather et al. | |
| 2006/0269213 A1 | 11/2006 | Hwang et al. | |
| 2006/0284974 A1 | 12/2006 | Lipton et al. | |
| 2006/0291053 A1 | 12/2006 | Robinson et al. | |
| 2006/0291243 A1 | 12/2006 | Niioka et al. | |
| 2007/0008406 A1 | 1/2007 | Shestak et al. | |
| 2007/0013624 A1 | 1/2007 | Bourhill | |
| 2007/0025680 A1 | 2/2007 | Winston et al. | |
| 2007/0035706 A1 | 2/2007 | Margulis | |
| 2007/0035829 A1 | 2/2007 | Woodgate et al. | |
| 2007/0035964 A1 | 2/2007 | Olczak | |
| 2007/0081110 A1 | 4/2007 | Lee | |
| 2007/0085105 A1 | 4/2007 | Beeson et al. | |
| 2007/0109400 A1 | 5/2007 | Woodgate et al. | |
| 2007/0109401 A1 | 5/2007 | Lipton et al. | |
| 2007/0115551 A1 | 5/2007 | Spilman et al. | |
| 2007/0115552 A1 | 5/2007 | Robinson et al. | |
| 2007/0153160 A1 | 7/2007 | Lee et al. | |
| 2007/0183466 A1 | 8/2007 | Son et al. | |
| 2007/0188667 A1 | 8/2007 | Schwerdtner | |
| 2007/0189701 A1 | 8/2007 | Chakmakjian et al. | |
| 2007/0223252 A1 | 9/2007 | Lee et al. | |
| 2007/0279554 A1 | 12/2007 | Kowarz et al. | |
| 2007/0279727 A1 | 12/2007 | Gandhi et al. | |
| 2008/0079662 A1 | 4/2008 | Saishu et al. | |
| 2008/0084519 A1 | 4/2008 | Brigham et al. | |
| 2008/0086289 A1 | 4/2008 | Brott | |
| 2008/0128728 A1 | 6/2008 | Nemchuk et al. | |
| 2008/0225205 A1 | 9/2008 | Travis | |
| 2008/0259012 A1 | 10/2008 | Fergason | |
| 2008/0259643 A1 | 10/2008 | Ijzerman et al. | |
| 2008/0291359 A1 | 11/2008 | Miyashita | |
| 2008/0297431 A1 | 12/2008 | Yuuki et al. | |
| 2008/0297459 A1 | 12/2008 | Sugimoto et al. | |
| 2008/0304282 A1 | 12/2008 | Mi et al. | |
| 2008/0316768 A1 | 12/2008 | Travis | |
| 2009/0014700 A1 | 1/2009 | Metcalf et al. | |
| 2009/0016057 A1 | 1/2009 | Rinko | |
| 2009/0040426 A1 | 2/2009 | Mather et al. | |
| 2009/0067156 A1 | 3/2009 | Bonnett et al. | |
| 2009/0109705 A1 | 4/2009 | Pakhchyan et al. | |
| 2009/0128735 A1 | 5/2009 | Larson et al. | |
| 2009/0135623 A1 | 5/2009 | Kunimochi | |
| 2009/0140656 A1 | 6/2009 | Kohashikawa et al. | |
| 2009/0160757 A1 | 6/2009 | Robinson | |
| 2009/0167651 A1 | 7/2009 | Benitez et al. | |
| 2009/0168459 A1 | 7/2009 | Holman et al. | |
| 2009/0174700 A1 | 7/2009 | Daiku | |
| 2009/0174840 A1 | 7/2009 | Lee et al. | |
| 2009/0190072 A1 | 7/2009 | Nagata et al. | |
| 2009/0190079 A1 | 7/2009 | Saitoh | |
| 2009/0207629 A1 | 8/2009 | Fujiyama et al. | |
| 2009/0225380 A1 | 9/2009 | Schwerdtner et al. | |
| 2009/0278936 A1 | 11/2009 | Pastoor et al. | |
| 2009/0290203 A1 | 11/2009 | Schwerdtner | |
| 2009/0315915 A1 | 12/2009 | Dunn et al. | |
| 2010/0034987 A1 | 2/2010 | Fujii et al. | |
| 2010/0040280 A1 | 2/2010 | McKnight | |
| 2010/0053771 A1 | 3/2010 | Travis et al. | |
| 2010/0053938 A1 | 3/2010 | Kim et al. | |
| 2010/0091093 A1 | 4/2010 | Robinson | |
| 2010/0091254 A1 | 4/2010 | Travis et al. | |
| 2010/0165598 A1 | 7/2010 | Chen et al. | |
| 2010/0177387 A1 | 7/2010 | Travis et al. | |
| 2010/0182542 A1 | 7/2010 | Nakamoto et al. | |
| 2010/0188438 A1 | 7/2010 | Kang | |
| 2010/0188602 A1 | 7/2010 | Feng | |
| 2010/0214135 A1 | 8/2010 | Bathiche et al. | |
| 2010/0220260 A1 | 9/2010 | Sugita et al. | |
| 2010/0231498 A1 | 9/2010 | Large et al. | |
| 2010/0271838 A1 | 10/2010 | Yamaguchi | |
| 2010/0277575 A1 | 11/2010 | Ismael et al. | |
| 2010/0278480 A1 | 11/2010 | Vasylyev | |
| 2010/0289870 A1 | 11/2010 | Leister | |
| 2010/0295920 A1 | 11/2010 | McGowan | |
| 2010/0295930 A1 | 11/2010 | Ezhov | |
| 2010/0300608 A1 | 12/2010 | Emerton et al. | |
| 2010/0302135 A1 | 12/2010 | Larson et al. | |
| 2010/0309296 A1 | 12/2010 | Harrold et al. | |
| 2010/0321953 A1 | 12/2010 | Coleman et al. | |
| 2010/0328438 A1 | 12/2010 | Ohyama et al. | |
| 2011/0013417 A1 | 1/2011 | Saccomanno et al. | |
| 2011/0019112 A1 | 1/2011 | Dolgoff | |
| 2011/0032483 A1 | 2/2011 | Hruska et al. | |
| 2011/0032724 A1 | 2/2011 | Kinoshita | |
| 2011/0043142 A1 | 2/2011 | Travis et al. | |
| 2011/0043501 A1 | 2/2011 | Daniel | |
| 2011/0044056 A1 | 2/2011 | Travis et al. | |
| 2011/0044579 A1 | 2/2011 | Travis et al. | |
| 2011/0051237 A1 | 3/2011 | Hasegawa et al. | |
| 2011/0187293 A1 | 8/2011 | Travis | |
| 2011/0187635 A1 | 8/2011 | Lee et al. | |

(56) References Cited

U.S. PATENT DOCUMENTS

| | | |
|---|---|---|
| 2011/0188120 A1 | 8/2011 | Tabirian et al. |
| 2011/0199459 A1 | 8/2011 | Barenbrug et al. |
| 2011/0211142 A1 | 9/2011 | Kashiwagi et al. |
| 2011/0216266 A1 | 9/2011 | Travis |
| 2011/0216535 A1* | 9/2011 | McEntee .............. G02B 5/09 362/235 |
| 2011/0221998 A1 | 9/2011 | Adachi et al. |
| 2011/0228183 A1 | 9/2011 | Hamagishi |
| 2011/0228562 A1 | 9/2011 | Travis et al. |
| 2011/0235359 A1 | 9/2011 | Liu et al. |
| 2011/0242150 A1 | 10/2011 | Song et al. |
| 2011/0242277 A1 | 10/2011 | Do et al. |
| 2011/0242298 A1 | 10/2011 | Bathiche et al. |
| 2011/0255303 A1 | 10/2011 | Nichol et al. |
| 2011/0267563 A1 | 11/2011 | Shimizu |
| 2011/0285927 A1 | 11/2011 | Schultz et al. |
| 2011/0292321 A1 | 12/2011 | Travis et al. |
| 2011/0310232 A1 | 12/2011 | Wilson et al. |
| 2012/0002136 A1 | 1/2012 | Nagata et al. |
| 2012/0002295 A1 | 1/2012 | Dobschal et al. |
| 2012/0008067 A1 | 1/2012 | Mun et al. |
| 2012/0013720 A1 | 1/2012 | Kadowaki et al. |
| 2012/0056971 A1 | 3/2012 | Kumar et al. |
| 2012/0062991 A1 | 3/2012 | Mich et al. |
| 2012/0063166 A1 | 3/2012 | Panagotacos et al. |
| 2012/0075285 A1 | 3/2012 | Oyagi et al. |
| 2012/0081920 A1 | 4/2012 | Ie et al. |
| 2012/0086776 A1 | 4/2012 | Lo |
| 2012/0092435 A1 | 4/2012 | Wohlert |
| 2012/0106193 A1 | 5/2012 | Kim et al. |
| 2012/0127573 A1 | 5/2012 | Robinson et al. |
| 2012/0154450 A1 | 6/2012 | Aho et al. |
| 2012/0162966 A1 | 6/2012 | Kim et al. |
| 2012/0169838 A1 | 7/2012 | Sekine |
| 2012/0206050 A1 | 8/2012 | Spero |
| 2012/0236484 A1 | 9/2012 | Miyake |
| 2012/0243204 A1 | 9/2012 | Robinson |
| 2012/0243261 A1 | 9/2012 | Yamamoto et al. |
| 2012/0293721 A1 | 11/2012 | Ueyama |
| 2012/0299913 A1 | 11/2012 | Robinson et al. |
| 2012/0314145 A1 | 12/2012 | Robinson |
| 2012/0327172 A1 | 12/2012 | El-Saban et al. |
| 2013/0093172 A1 | 4/2013 | Fuhse et al. |
| 2013/0101253 A1 | 4/2013 | Popovich et al. |
| 2013/0107340 A1 | 5/2013 | Wong et al. |
| 2013/0127861 A1 | 5/2013 | Gollier |
| 2013/0135588 A1 | 5/2013 | Popovich et al. |
| 2013/0156265 A1 | 6/2013 | Hennessy |
| 2013/0169701 A1 | 7/2013 | Whitehead et al. |
| 2013/0230136 A1 | 9/2013 | Sakaguchi et al. |
| 2013/0235561 A1 | 9/2013 | Etienne et al. |
| 2013/0294684 A1 | 11/2013 | Lipton et al. |
| 2013/0307831 A1 | 11/2013 | Robinson et al. |
| 2013/0307946 A1 | 11/2013 | Robinson et al. |
| 2013/0308339 A1 | 11/2013 | Woodgate et al. |
| 2013/0321599 A1 | 12/2013 | Harrold et al. |
| 2013/0328866 A1 | 12/2013 | Woodgate et al. |
| 2013/0335821 A1 | 12/2013 | Robinson et al. |
| 2014/0009508 A1 | 1/2014 | Woodgate et al. |
| 2014/0016354 A1 | 1/2014 | Lee et al. |
| 2014/0022619 A1 | 1/2014 | Woodgate et al. |
| 2014/0036361 A1 | 2/2014 | Woodgate et al. |
| 2014/0041205 A1* | 2/2014 | Robinson .............. G02B 6/0025 29/592.1 |
| 2014/0043323 A1 | 2/2014 | Sumi |
| 2014/0098558 A1 | 4/2014 | Vasylyev |
| 2014/0126238 A1 | 5/2014 | Kao et al. |
| 2014/0240344 A1 | 8/2014 | Tomono et al. |
| 2014/0240828 A1 | 8/2014 | Robinson et al. |
| 2014/0289835 A1 | 9/2014 | Varshavsky et al. |
| 2014/0340728 A1 | 11/2014 | Taheri |
| 2014/0368602 A1 | 12/2014 | Woodgate et al. |
| 2015/0116212 A1 | 4/2015 | Freed et al. |
| 2015/0268479 A1 | 9/2015 | Woodgate et al. |
| 2015/0334365 A1 | 11/2015 | Tsubaki et al. |
| 2015/0339512 A1 | 11/2015 | Son et al. |

FOREIGN PATENT DOCUMENTS

| | | |
|---|---|---|
| CN | 1454329 A | 11/2003 |
| CN | 1466005 A | 1/2004 |
| CN | 1487332 A | 4/2004 |
| CN | 1588196 A | 3/2005 |
| CN | 1678943 A | 10/2005 |
| CN | 1696788 A | 11/2005 |
| CN | 1769971 A | 5/2006 |
| CN | 1823292 A | 8/2006 |
| CN | 1826553 A | 8/2006 |
| CN | 1866112 A | 11/2006 |
| CN | 1900785 A | 1/2007 |
| CN | 1908753 A | 2/2007 |
| CN | 1910399 A | 2/2007 |
| CN | 2872404 | 2/2007 |
| CN | 1307481 | 3/2007 |
| CN | 101029975 A | 9/2007 |
| CN | 101049028 A | 10/2007 |
| CN | 200983052 | 11/2007 |
| CN | 101114080 A | 1/2008 |
| CN | 101142823 A | 3/2008 |
| CN | 101266338 A | 9/2008 |
| CN | 100449353 | 1/2009 |
| CN | 101364004 A | 2/2009 |
| CN | 101598863 B | 12/2009 |
| CN | 100591141 | 2/2010 |
| CN | 101660689 A | 3/2010 |
| CN | 102147079 A | 8/2011 |
| CN | 202486493 U | 10/2012 |
| EP | 0653891 A1 | 5/1995 |
| EP | 0721131 A2 | 7/1996 |
| EP | 0830984 A2 | 3/1998 |
| EP | 0833183 A1 | 4/1998 |
| EP | 0860729 A2 | 8/1998 |
| EP | 0939273 A1 | 9/1999 |
| EP | 0656555 B1 | 3/2003 |
| EP | 1736702 A1 | 12/2006 |
| EP | 2003394 A2 | 12/2008 |
| EP | 1394593 B1 | 6/2010 |
| EP | 2219067 A1 | 8/2010 |
| EP | 2451180 A2 | 5/2012 |
| EP | 1634119 B1 | 8/2012 |
| GB | 2405542 | 2/2005 |
| JP | H07270792 | 10/1995 |
| JP | H08211334 | 8/1996 |
| JP | H08237691 A | 9/1996 |
| JP | H08254617 | 10/1996 |
| JP | H08070475 | 12/1996 |
| JP | H08340556 | 12/1996 |
| JP | H1042315 A | 2/1998 |
| JP | H10142556 A | 5/1998 |
| JP | H11242908 A | 9/1999 |
| JP | 2000048618 A | 2/2000 |
| JP | 2000069504 A | 3/2000 |
| JP | 2000131683 A | 5/2000 |
| JP | 2000200049 A | 7/2000 |
| JP | 2001093321 A | 4/2001 |
| JP | 2002049004 A | 2/2002 |
| JP | 2003215349 A | 7/2003 |
| JP | 2003215705 A | 7/2003 |
| JP | 2004112814 A | 4/2004 |
| JP | 2004265813 A | 9/2004 |
| JP | 2004319364 A | 11/2004 |
| JP | 2005135844 A | 5/2005 |
| JP | 2005181914 A | 7/2005 |
| JP | 2005183030 A | 7/2005 |
| JP | 2005203182 A | 7/2005 |
| JP | 2005259361 A | 9/2005 |
| JP | 2006004877 A | 1/2006 |
| JP | 2006010935 A | 1/2006 |
| JP | 2006031941 A | 2/2006 |
| JP | 2006294361 A | 10/2006 |
| JP | 2006310269 A | 11/2006 |
| JP | 2007094035 A | 4/2007 |

(56) References Cited

FOREIGN PATENT DOCUMENTS

| | | |
|---|---|---|
| JP | 3968742 B2 | 8/2007 |
| JP | 2007273288 A | 10/2007 |
| JP | 2007286652 | 11/2007 |
| JP | 2008204874 A | 9/2008 |
| JP | 2010160527 A | 7/2010 |
| JP | 2011192468 A | 9/2011 |
| JP | 2011216281 A | 10/2011 |
| JP | 2012060607 A | 3/2012 |
| JP | 2013015619 | 1/2013 |
| JP | 2013502693 | 1/2013 |
| JP | 2013540083 | 10/2013 |
| KR | 20030064258 | 7/2003 |
| KR | 20090932304 | 12/2009 |
| KR | 20110006773 A | 1/2011 |
| KR | 20110017918 A | 2/2011 |
| KR | 20110067534 A | 6/2011 |
| KR | 20120048301 A | 5/2012 |
| KR | 20120049890 A | 5/2012 |
| KR | 20130002646 A | 1/2013 |
| KR | 20140139730 | 12/2014 |
| TW | 200528780 | 9/2005 |
| WO | 1994006249 B1 | 4/1994 |
| WO | 1995020811 A1 | 8/1995 |
| WO | 1995027915 A1 | 10/1995 |
| WO | 1998021620 A1 | 5/1998 |
| WO | 1999011074 A1 | 3/1999 |
| WO | 2001027528 A1 | 4/2001 |
| WO | 2001061241 A1 | 8/2001 |
| WO | 2001079923 A1 | 10/2001 |
| WO | 2008038539 A1 | 4/2008 |
| WO | 2008045681 A1 | 4/2008 |
| WO | 2009098809 A1 | 8/2009 |
| WO | 2010021926 A2 | 2/2010 |
| WO | 2011020962 A1 | 2/2011 |
| WO | 2011022342 A2 | 2/2011 |
| WO | 2011068907 A1 | 6/2011 |
| WO | 2011079856 A1 | 7/2011 |
| WO | 2011149739 A2 | 12/2011 |
| WO | 2014130860 A1 | 8/2014 |

OTHER PUBLICATIONS

AU-2011329639 Australia Patent Examination Report No. 1 dated Mar. 6, 2014.
AU-2014218711 Examination report No. 1 dated Mar. 20, 2017.
AU-2015258258 Australian Office Action of Australian Patent Office dated Jun. 9, 2016.
Beato: "Understanding Comfortable stereography", Dec. 31, 2011 (Dec. 31, 2011), XP055335952, Retrieved from the Internet: URL:http://64.17.134.112/Affonso Beato/Understanding Comfortable Stereography.html [retrieved-on Jan. 17, 2017].
Braverman: "The 3D Toolbox : News", Aug. 13, 2010 (Aug. 13, 2010), XP055336081, Retrieved from the Internet: URL:http://www.dashwood3d.com/blog/the-3d-toolbox/ [retrieved on Jan. 17, 2017].
CA-2817044 Canadian office action dated Jul. 14, 2016.
CN-201180065590.0 Office fourth action dated Jan. 4, 2017.
CN-201280034488.9 2d Office Action from the State Intellectual Property Office of P.R. China dated Mar. 22, 2016.
CN-201280034488.9 1st Office Action from the State Intellectual Property Office of P.R. China dated Jun. 11, 2015.
CN-201380026045.X Chinese First Office Action of Chinese Patent Office dated Aug. 29, 2016.
CN-201380026046.4 Chinese 1st Office Action of the State Intellectual Property Office of P.R. China dated Oct. 24, 2016.
CN-201380026047.9 Chinese 2d Office Action of the State Intellectual Property Office of P.R. dated Jul. 12, 2016.
CN-201380026050.0 Chinese 2nd Office Action of the State Intellectual Property Office of P.R. dated Apr. 1, 2017.
CN-201380026058.7 Chinese 1st Office Action of the State Intellectual Property Office of P.R. China dated Nov. 2, 2016.
CN-201380026059.1 Chinese 2nd Office Action of the State Intellectual Property Office of P.R. dated Feb. 22, 2017.
CN-201380063047.6 Chinese Office Action of the State Intellectual Property Office of P.R. China dated Oct. 9, 2016.
CN-201380063055.0 Chinese 1st Office Action of the State Intellectual Property Office of P.R. dated Jun. 23, 2016.
CN-201380073381.X Chinese Office Action of the State Intellectual Property Office of P.R. China dated Nov. 16, 2016.
CN-201480023023.2 Office first action dated Aug. 12, 2016.
CN-201480023023.2 Office second action dated May 11, 2017.
Cootes et al., "Active Appearance Models", IEEE Trans. Pattern Analysis and Machine Intelligence, 23(6):681-685, 2001.
Cootes et al., "Active Shape Models—Their Training and Application" Computer Vision and Image Understanding 61(1):38-59 Jan. 1995.
Dalal et al., "Histogram of Oriented Gradients for Human Detection", Computer Vision and Pattern Recognition, pp. 886-893, 2005.
Drucker et al., "Support Vector Regression Machines", Advances in Neural Information Processing Systems 9, pp. 155-161, NIPS 1996.
EP-09817048.3 European Search Report dated Apr. 29, 2016.
EP-11842021.5 Office Action dated Sep. 2, 2016.
EP-13790775.4 Office Action dated Aug. 29, 2016.
EP-13791437.0 European first office action dated Aug. 30, 2016.
EP-13822472.0 European Extended Search Report of European Patent Office dated Mar. 2, 2016.
EP-13865893.5 European Extended Search Report of European Patent Office dated Oct. 6, 2016.
EP-14754859.8 European Extended Search Report of European Patent Office dated Oct. 14, 2016.
EP-14813739.1 European Extended Search Report of European Patent Office dated Jan. 25, 2017.
EP-14853532.1 European Extended Search Report of European Patent Office dated May 23, 2017.
Ho, "Random Decision Forests", Proceedings of the 3rd International Conference on Document Analysis and Recognition, Montreal, QC, pp. 278-282, Aug. 14-16, 1995.
Ian Sexton et al: "Stereoscopic and autostereoscopic display-systems",—IEEE Signal Processing Magazine, May 1, 1999 (May 1, 1999 ), pp. 85-99, XP055305471, Retrieved from the Internet: URL:http://ieeexplore.ieee.org/iel5/79/16655/00768575.pdf [retrieved on Sep. 26, 2016].
JP-200980150139.1 1st Office Action dated Nov. 2, 2014.
JP-200980150139.1 2d Office Action dated May 4, 2015.
JP-2015-512794 1st Office Action (translated) dated Feb. 14, 2017.
JP-2015-512809 1st Office Action dated Mar. 28, 2017.
JP-2015-512810 1st Office Action (translated) dated Feb. 7, 2017.
JP-2015-512879 1st Office Action (translated) dated Apr. 11, 2017.
JP-2015-512887 1st Office Action (translated) dated Feb. 7, 2017.
JP-2015-512896 1st Office Action (translated) dated May 9, 2017.
JP-2015-512901 1st Office Action dated Mar. 28, 2017.
JP-2015-512905 1st Office Action (translated) dated Feb. 7, 2017.
Kononenko et al., "Learning to Look up: Realtime Monocular Gaze Correction Using Machine Learning", Computer Vision and Pattern Recognition, pp. 4667-4675, 2015.
KR-20117010839 1st Office action (translated) dated Aug. 28, 2015.
KR-20117010839 2d Office action (translated) dated Apr. 28, 2016.
KR-20137015775 Office action (translated) dated Oct. 18, 2016.
AU-2013262869 Australian Office Action of Australian Patent Office dated Feb. 22, 2016.
Bahadur, "Liquid crystals applications and uses," World Scientific, vol. 1, pp. 178 (1990).
CN-201180065590.0 Office first action dated Dec. 31, 2014.
CN-201180065590.0 Office second action dated Oct. 21, 2015.
CN-201180065590.0 Office Third action dated Jun. 6, 2016.
CN-201380026047.9 Chinese 1st Office Action of the State Intellectual Property Office of P.R. dated Dec. 18, 2015.
CN-201380026050.0 Chinese 1st Office Action of the State Intellectual Property Office of P.R. dated Jun. 3, 2016.
CN-201380026059.1 Chinese 1st Office Action of the State Intellectual Property Office of P.R. dated Apr. 25, 2016.
CN-201380026076.5 Office first action dated May 11, 2016.
CN-201380049451.8 Chinese Office Action of the State Intellectual Property Office of P.R. dated Apr. 5, 2016.
EP-07864751.8 European Search Report dated Jun. 1, 2012.

(56) References Cited

OTHER PUBLICATIONS

EP-07864751.8 Supplementary European Search Report dated May 29, 2015.
EP-11842021.5 Office Action dated Oct. 2, 2015.
EP-13758536.0 European Extended Search Report of European Patent Office dated Feb. 4, 2016.
EP-13790013.0 European Extended Search Report of European Patent Office dated Jan. 26, 2016.
EP-13790141.9 European Extended Search Report of European Patent Office dated Feb. 11, 2016.
EP-13790195.5 European Extended Search Report of European Patent Office dated Mar. 2, 2016.
EP-13790267.2 European Extended Search Report of European Patent Office dated Feb. 25, 2016.
EP-13790274.8 European Extended Search Report of European Patent Office dated Feb. 8, 2016.
EP-13790775.4 European Extended Search Report of European Patent Office dated Oct. 9, 2015.
EP-13790809.1 European Extended Search Report of European Patent Office dated Feb. 16, 2016.
EP-13790942.0 European Extended Search Report of European Patent Office dated May 23, 2016.
EP-13791332.3 European Extended Search Report of European Patent Office dated Feb. 1, 2016.
EP-13791437.0 European Extended Search Report of European Patent Office dated Feb. 1, 2016.
EP-13843659.7 European Extended Search Report of European Patent Office dated May 10, 2016.
EP-13844510.1 European Extended Search Report of European Patent Office dated May 13, 2016.
PCT/US2013/041683 International search report and written opinion of international searching authority dated Aug. 27, 2013.
JP-2013540083 Notice of reasons for rejection dated Jun. 30, 2015.
PCT/US2013/041655 International search report and written opinion of international searching authority dated Aug. 27, 2013.
PCT/US2013/041619 International search report and written opinion of international searching authority dated Aug. 27, 2013.
Kalantar, et al. "Backlight Unit With Double Surface Light Emission," J. Soc. Inf. Display, vol. 12, Issue 4, pp. 379-387 (Dec. 2004).
Languy et al., "Performance comparison of four kinds of flat nonimaging Fresnel lenses made of polycarbonates and polymethyl methacrylate for concentrated photovoltaics", Optics Letters, 36, pp. 2743-2745.
Lipton, "Stereographics: Developers' Handbook", Stereographic Developers Handbook, Jan. 1, 1997, XP002239311, p. 42-49.
PCT/US2013/041548 International search report and written opinion of international searching authority dated Aug. 27, 2013.
PCT/US2007/85475 International search report and written opinion dated Apr. 10, 2008.
PCT/US2013/041237 International search report and written opinion of international searching authority dated May 15, 2013.
PCT/US2009/060686 international search report and written opinion of international searching authority dated Dec. 10, 2009.
PCT/US2011/061511 International search report and written opinion of international searching authority dated Jun. 29, 2012.
PCT/US2011/061511 International Preliminary Report on Patentability dated May 21, 2013.
PCT/US2012/037677 International search report and written opinion of international searching authority dated Jun. 29, 2012.
PCT/US2012/042279 International search report and written opinion of international searching authority dated Feb. 26, 2013.
PCT/US2012/052189 International search report and written opinion of the international searching authority dated Jan. 29, 2013.
PCT/US2013/041192 International search report and written opinion of international searching authority dated Aug. 28, 2013.
PCT/US2013/041228 International search report and written opinion of international searching authority dated Aug. 23, 2013.
PCT/US2013/041235 International search report and written opinion of international searching authority dated Aug. 23, 2013.
PCT/US2013/041697 International search report and written opinion of international searching authority dated Aug. 23, 2013.
PCT/US2013/041703 International search report and written opinion of international searching authority dated Aug. 27, 2013.
PCT/US2013/049969 International search report and written opinion of international searching authority dated Oct. 23, 2013.
PCT/US2013/063125 International search report and written opinion of international searching authority dated Jan. 20, 2014.
PCT/US2013/063133 International search report and written opinion of international searching authority dated Jan. 20, 2014.
PCT/US2013/077288 International search report and written opinion of international searching authority dated Apr. 18, 2014.
PCT/US2014/017779 International search report and written opinion of international searching authority dated May 28, 2014.
PCT/US2014/042721 International search report and written opinion of international searching authority dated Oct. 10, 2014.
PCT/US2014/060312 International search report and written opinion of international searching authority dated Jan. 19, 2015.
PCT/US2014/060368 International search report and written opinion of international searching authority dated Jan. 14, 2015.
PCT/US2014/065020 International search report and written opinion of international searching authority dated May 21, 2015.
PCT/US2015/021583 International search report and written opinion of international searching authority dated Sep. 10, 2015.
PCT/US2015/038024 International search report and written opinion of international searching authority dated Dec. 30, 2015.
Robinson et al., U.S. Appl. No. 14/751,878 entitled "Directional privacy display" filed Jun. 26, 2015. The application is available to Examiner on the USPTO database and has not been filed herewith.
Robinson et al., U.S. Appl. No. 15/097,750 entitled "Wide angle imaging directional backlights" filed Apr. 13, 2016. The application is available to Examiner on the USPTO database and has not been filed herewith.
Robinson et al., U.S. Appl. No. 15/098,084 entitled "Wide angle imaging directional backlights" filed Apr. 13, 2016. The application is available to Examiner on the USPTO database and has not been filed herewith.
Robinson, U.S. Appl. No. 13/300,293 entitled "Directional flat illuminators" filed Nov. 18, 2011. The application is available to Examiner on the USPTO database and has not been filed herewith.
RU-2013122560 First office action dated Jan. 1, 2014.
RU-2013122560 Second office action dated Apr. 10, 2015.
Tabiryan et al., "The Promise of Diffractive Waveplates," Optics and Photonics News, vol. 21, Issue 3, pp. 40-45 (Mar. 2010).
Travis, et al. "Backlight for view-sequential autostereo 3D", Microsoft E&DD Applied Sciences, (date unknown), 25 pages.
Williams S P et al., "New Computational Control Techniques and Increased Understanding for Stereo 3-D Displays", Proceedings of SPIE, SPIE, US, vol. 1256, Jan. 1, 1990, XP000565512, p. 75, 77, 79.
Lipton: "Stereoscopic Composition Lenny Lipton", Feb. 15, 2009 (Feb. 15, 2009), XP055335930, Retrieved from the Internet: URL:https://lennylipton.wordpress.com/2009/02/15/stereoscopic-composition/ [retrieved on Jan. 17, 2017].
Lowe, "Distinctive Image Features from Scale-Invariant Keypoints", International Journal of Computer Vision 60 (2), pp. 91-110, 2004.
Lucio et al: "RGBD Camera Effects", Aug. 1, 2012 (Aug. 1, 2012), XP055335831, SIBGRAPI—Conference on Graphics, Patterns and Images Retrieved from the Internet: URL:https://www.researchgate.net/profile/Leandro Cruz/publication/233398182 RGBD Camera Effects/links/0912f50a2922010eb2000000.pdf [retrieved on Jan. 17, 2017].
Marjanovic, M.,"Interlace, Interleave, and Field Dominance," http://www.mir.com/DMG/interl.html, pp. 1-5 (2001).
Ozuysal et al., "Fast Keypoint recognition in Ten Lines of Code", Computer Vision and Pattern Recognition, pp. 1-8, 2007.
Zach et al., "A Duality Based Approach for Realtime TV-L1 Optical Flow", Pattern Recognition (Proc. DAGM), 2007, pp. 214-223.
PCT/US2014/057860 International Preliminary Report on Patentability dated Apr. 5, 2016.
PCT/US2014/057860 International search report and written opinion of international searching authority dated Jan. 5, 2015.
PCT/US2015/000327 International search report and written opinion of international searching authority dated Apr. 25, 2016.

(56) References Cited

OTHER PUBLICATIONS

PCT/US2015/054523 International search report and written opinion of international searching authority dated Mar. 18, 2016.
PCT/US2016/027297 International search report and written opinion of international searching authority dated Jul. 26, 2016.
PCT/US2016/027350 International search report and written opinion of the international searching authority dated Jul. 25, 2016.
PCT/US2016/034418 International search report and written opinion of the international searching authority dated Sep. 7, 2016.
PCT/US2016/056410 International search report and written opinion of the international searching authority dated Jan. 25, 2017.
PCT/US2016/058695 International search report and written opinion of international searching authority dated Feb. 28, 2017.
PCT/US2016/061428 International search report and written opinion of international searching authority dated Jan. 20, 2017.
PCT/US2017/012203 International search report and written opinion of international searching authority dated Apr. 18, 2017.
Robinson et al., U.S. Appl. No. 15/165,960 entitled "Wide Angle Imaging Directional Backlights" filed May 26, 2016. The application is available to Examiner on the USPTO database and has not been filed herewith.
Robinson et al., U.S. Appl. No. 15/290,543 entitled "Wide angle imaging directional backlights" filed Oct. 11, 2016. The application is available to Examiner on the USPTO database and has not been filed herewith.
RU-201401264 Office action dated Jan. 18, 2017.
Travis, et al. "Collimated light from a waveguide for a display," Optics Express, vol. 17, No. 22, pp. 19714-19719 (2009).
Viola and Jones, "Rapid Object Detection using a Boosted Cascade of Simple Features", pp. 1-9 CVPR 2001.
CN-201380026064.2 Chinese First Office Action of Chinese Patent Office dated Jun. 9, 2017.
EP-16780663.7 European Extended Search Report of European Patent Office dated Nov. 22, 2018.

* cited by examiner $$\frac{a}{A} = \frac{cos(\theta i)}{cos(\theta i - 2 \cdot \theta f)} \equiv \text{Efficiency}$$

WIDE ANGLE IMAGING DIRECTIONAL BACKLIGHTS

CROSS-REFERENCE TO RELATED APPLICATIONS

This application claims priority to U.S. Provisional Patent Application No. 62/146,648, entitled "Wide Angle Imaging Directional Backlights" filed Apr. 13, 2015, U.S. Provisional Patent Application No. 62/154,932, entitled "Wide Angle Imaging Directional Backlights" filed Apr. 30, 2015, U.S. Provisional Patent Application No. 62/167,185, entitled "Wide Angle Imaging Directional Backlights" filed May 27, 2015, U.S. Provisional Patent Application No. 62/255,248, entitled "Wide Angle Imaging Directional Backlights" filed Nov. 13, 2015, and U.S. Provisional Patent Application No. 62/167,203, entitled "Wide Angle Imaging Directional Backlights" filed May 27, 2015, all of which are herein incorporated by reference in their entireties.

TECHNICAL FIELD

This disclosure generally relates to illumination of light modulation devices, and more specifically relates to light guides for providing large area illumination from localized light sources for use in 2D, 3D, and/or autostereoscopic display devices.

BACKGROUND

Spatially multiplexed autostereoscopic displays typically align a parallax component such as a lenticular screen or parallax barrier with an array of images arranged as at least first and second sets of pixels on a spatial light modulator, for example an LCD. The parallax component directs light from each of the sets of pixels into different respective directions to provide first and second viewing windows in front of the display. An observer with an eye placed in the first viewing window can see a first image with light from the first set of pixels; and with an eye placed in the second viewing window can see a second image, with light from the second set of pixels.

Such displays have reduced spatial resolution compared to the native resolution of the spatial light modulator and further, the structure of the viewing windows is determined by the pixel aperture shape and parallax component imaging function. Gaps between the pixels, for example for electrodes, typically produce non-uniform viewing windows. Undesirably such displays exhibit image flicker as an observer moves laterally with respect to the display and so limit the viewing freedom of the display. Such flicker can be reduced by defocusing the optical elements; however such defocusing results in increased levels of image cross talk and increases visual strain for an observer. Such flicker can be reduced by adjusting the shape of the pixel aperture, however such changes can reduce display brightness and can comprise addressing electronics in the spatial light modulator.

BRIEF SUMMARY

According to the present disclosure, a directional illumination apparatus may include an imaging directional backlight for directing light, an illuminator array for providing light to the imaging directional backlight. The imaging directional backlight may include a waveguide for guiding light. The waveguide may include a first light guiding surface and a second light guiding surface, opposite the first light guiding surface.

Display backlights in general employ waveguides and edge emitting sources. Certain imaging directional backlights have the additional capability of directing the illumination through a display panel into viewing windows. An imaging system may be formed between multiple sources and the respective window images. One example of an imaging directional backlight is an optical valve that may employ a folded optical system and hence may also be an example of a folded imaging directional backlight. Light may propagate substantially without loss in one direction through the optical valve while counter-propagating light may be extracted by reflection off tilted facets as described in U.S. patent application Ser. No. 13/300,293 (U.S. Pat. Publ. No. 2012/0127573), which is herein incorporated by reference in its entirety.

Directional backlights provide illumination through a waveguide with directions within the waveguide imaged to viewing windows. Diverging light from light sources at the input end and propagating within the waveguide is provided with reduced divergence, and typically collimated, by a curved reflecting mirror at a reflecting end of the waveguide and is imaged towards a viewing window by means of curved light extraction features or a lens such as a Fresnel lens. For the on-axis viewing window, the collimated light is substantially parallel to the edges of a rectangular shaped waveguide and so light is output across the entire area of the waveguide towards the viewing window. For off-axis positions, the direction of the collimated light is not parallel to the edges of a rectangular waveguide but is inclined at a non-zero angle. Thus a non-illuminated (or void) outer portion (that may be triangular in shape) is formed between one edge of the collimated beam and the respective edge of the waveguide. Ideally, no light is directed to the respective viewing window from within the outer portion and the display will appear dark in this region. It would be desirable to reduce the appearance of the dark outer portions for off-axis viewing positions so that more of the area of the waveguide can be used to illuminate a spatial light modulator, advantageously reducing system size and cost.

In general with this and related imaging directional backlight systems, not all the backlight area may be useable due to vignetting at high angles. Modification of the system may overcome this limitation by introducing light into regions that are void. Such modified illumination apparatus embodiments may lead to increased brightness, local independent illumination and directional capabilities.

According to a first aspect of the present disclosure a directional waveguide may comprise: an input end; first and second opposed, laterally extending guide surfaces for guiding light along the waveguide; and a reflective end facing the input end for reflecting the input light back along the waveguide, the second guide surface being arranged to deflect the reflected input light through the first guide surface as output light, and the waveguide being arranged to direct the output light into optical windows in output directions that are distributed in a lateral direction in dependence on the input position of the input light, wherein the reflective end is a Fresnel reflector comprising alternating reflective facets and draft facets, the reflective facets providing the Fresnel reflector with positive optical power laterally, and, in at least a center region of the Fresnel reflector, the depth of the draft facets parallel to the optical axis of the reflective end being greater than the depth of the reflective facets. The pitch of the reflective facets laterally across the reflective end may be constant. The width of the reflective facets laterally across the reflective end is at most one mm. The depth of each of the draft facets may be at least 0.5 µm. The height of the reflective end between the first and second guide surfaces may have a profile that is flat. The first guide surface may be arranged to guide light by total internal reflection and the second guide surface may comprise a plurality of light extraction features oriented to direct light guided along the waveguide in directions allowing exit through the first guide surface as the output light and intermediate regions between the light extraction features that are arranged to guide light along the waveguide. The second guide surface may have a stepped shape in which said light extraction features are facets between the intermediate regions. The light extraction features may have positive optical power in the lateral direction.

Advantageously a Fresnel reflector may be provided with substantially uniform scatter in a lateral direction, thus achieving increased display uniformity.

According to a second aspect of the present disclosure a directional waveguide may comprise: an input end; first and second opposed, laterally extending guide surfaces for guiding light along the waveguide; and a reflective end facing the input end for reflecting the input light back along the waveguide, the second guide surface being arranged to deflect the reflected input light through the first guide surface as output light, and the waveguide being arranged to direct the output light into optical windows in output directions that are distributed in a lateral direction in dependence on the input position of the input light, wherein the reflective end is a Fresnel reflector comprising alternating reflective facets and draft facets, the reflective facets providing the Fresnel reflector with positive optical power laterally, wherein the internal angles between adjacent draft facets and reflective facets are the same.

In privacy mode of operation of a directional display apparatus for off-axis viewing it is desirable to minimize the luminance across the whole display area. Internal reflections from draft facets of a Fresnel reflector that are for example substantially parallel may provide increased luminance artefact regions. Advantageously according to the second aspect, the luminance of the artefact regions may be reduced in comparison to Fresnel reflectors comprising parallel draft facets. Further, coating efficiency may be improved, thus achieving increased display luminance and lateral uniformity.

According to a third aspect of the present disclosure a directional waveguide may comprise: an input end; first and second opposed, laterally extending guide surfaces for guiding light along the waveguide; and a reflective end facing the input end for reflecting the input light back along the waveguide, the second guide surface being arranged to deflect the reflected input light through the first guide surface as output light, and the waveguide being arranged to direct the output light into optical windows in output directions that are distributed in a lateral direction in dependence on the input position of the input light, wherein the reflective end is a Fresnel reflector comprising alternating reflective facets and draft facets, the reflective facets providing the Fresnel reflector with positive optical power laterally, each reflective facet having a microstructure arranged to provide lateral angular diffusion of the light reflected therefrom.

The microstructure comprises a plurality of curved sub-facets. The curved sub-facets may be concave or convex, as both may provide the lateral angular diffusion.

In wide angle operation of a directional display apparatus for off-axis viewing it is desirable to minimize streak artefacts that arise from imaging of gaps between light sources of the input light source array. In privacy operation of such a display it is desirable to minimize scatter that arises from sheet diffusers and may increase the amount of light seen for off-axis viewing. Advantageously, according to the present aspect, streak artefacts can be reduced by providing diffusion characteristics from the facets of the Fresnel reflector. Further, the amount of diffusion from the Fresnel reflector can be controlled to reduce scatter in comparison to a sheet diffuser, minimizing luminance for off-axis viewing and improving privacy performance.

According to a third aspect of the present disclosure a directional waveguide may comprise: an input end; first and second opposed, laterally extending guide surfaces for guiding light along the waveguide; and a reflective end facing the input end for reflecting the input light back along the waveguide, the second guide surface being arranged to deflect the reflected input light through the first guide surface as output light, and the waveguide being arranged to direct the output light into optical windows in output directions that are distributed in a lateral direction in dependence on the input position of the input light, wherein the reflective end is a Fresnel reflector comprising alternating reflective facets and draft facets, the reflective facets providing the Fresnel reflector with positive optical power laterally, and the draft facets being arranged to have a lower reflectivity than the reflective facets.

In privacy mode of operation of a directional display apparatus for off-axis viewing it is desirable to minimize the luminance across the whole display area. Internal reflections from reflectively coated draft facets of a Fresnel reflector may provide increased luminance artefact regions. Advantageously according to the third aspect, the luminance of the artefact regions may be reduced in comparison to Fresnel reflectors comprising draft facets with substantially the same reflectivity as the reflective facets.

According to a further aspect of the present disclosure a directional backlight may comprise: a directional waveguide according to the any of the above aspects; and an array of input light sources arranged at different input positions in a lateral direction across the input end of the waveguide and arranged to input light into the waveguide.

According to a further aspect of the present disclosure a directional display device may comprise a directional backlight according to the above aspect; and a transmissive spatial light modulator arranged to receive the output light from the waveguide and to modulate it to display an image.

According to a further aspect of the present disclosure a directional display apparatus may comprise a directional display device according to the above aspect; and a control system arranged to control the light sources.

Advantageously an array of optical windows can be formed, to provide a controllable directionality of optical output. The optical windows can be arranged to provide modes of operation that may be switched between (i) wide viewing angle mode that has similar spatial and angular uniformity to conventional non-imaging backlights, (ii) autostereoscopic 3D mode, (iii) privacy mode, (iv) dual view mode, (v) power savings mode, and (vi) efficient high luminance mode for outdoors operation.

Any of the aspects of the present disclosure may be applied in any combination.

Embodiments herein may provide an autostereoscopic display that provides wide angle viewing which may allow for directional viewing and conventional 2D compatibility. The wide angle viewing mode may be for observer tracked autostereoscopic 3D display, observer tracked 2D display (for example for privacy or power saving applications), for wide viewing angle 2D display or for wide viewing angle stereoscopic 3D display. Further, embodiments may provide a controlled illuminator for the purposes of an efficient autostereoscopic display. Such components can be used in directional backlights, to provide directional displays including autostereoscopic displays. Additionally, embodiments may relate to a directional backlight apparatus and a directional display which may incorporate the directional backlight apparatus. Such an apparatus may be used for autostereoscopic displays, privacy displays, multi-user displays and other directional display applications that may achieve for example power savings operation and/or high luminance operation.

Embodiments herein may provide an autostereoscopic display with large area and thin structure. Further, as will be described, the optical valves of the present disclosure may achieve thin optical components with large back working distances. Such components can be used in directional backlights, to provide directional displays including autostereoscopic displays. Further, embodiments may provide a controlled illuminator for the purposes of an efficient autostereoscopic display.

Embodiments of the present disclosure may be used in a variety of optical systems. The embodiment may include or work with a variety of projectors, projection systems, optical components, displays, microdisplays, computer systems, processors, self-contained projector systems, visual and/or audiovisual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

Directional backlights offer control over the illumination emanating from substantially the entire output surface controlled typically through modulation of independent LED light sources arranged at the input aperture side of an optical waveguide. Controlling the emitted light directional distribution can achieve single person viewing for a security function, where the display can only be seen by a single viewer from a limited range of angles; high electrical efficiency, where illumination is primarily provided over a small angular directional distribution; alternating left and right eye viewing for time sequential stereoscopic and autostereoscopic display; and low cost.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which.

DETAILED DESCRIPTION

Figure 1A:
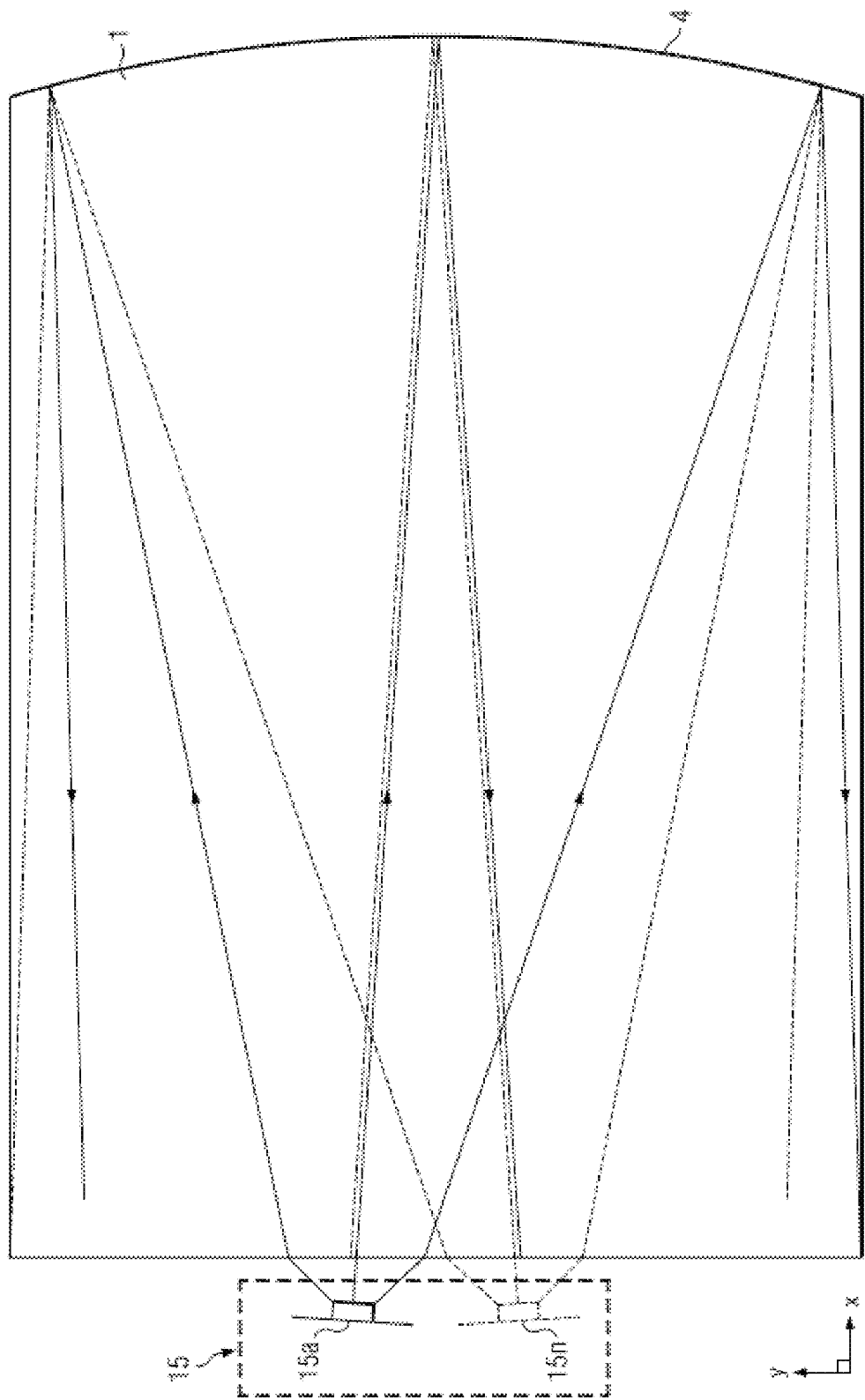
FIG. 1A is a schematic diagram illustrating a front view of light propagation in one embodiment of a directional display device, in accordance with the present disclosure.

Time multiplexed autostereoscopic displays can advantageously improve the spatial resolution of autostereoscopic display by directing light from all of the pixels of a spatial light modulator to a first viewing window in a first time slot, and all of the pixels to a second viewing window in a second time slot. Thus an observer with eyes arranged to receive light in first and second viewing windows will see a full resolution image across the whole of the display over multiple time slots. Time multiplexed displays can advantageously achieve directional illumination by directing an illuminator array through a substantially transparent time multiplexed spatial light modulator using directional optical elements, wherein the directional optical elements substantially form an image of the illuminator array in the window plane.

The uniformity of the viewing windows may be advantageously independent of the arrangement of pixels in the spatial light modulator. Advantageously, such displays can provide observer tracking displays which have low flicker, with low levels of cross talk for a moving observer.

To achieve high uniformity in the window plane, it is desirable to provide an array of illumination elements that have a high spatial uniformity. The illuminator elements of the time sequential illumination system may be provided, for example, by pixels of a spatial light modulator with size approximately 100 micrometers in combination with a lens array. However, such pixels suffer from similar difficulties as for spatially multiplexed displays. Further, such devices may have low efficiency and higher cost, requiring additional display components.

High window plane uniformity can be conveniently achieved with macroscopic illuminators, for example, an array of LEDs in combination with homogenizing and diffusing optical elements that are typically of size 1 mm or greater. However, the increased size of the illuminator elements means that the size of the directional optical elements increases proportionately. For example, a 16 mm wide illuminator imaged to a 65 mm wide viewing window may require a 200 mm back working distance. Thus, the increased thickness of the optical elements can prevent useful application, for example, to mobile displays, or large area displays.

Addressing the aforementioned shortcomings, optical valves as described in commonly-owned U.S. patent application Ser. No. 13/300,293 (U.S. Patent Publication No. 2012/0127573), herein incorporated by reference in its entirety, advantageously can be arranged in combination with fast switching transmissive spatial light modulators to achieve time multiplexed autostereoscopic illumination in a thin package while providing high resolution images with flicker free observer tracking and low levels of cross talk. Described is a one dimensional array of viewing positions, or windows, that can display different images in a first, typically horizontal, direction, but contain the same images when moving in a second, typically vertical, direction.

Conventional non-imaging display backlights commonly employ optical waveguides and have edge illumination from light sources such as LEDs. However, it should be appreciated that there are many fundamental differences in the function, design, structure, and operation between such conventional non-imaging display backlights and the imaging directional backlights discussed in the present disclosure.

Generally, for example, in accordance with the present disclosure, imaging directional backlights are arranged to direct the illumination from multiple light sources through a display panel to respective multiple viewing windows in at least one axis. Each viewing window is substantially formed as an image in at least one axis of a light source by the imaging system of the imaging directional backlight. An imaging system may be formed between multiple light sources and the respective window images. In this manner, the light from each of the multiple light sources is substantially not visible for an observer's eye outside of the respective viewing window.

In contradistinction, conventional non-imaging backlights or light guiding plates (LGPs) are used for illumination of 2D displays. See, e.g., Kälil Käläntär et al., *Backlight Unit With Double Surface Light Emission*, J. Soc. Inf. Display, Vol. 12, Issue 4, pp. 379-387 (December 2004). Non-imaging backlights are typically arranged to direct the illumination from multiple light sources through a display panel into a substantially common viewing zone for each of the multiple light sources to achieve wide viewing angle and high display uniformity. Thus non-imaging backlights do not form viewing windows. In this manner, the light from each of the multiple light sources may be visible for an observer's eye at substantially all positions across the viewing zone. Such conventional non-imaging backlights may have some directionality, for example, to increase screen gain compared to Lambertian illumination, which may be provided by brightness enhancement films such as BEF™ from 3M. However, such directionality may be substantially the same for each of the respective light sources. Thus, for these reasons and others that should be apparent to persons of ordinary skill, conventional non-imaging backlights are different to imaging directional backlights. Edge lit non-imaging backlight illumination structures may be used in liquid crystal display systems such as those seen in 2D Laptops, Monitors and TVs. Light propagates from the edge of a lossy waveguide which may include sparse features; typically local indentations in the surface of the guide which cause light to be lost regardless of the propagation direction of the light.

As used herein, an optical valve is an optical structure that may be a type of light guiding structure or device referred to as, for example, a light valve, an optical valve directional backlight, and a valve directional backlight ("v-DBL"). In the present disclosure, optical valve is different to a spatial light modulator (even though spatial light modulators may be sometimes generally referred to as a "light valve" in the art). One example of an imaging directional backlight is an optical valve that may employ a folded optical system. Light may propagate substantially without loss in one direction through the optical valve, may be incident on an imaging reflector, and may counter-propagate such that the light may be extracted by reflection off tilted light extraction features, and directed to viewing windows as described in U.S. patent application Ser. No. 13/300,293 (U.S. Pat. Publ. No. 2012/0127573), which is herein incorporated by reference in its entirety.

Additionally, as used herein, a stepped waveguide imaging directional backlight may be at least one of an optical valve. A stepped waveguide is a waveguide for an imaging directional backlight comprising a waveguide for guiding light, further comprising: a first light guiding surface; and a second light guiding surface, opposite the first light guiding surface, further comprising a plurality of light guiding features interspersed with a plurality of extraction features arranged as steps.

In operation, light may propagate within an exemplary optical valve in a first direction from an input side to a reflective side and may be transmitted substantially without loss. Light may be reflected at the reflective side and propagates in a second direction substantially opposite the first direction. As the light propagates in the second direction, the light may be incident on light extraction features, which are operable to redirect the light outside the optical valve. Stated differently, the optical valve generally allows light to propagate in the first direction and may allow light to be extracted while propagating in the second direction.

The optical valve may achieve time sequential directional illumination of large display areas. Additionally, optical elements may be employed that are thinner than the back working distance of the optical elements to direct light from macroscopic illuminators to a window plane. Such displays may use an array of light extraction features arranged to extract light counter propagating in a substantially parallel waveguide.

Thin imaging directional backlight implementations for use with LCDs have been proposed and demonstrated by 3M, for example U.S. Pat. No. 7,528,893; by Microsoft, for example U.S. Pat. No. 7,970,246 which may be referred to herein as a "wedge type directional backlight;" by RealD, for example U.S. patent application Ser. No. 13/300,293 (U.S. Patent Publication No. 2012/0127573) which may be referred to herein as an "optical valve" or "optical valve directional backlight," all of which are herein incorporated by reference in their entirety.

The present disclosure provides stepped waveguide imaging directional backlights in which light may reflect back and forth between the internal faces of, for example, a stepped waveguide which may include a first side and a first set of features. As the light travels along the length of the stepped waveguide, the light may not substantially change angle of incidence with respect to the first side and first set of surfaces and so may not reach the critical angle of the medium at these internal faces. Light extraction may be advantageously achieved by a second set of surfaces (the step "risers") that are inclined to the first set of surfaces (the step "treads"). Note that the second set of surfaces may not be part of the light guiding operation of the stepped waveguide, but may be arranged to provide light extraction from the structure. By contrast, a wedge type imaging directional backlight may allow light to guide within a wedge profiled waveguide having continuous internal surfaces. The optical valve is thus not a wedge type imaging directional backlight.

Figure 1B:
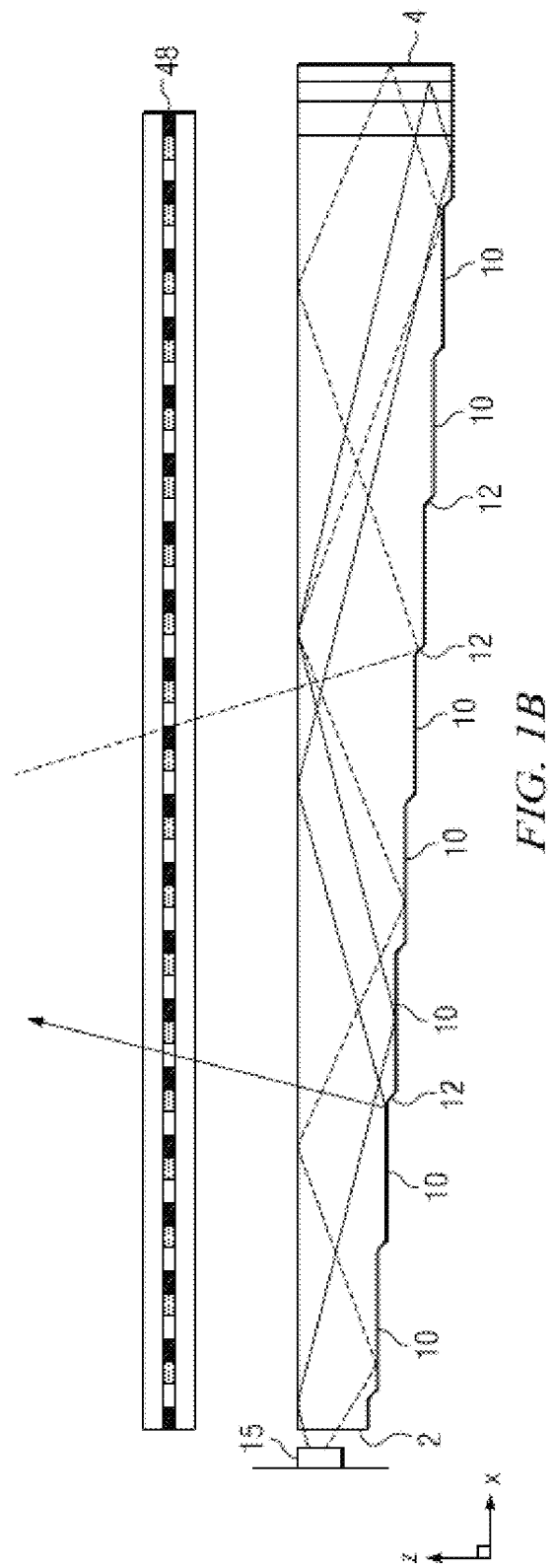
FIG. 1B is a schematic diagram illustrating a side view of light propagation in one embodiment of the directional display device of FIG. 1A, in accordance with the present disclosure.

FIG. 1A is a schematic diagram illustrating a front view of light propagation in one embodiment of a directional display device, and FIG. 1B is a schematic diagram illustrating a side view of light propagation in the directional display device of FIG. 1A.

FIG. 1A illustrates a front view in the xy plane of a directional backlight of a directional display device, and includes an illuminator array 15 which may be used to illuminate a stepped waveguide 1. Illuminator array 15 includes illuminator elements 15a through illuminator element 15n (where n is an integer greater than one). In one example, the stepped waveguide 1 of FIG. 1A may be a stepped, display sized waveguide 1. Illumination elements 15a through 15n are light sources that may be light emitting diodes (LEDs). Although LEDs are discussed herein as illuminator elements 15a-15n, other light sources may be used such as, but not limited to, diode sources, semiconductor sources, laser sources, local field emission sources, organic emitter arrays, and so forth. Additionally, FIG. 1B illustrates a side view in the xz plane, and includes illuminator array 15, SLM 48, extraction features 12, guiding features 10, and stepped waveguide 1, arranged as shown. The side view provided in FIG. 1B is an alternative view of the front view shown in FIG. 1A. Accordingly, the illuminator array 15 of FIGS. 1A and 1B corresponds to one another and the stepped waveguide 1 of FIGS. 1A and 1B may correspond to one another.

Further, in FIG. 1B, the stepped waveguide 1 may have an input end 2 that is thin and a reflective end 4 that is thick. Thus the waveguide 1 extends between the input end 2 that receives input light and the reflective end 4 that reflects the input light back through the waveguide 1. The length of the input end 2 in a lateral direction across the waveguide is greater than the height of the input end 2. The illuminator elements 15a-15n are disposed at different input positions in a lateral direction across the input end 2.

The waveguide 1 has first and second, opposed guide surfaces extending between the input end 2 and the reflective end 4 for guiding light forwards and back along the waveguide 1. The second guide surface has a plurality of light extraction features 12 facing the reflective end 4 and arranged to reflect at least some of the light guided back through the waveguide 1 from the reflective end from different input positions across the input end in different directions through the first guide surface that are dependent on the input position.

In this example, the light extraction features 12 are reflective facets, although other reflective features could be used. The light extraction features 12 do not guide light through the waveguide, whereas the intermediate regions of the second guide surface intermediate the light extraction features 12 guide light without extracting it. Those regions of the second guide surface are planar and may extend parallel to the first guide surface, or at a relatively low inclination. The light extraction features 12 extend laterally to those regions so that the second guide surface has a stepped shape which may include the light extraction features 12 and intermediate regions. The light extraction features 12 are oriented to reflect light from the light sources, after reflection from the reflective end 4, through the first guide surface.

The light extraction features 12 are arranged to direct input light from different input positions in the lateral direction across the input end in different directions relative to the first guide surface that are dependent on the input position. As the illumination elements 15a-15n are arranged at different input positions, the light from respective illumination elements 15a-15n is reflected in those different directions. In this manner, each of the illumination elements 15a-15n directs light into a respective optical window in output directions distributed in the lateral direction in dependence on the input positions. The lateral direction across the input end 2 in which the input positions are distributed corresponds with regard to the output light to a lateral direction to the normal to the first guide surface. The lateral directions as defined at the input end 2 and with regard to the output light remain parallel in this embodiment where the deflections at the reflective end 4 and the first guide surface are generally orthogonal to the lateral direction. Under the control of a control system, the illuminator elements 15a-15n may be selectively operated to direct light into a selectable optical window. The optical windows may be used individually or in groups as viewing windows.

The SLM 48 extends across the waveguide and modulates the light output therefrom. Although the SLM 48 may a liquid crystal display (LCD), this is merely by way of example and other spatial light modulators or displays may be used including LCOS, DLP devices, and so forth, as this illuminator may work in reflection. In this example, the SLM 48 is disposed across the first guide surface of the waveguide and modulates the light output through the first guide surface after reflection from the light extraction features 12.

The operation of a directional display device that may provide a one dimensional array of viewing windows is illustrated in front view in FIG. 1A, with its side profile shown in FIG. 1B. In operation, in FIGS. 1A and 1B, light may be emitted from an illuminator array 15, such as an array of illuminator elements 15a through 15n, located at different positions, y, along the surface of thin end side 2, x=0, of the stepped waveguide 1. The light may propagate along +x in a first direction, within the stepped waveguide 1, while at the same time, the light may fan out in the xy plane and upon reaching the far curved end side 4, may substantially or entirely fill the curved end side 4. While propagating, the light may spread out to a set of angles in the xz plane up to, but not exceeding the critical angle of the guide material. The extraction features 12 that link the guiding features 10 of the bottom side of the stepped waveguide 1 may have a tilt angle greater than the critical angle and hence may be missed by substantially all light propagating along +x in the first direction, ensuring the substantially lossless forward propagation.

Continuing the discussion of FIGS. 1A and 1B, the curved end side 4 of the stepped waveguide 1 may be made reflective, typically by being coated with a reflective material such as, for example, silver, although other reflective techniques may be employed. Light may therefore be redirected in a second direction, back down the guide in the direction of −x and may be substantially collimated in the xy or display plane. The angular spread may be substantially preserved in the xz plane about the principal propagation direction, which may allow light to hit the riser edges and reflect out of the guide. In an embodiment with approximately 45 degree tilted extraction features 12, light may be effectively directed approximately normal to the xy display plane with the xz angular spread substantially maintained relative to the propagation direction. This angular spread may be increased when light exits the stepped waveguide 1 through refraction, but may be decreased somewhat dependent on the reflective properties of the extraction features 12.

In some embodiments with uncoated extraction features 12, reflection may be reduced when total internal reflection (TIR) fails, squeezing the xz angular profile and shifting off normal. However, in other embodiments having silver coated or metallized extraction features, the increased angular spread and central normal direction may be preserved. Continuing the description of the embodiment with silver coated extraction features, in the xz plane, light may exit the stepped waveguide 1 approximately collimated and may be directed off normal in proportion to the y-position of the respective illuminator element 15a-15n in illuminator array 15 from the input edge center. Having independent illuminator elements 15a-15n along the input edge 2 then enables light to exit from the entire first light directing side 6 and propagate at different external angles, as illustrated in FIG. 1A.

Figure 2A:
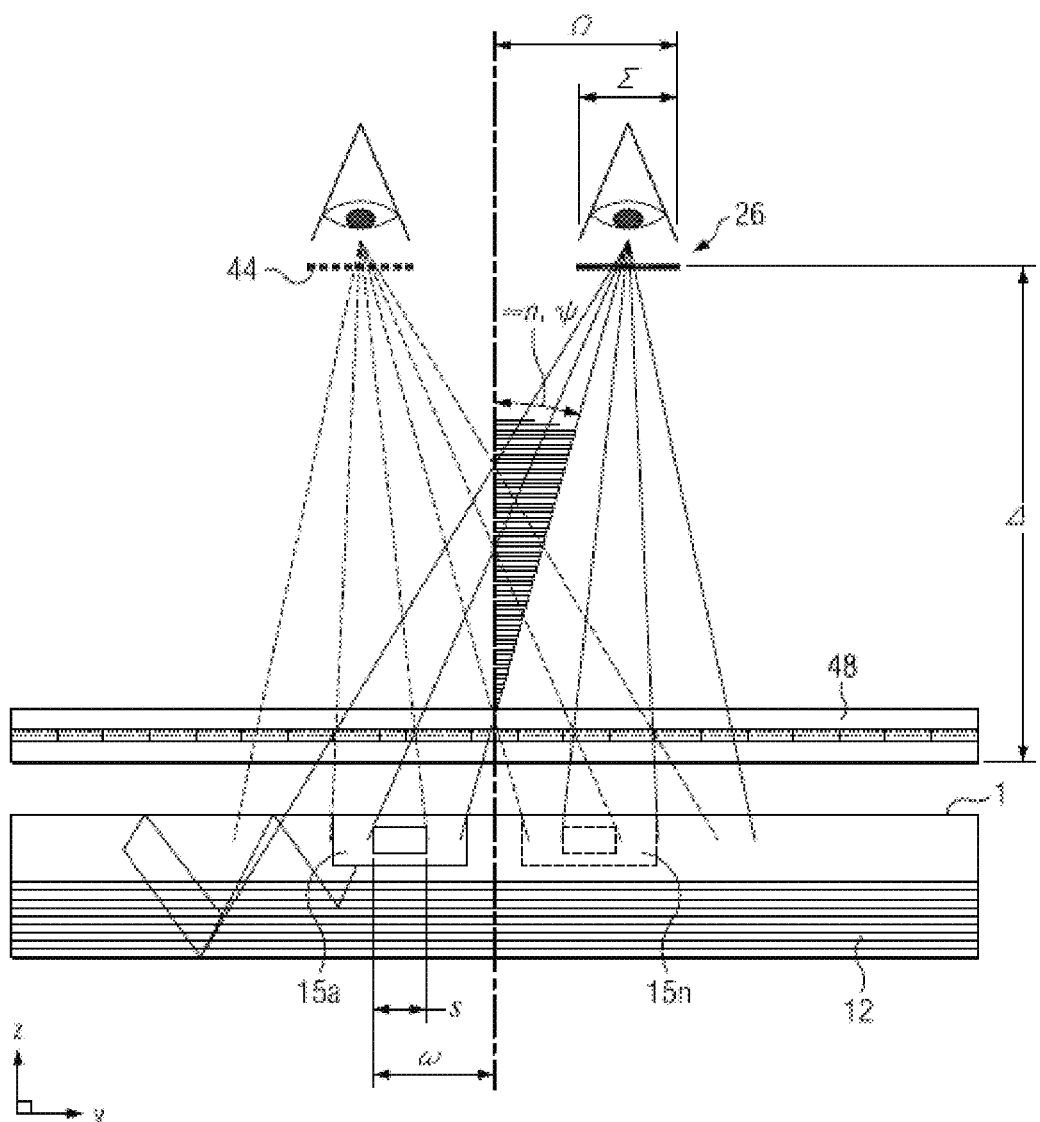
FIG. 2A is a schematic diagram illustrating in a top view of light propagation in another embodiment of a directional display device, in accordance with the present disclosure.
Figure 2B:
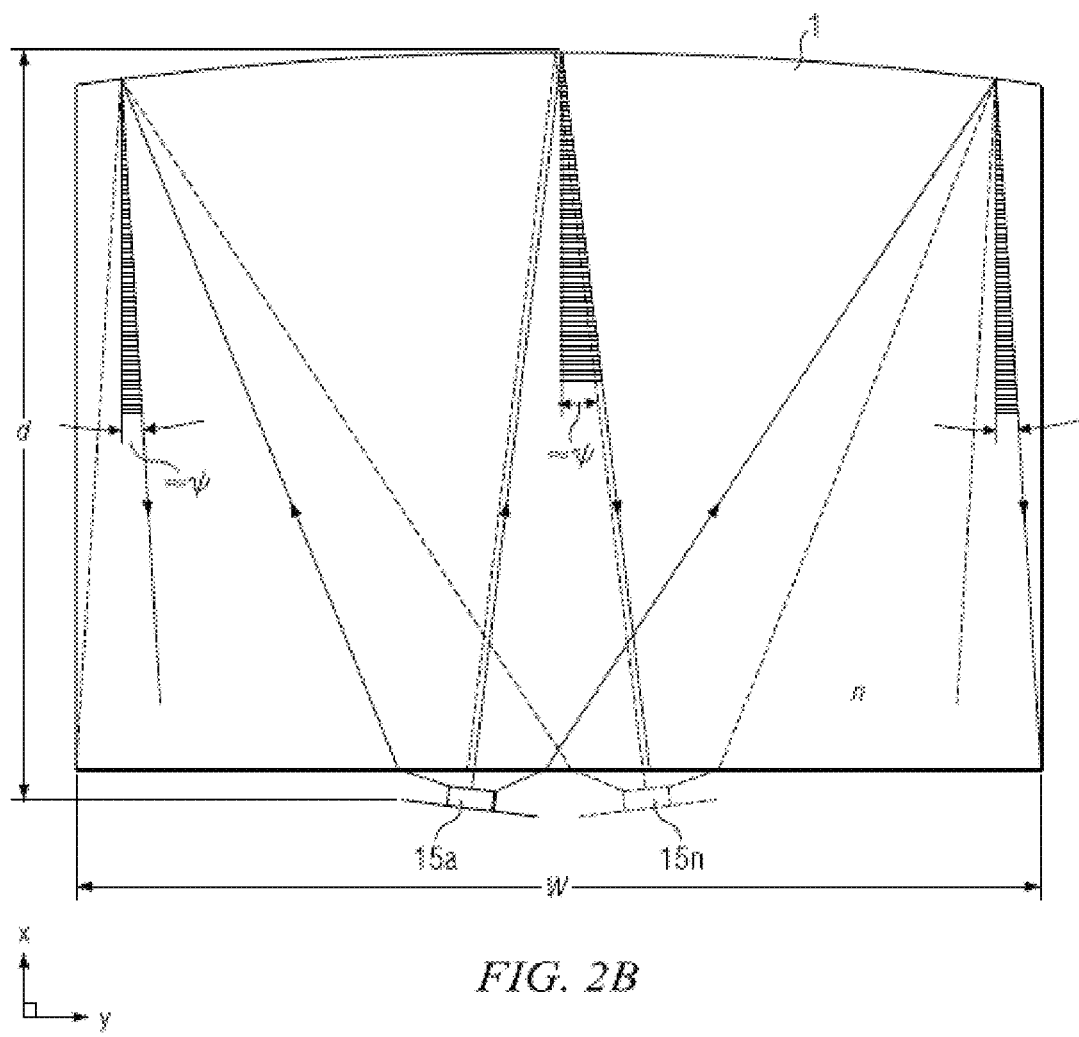
FIG. 2B is a schematic diagram illustrating light propagation in a front view of the directional display device of FIG. 2A, in accordance with the present disclosure.
Figure 2C:
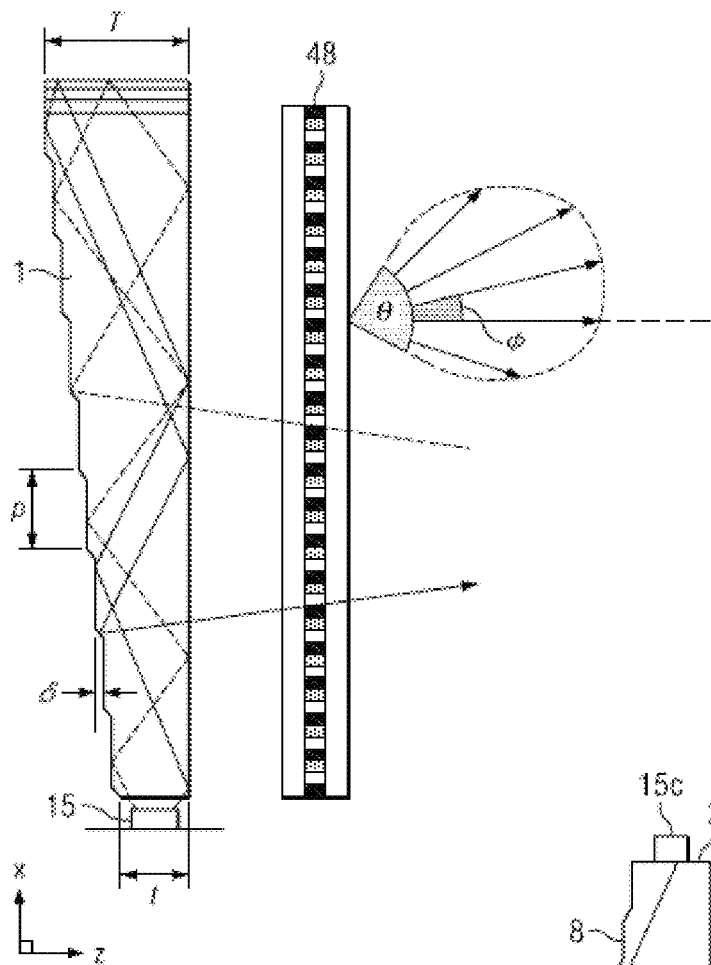
FIG. 2C is a schematic diagram illustrating light propagation in a side view of the directional display device of FIG. 2A, in accordance with the present disclosure.

Illuminating a spatial light modulator (SLM) 48 such as a fast liquid crystal display (LCD) panel with such a device may achieve autostereoscopic 3D as shown in top view or yz-plane viewed from the illuminator array 15 end in FIG. 2A, front view in FIG. 2B and side view in FIG. 2C. FIG. 2A is a schematic diagram illustrating in a top view, propagation of light in a directional display device, FIG. 2B is a schematic diagram illustrating in a front view, propagation of light in a directional display device, and FIG. 2C is a schematic diagram illustrating in side view propagation of light in a directional display device. As illustrated in FIGS. 2A, 2B, and 2C, a stepped waveguide 1 may be located behind a fast (e.g., greater than 100 Hz) LCD panel SLM 48 that displays sequential right and left eye images. In synchronization, specific illuminator elements 15a through 15n of illuminator array 15 (where n is an integer greater than one) may be selectively turned on and off, providing illuminating light that enters right and left eyes substantially independently by virtue of the system's directionality. In the simplest case, sets of illuminator elements of illuminator array 15 are turned on together, providing a one dimensional viewing window 26 or an optical pupil with limited width in the horizontal direction, but extended in the vertical direction, in which both eyes horizontally separated may view a left eye image, and another viewing window 44 in which a right eye image may primarily be viewed by both eyes, and a central position in which both the eyes may view different images. In this way, 3D may be viewed when the head of a viewer is approximately centrally aligned. Movement to the side away from the central position may result in the scene collapsing onto a 2D image.

The reflective end 4 may have positive optical power in the lateral direction across the waveguide. In embodiments in which typically the reflective end 4 has positive optical power, the optical axis may be defined with reference to the shape of the reflective end 4, for example being a line that passes through the center of curvature of the reflective end 4 and coincides with the axis of reflective symmetry of the end 4 about the x-axis. In the case that the reflecting surface 4 is flat, the optical axis may be similarly defined with respect to other components having optical power, for example the light extraction features 12 if they are curved, or the Fresnel lens 62 described below. The optical axis 238 is typically coincident with the mechanical axis of the waveguide 1. In the present embodiments that typically comprise a substantially cylindrical reflecting surface at end 4, the optical axis 238 is a line that passes through the center of curvature of the surface at end 4 and coincides with the axis of reflective symmetry of the side 4 about the x-axis. The optical axis 238 is typically coincident with the mechanical axis of the waveguide 1. The cylindrical reflecting surface at end 4 may typically comprise a spherical profile to optimize performance for on-axis and off-axis viewing positions. Other profiles may be used.

Figure 3:
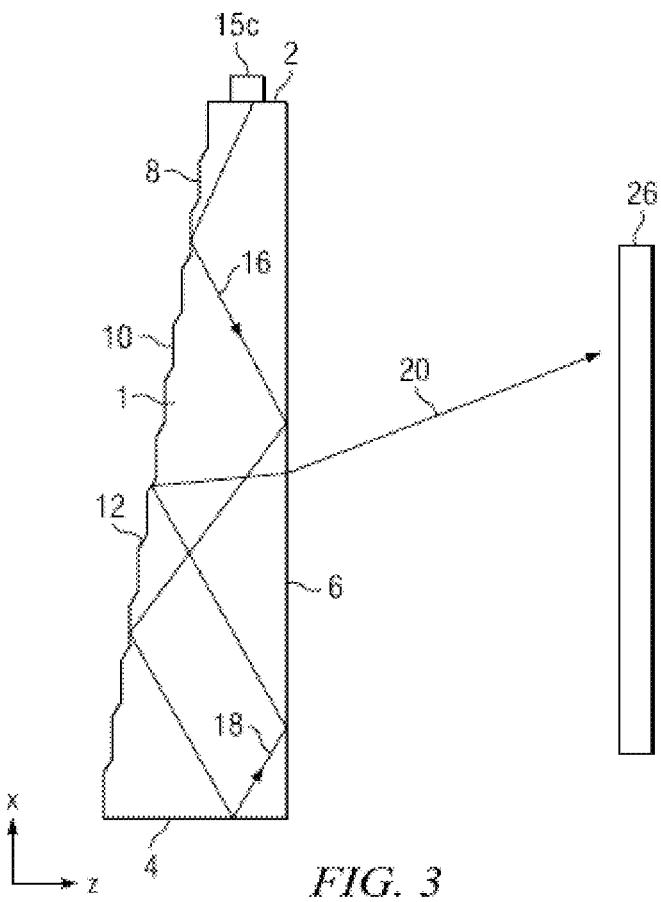
FIG. 3 is a schematic diagram illustrating in a side view of a directional display device, in accordance with the present disclosure.

FIG. 3 is a schematic diagram illustrating in side view a directional display device. Further, FIG. 3 illustrates additional detail of a side view of the operation of a stepped waveguide 1, which may be a transparent material. The stepped waveguide 1 may include an illuminator input side 2, a reflective side 4, a first light directing side 6 which may be substantially planar, and a second light directing side 8 which includes guiding features 10 and light extraction features 12. In operation, light rays 16 from an illuminator element 15c of an illuminator array 15 (not shown in FIG. 3), that may be an addressable array of LEDs for example, may be guided in the stepped waveguide 1 by means of total internal reflection by the first light directing side 6 and total internal reflection by the guiding feature 10, to the reflective side 4, which may be a mirrored surface. Although reflective side 4 may be a mirrored surface and may reflect light, it may in some embodiments also be possible for light to pass through reflective side 4.

Continuing the discussion of FIG. 3, light ray 18 reflected by the reflective side 4 may be further guided in the stepped waveguide 1 by total internal reflection at the reflective side 4 and may be reflected by extraction features 12. Light rays 18 that are incident on extraction features 12 may be substantially deflected away from guiding modes of the stepped waveguide 1 and may be directed, as shown by ray 20, through the side 6 to an optical pupil that may form a viewing window 26 of an autostereoscopic display. The width of the viewing window 26 may be determined by at least the size of the illuminator, output design distance and optical power in the side 4 and extraction features 12. The height of the viewing window may be primarily determined by the reflection cone angle of the extraction features 12 and the illumination cone angle input at the input side 2. Thus each viewing window 26 represents a range of separate output directions with respect to the surface normal direction of the spatial light modulator 48 that intersect with a plane at the nominal viewing distance.

Figure 4A:
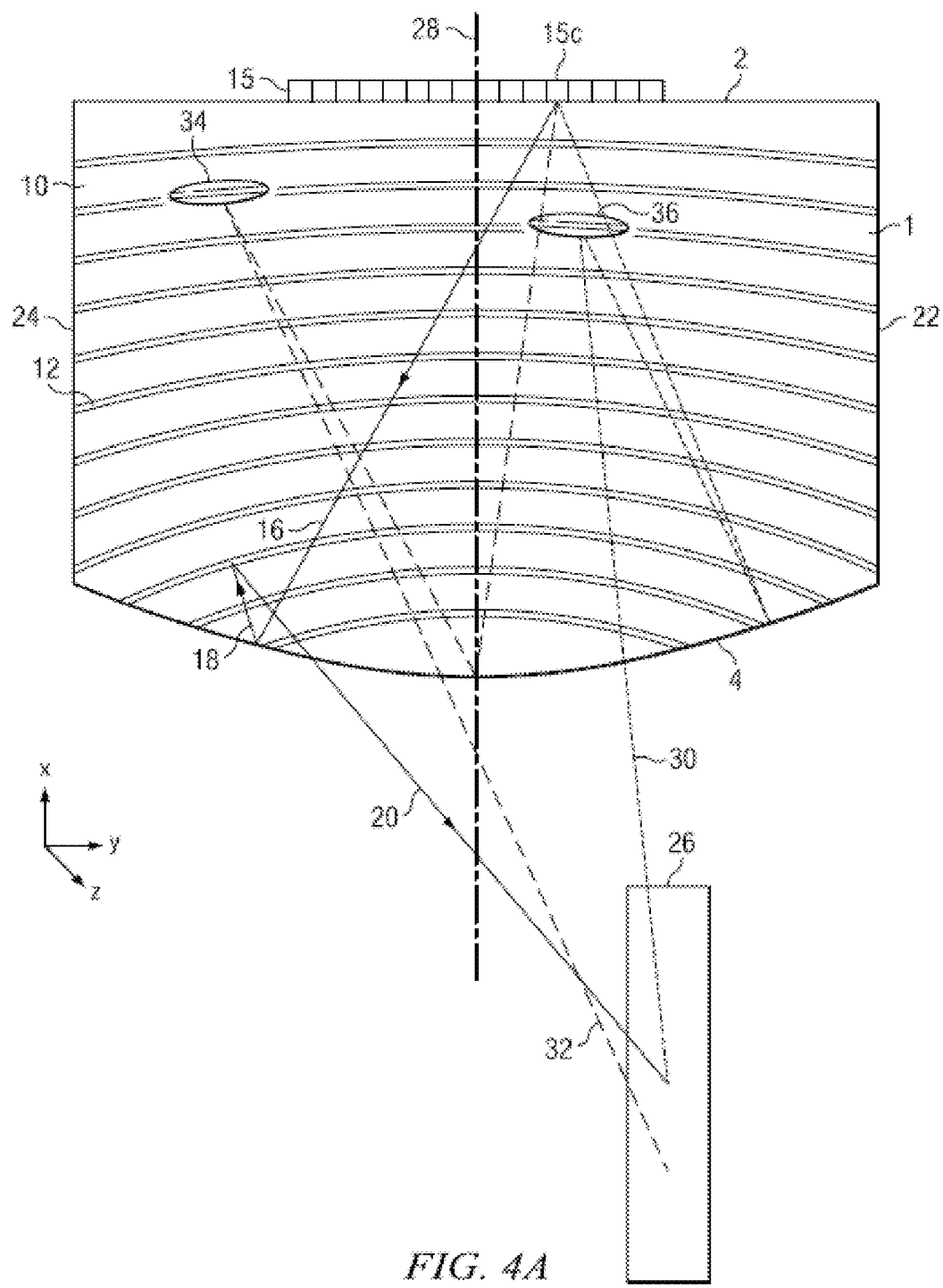
FIG. 4A is a schematic diagram illustrating in a front view, generation of a viewing window in a directional display device including curved light extraction features, in accordance with the present disclosure.

FIG. 4A is a schematic diagram illustrating in front view a directional display device which may be illuminated by a first illuminator element and including curved light extraction features. Further, FIG. 4A shows in front view further guiding of light rays from illuminator element 15c of illuminator array 15, in the stepped waveguide 1. Each of the output rays are directed towards the same viewing window 26 from the respective illuminator 14. Thus light ray 30 may intersect the ray 20 in the window 26, or may have a different height in the window as shown by ray 32. Additionally, in various embodiments, sides 22, 24 of the waveguide 1 may be transparent, mirrored, or blackened surfaces. Continuing the discussion of FIG. 4A, light extraction features 12 may be elongate, and the orientation of light extraction features 12 in a first region 34 of the light directing side 8 (light directing side 8 shown in FIG. 3, but not shown in FIG. 4A) may be different to the orientation of light extraction features 12 in a second region 36 of the light directing side 8.

Figure 4B:
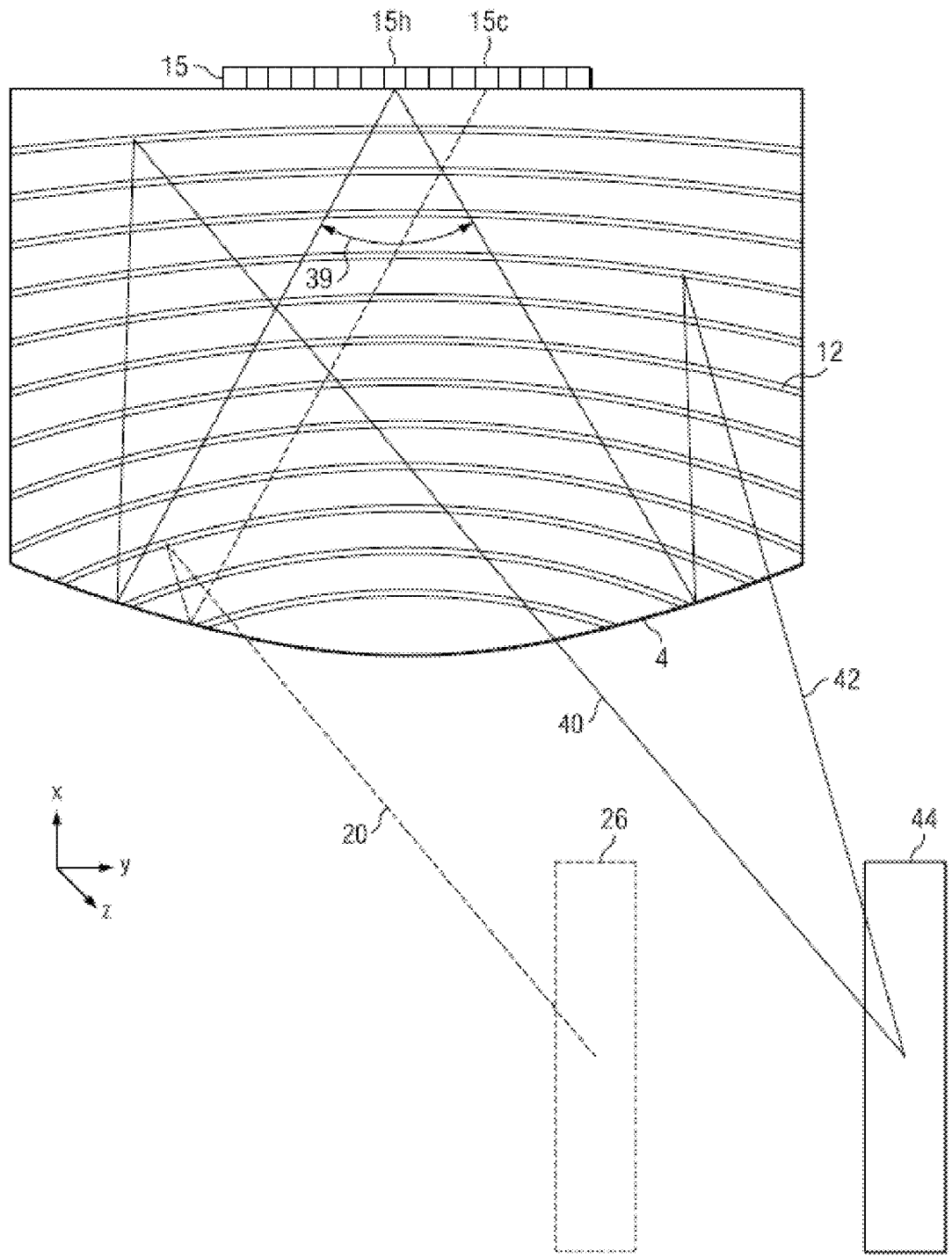
FIG. 4B is a schematic diagram illustrating in a front view, generation of a first and a second viewing window in a directional display device including curved light extraction features, in accordance with the present disclosure.

FIG. 4B is a schematic diagram illustrating in front view an optical valve which may illuminated by a second illuminator element. Further, FIG. 4B shows the light rays 40, 42 from a second illuminator element 15h of the illuminator array 15. The curvature of the reflective end on the side 4 and the light extraction features 12 cooperatively produce a second viewing window 44 laterally separated from the viewing window 26 with light rays from the illuminator element 15h.

Advantageously, the arrangement illustrated in FIG. 4B may provide a real image of the illuminator element 15c at a viewing window 26 in which the real image may be formed by cooperation of optical power in reflective side 4 and optical power which may arise from different orientations of elongate light extraction features 12 between regions 34 and 36, as shown in FIG. 4A. The arrangement of FIG. 4B may achieve improved aberrations of the imaging of illuminator element 15c to lateral positions in viewing window 26. Improved aberrations may achieve an extended viewing freedom for an autostereoscopic display while achieving low cross talk levels.

Figure 5:
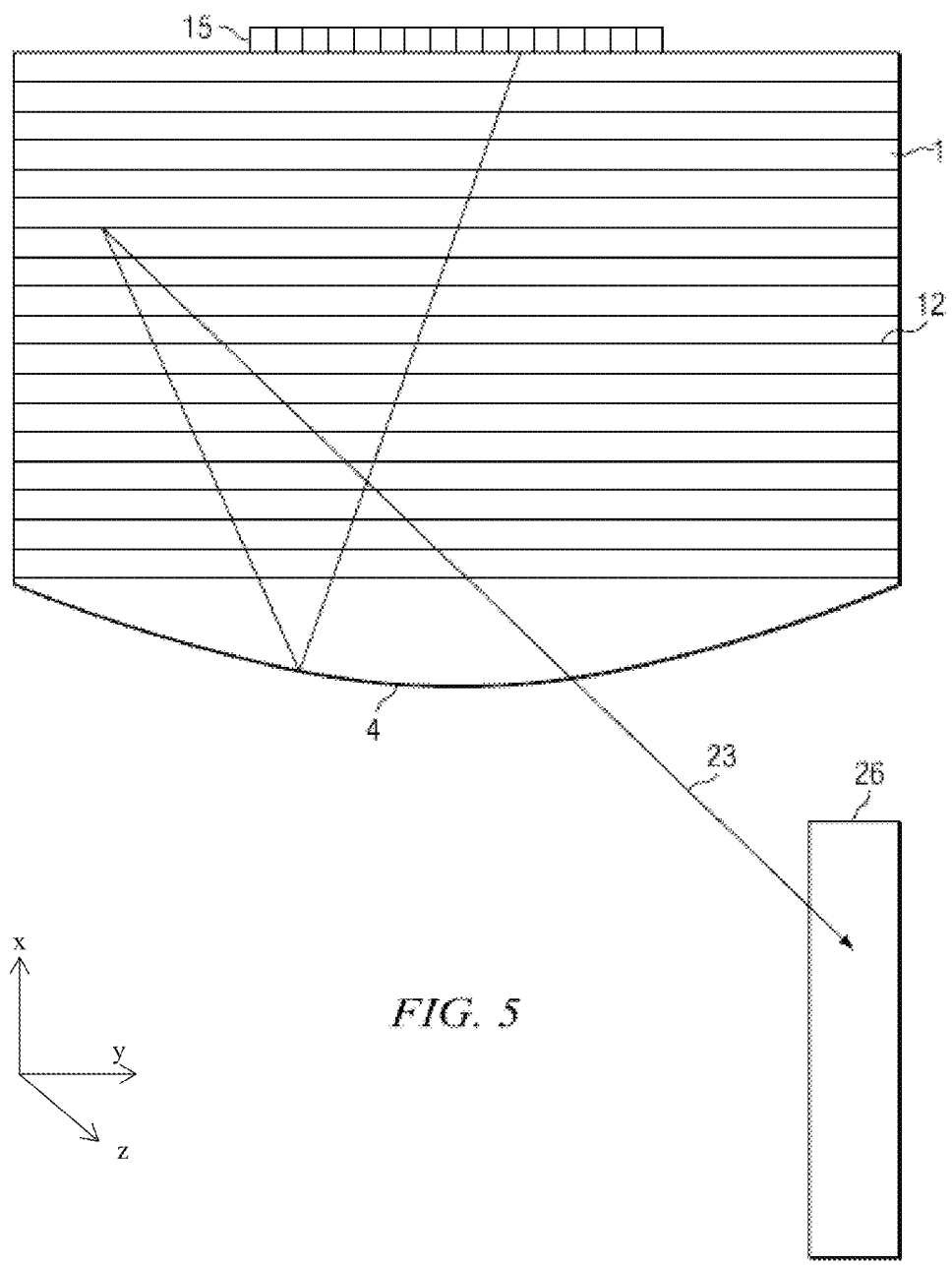
FIG. 5 is a schematic diagram illustrating generation of a first viewing window in a directional display device including linear light extraction features, in accordance with the present disclosure.

FIG. 5 is a schematic diagram illustrating in front view an embodiment of a directional display device having substantially linear light extraction features. Further, FIG. 5 shows a similar arrangement of components to FIG. 1 (with corresponding elements being similar), with one of the differences being that the light extraction features 12 are substantially linear and parallel to each other. Advantageously, such an arrangement may provide substantially uniform illumination across a display surface and may be more convenient to manufacture than the curved extraction features of FIG. 4A and FIG. 4B.

Figure 6A:
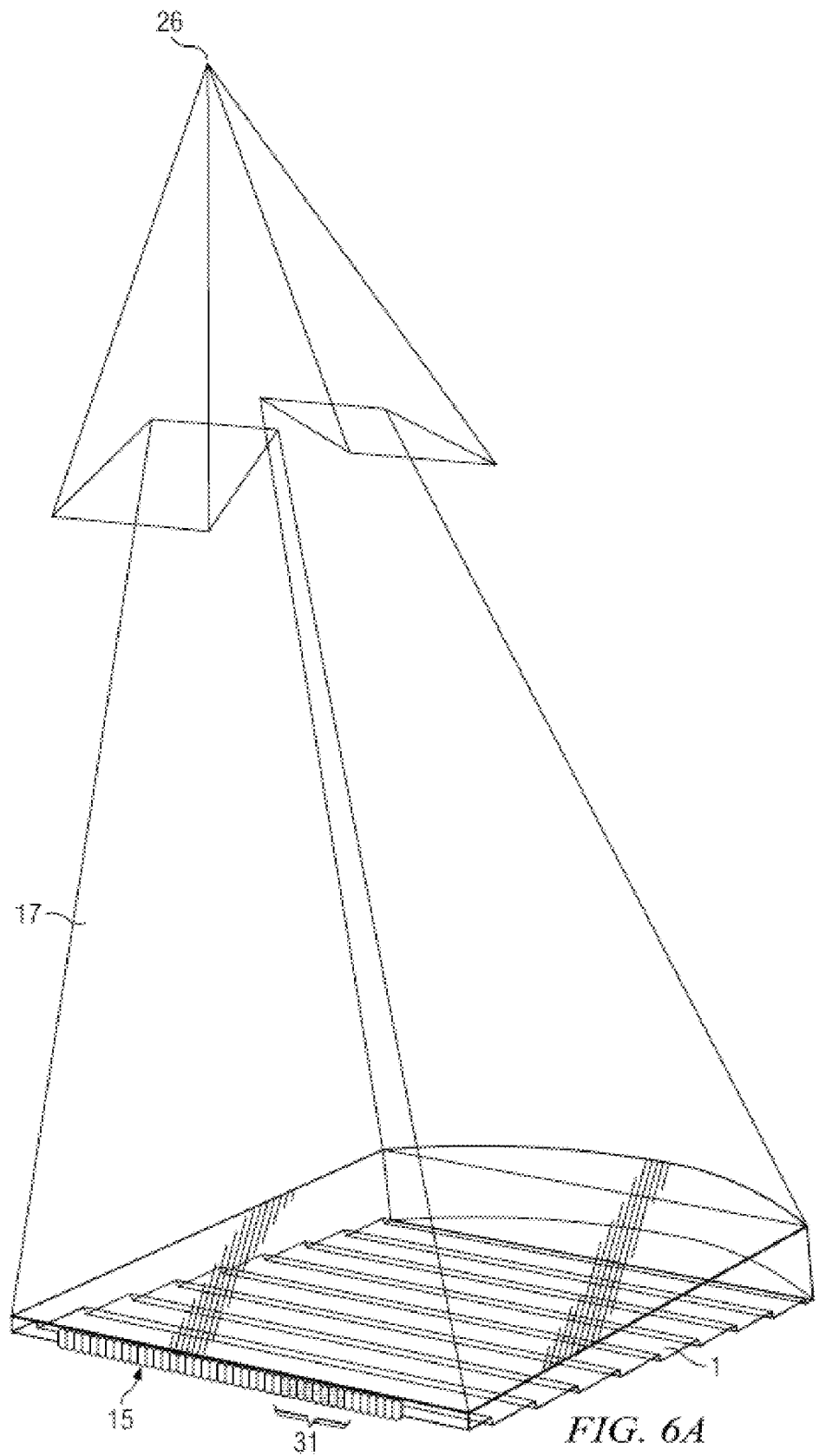
FIG. 6A is a schematic diagram illustrating one embodiment of the generation of a first viewing window in a time multiplexed directional display device in a first time slot, in accordance with the present disclosure.
Figure 6B:
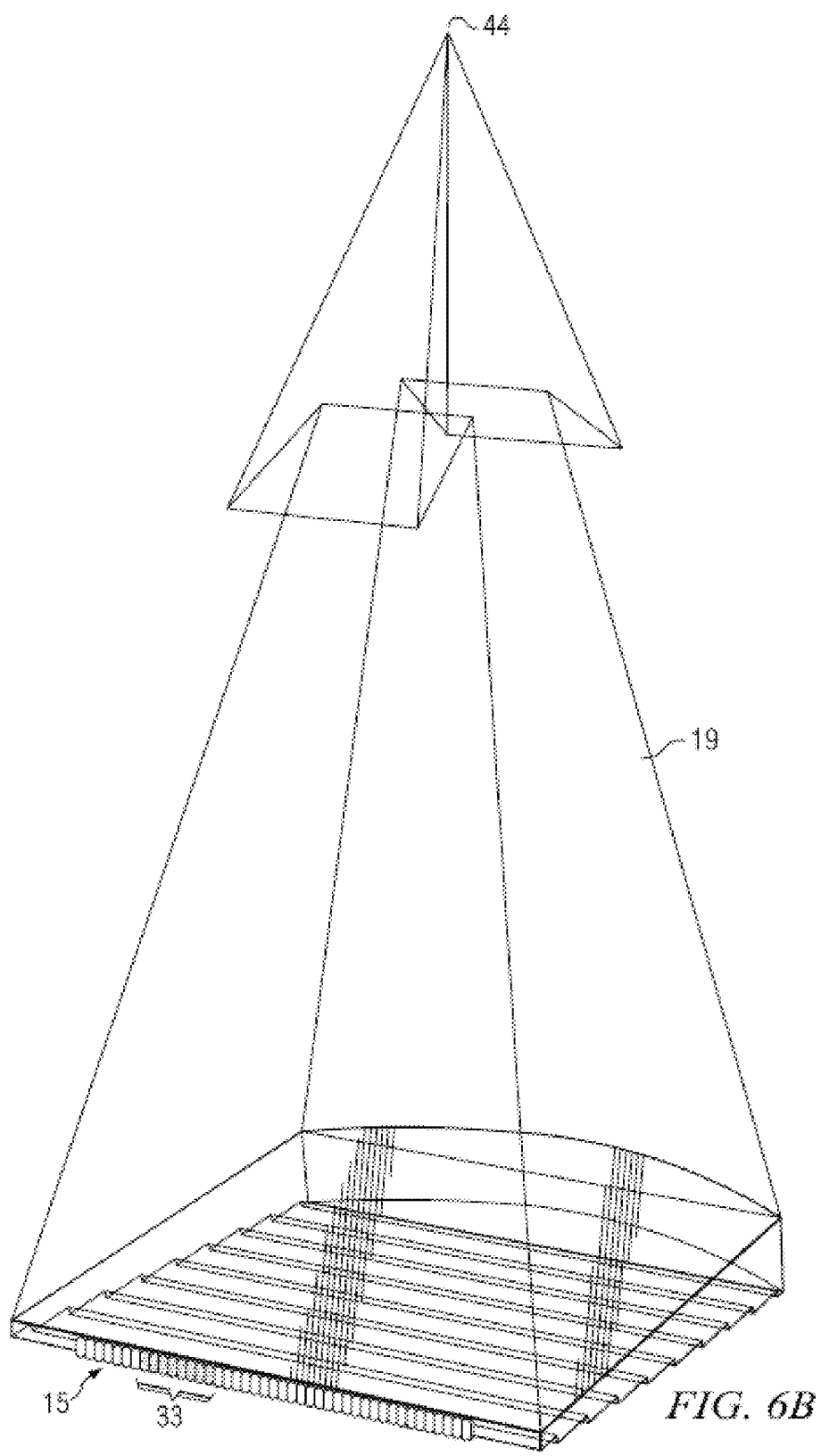
FIG. 6B is a schematic diagram illustrating another embodiment of the generation of a second viewing window in a time multiplexed directional display device in a second time slot, in accordance with the present disclosure.
Figure 6C:
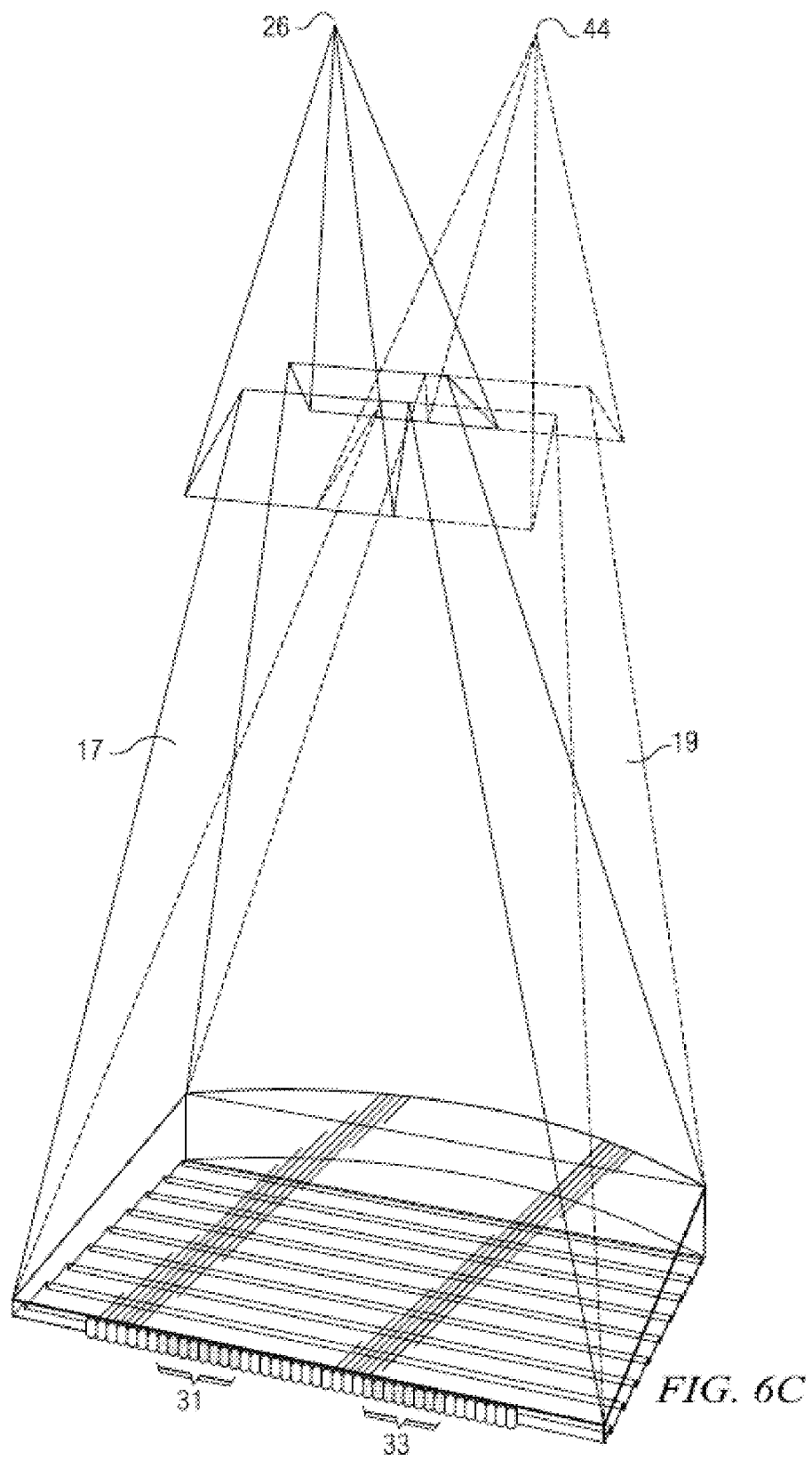
FIG. 6C is a schematic diagram illustrating another embodiment of the generation of a first and a second viewing window in a time multiplexed directional display device, in accordance with the present disclosure.

FIG. 6A is a schematic diagram illustrating one embodiment of the generation of a first viewing window in a time multiplexed imaging directional display device in a first time slot, FIG. 6B is a schematic diagram illustrating another embodiment of the generation of a second viewing window in a time multiplexed imaging directional backlight apparatus in a second time slot, and FIG. 6C is a schematic diagram illustrating another embodiment of the generation of a first and a second viewing window in a time multiplexed imaging directional display device. Further, FIG. 6A shows schematically the generation of illumination window 26 from stepped waveguide 1. Illuminator element group 31 in illuminator array 15 may provide a light cone 17 directed towards a viewing window 26. FIG. 6B shows schematically the generation of illumination window 44. Illuminator element group 33 in illuminator array 15 may provide a light cone 19 directed towards viewing window 44. In cooperation with a time multiplexed display, windows 26 and 44 may be provided in sequence as shown in FIG. 6C. If the image on a spatial light modulator 48 (not shown in FIGS. 6A, 6B, 6C) is adjusted in correspondence with the light direction output, then an autostereoscopic image may be achieved for a suitably placed viewer. Similar operation can be achieved with all the directional backlights described herein. Note that illuminator element groups 31, 33 each include one or more illumination elements from illumination elements 15a to 15n, where n is an integer greater than one.

Figure 7:
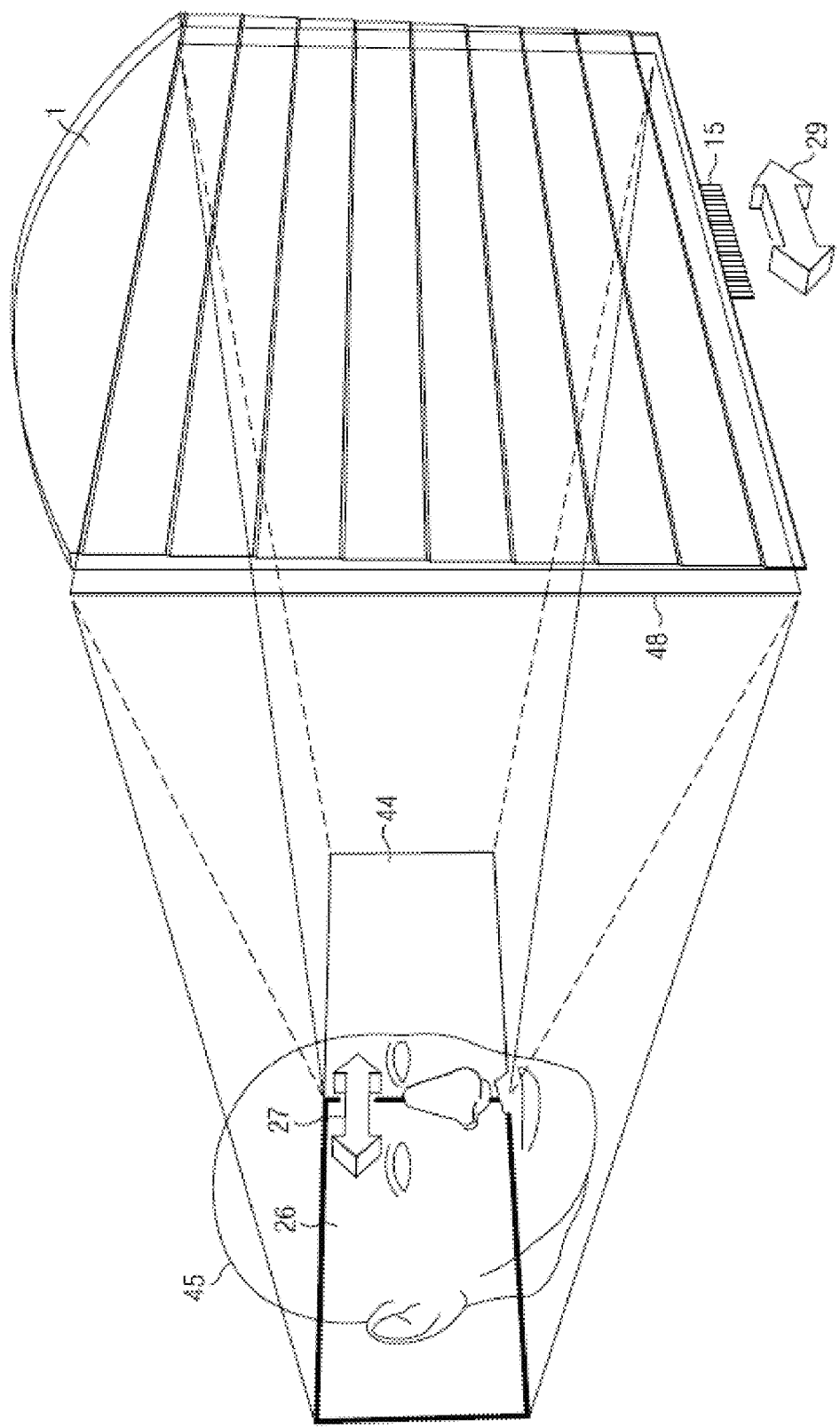
FIG. 7 is a schematic diagram illustrating an observer tracking autostereoscopic directional display device, in accordance with the present disclosure.

FIG. 7 is a schematic diagram illustrating one embodiment of an observer tracking autostereoscopic directional display device. As shown in FIG. 7, selectively turning on and off illuminator elements 15a to 15n along axis 29 provides for directional control of viewing windows. The head 45 position may be monitored with a camera, motion sensor, motion detector, or any other appropriate optical, mechanical or electrical means, and the appropriate illuminator elements of illuminator array 15 may be turned on and off to provide substantially independent images to each eye irrespective of the head 45 position. The head tracking system (or a second head tracking system) may provide monitoring of more than one head 45, 47 (head 47 not shown in FIG. 7) and may supply the same left and right eye images to each viewers' left and right eyes providing 3D to all viewers. Again similar operation can be achieved with all the directional backlights described herein.

Figure 8:
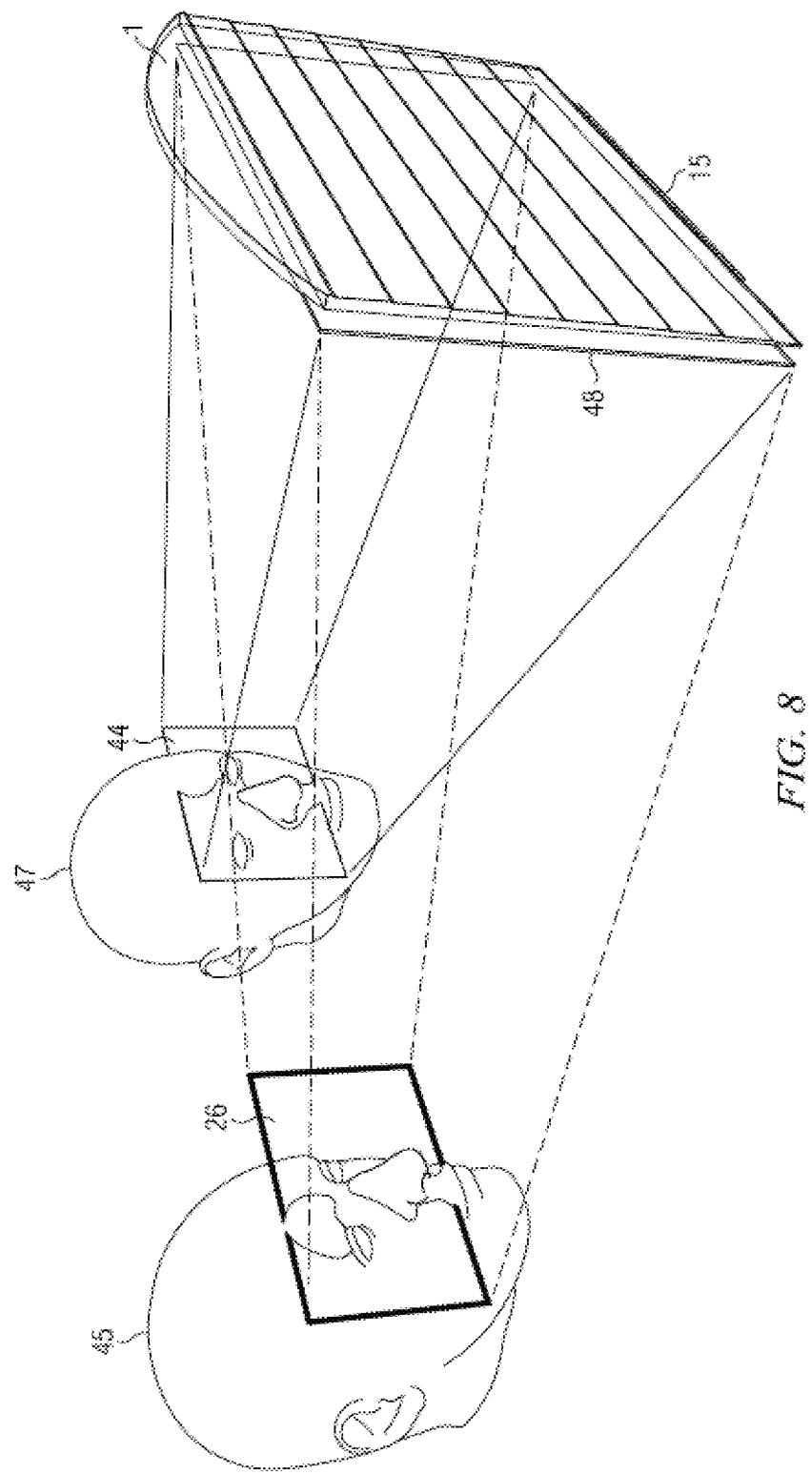
FIG. 8 is a schematic diagram illustrating a multi-viewer directional display device, in accordance with the present disclosure.

FIG. 8 is a schematic diagram illustrating one embodiment of a multi-viewer directional display device as an example including an imaging directional backlight. As shown in FIG. 8, at least two 2D images may be directed towards a pair of viewers 45, 47 so that each viewer may watch a different image on the spatial light modulator 48. The two 2D images of FIG. 8 may be generated in a similar manner as described with respect to FIG. 7 in that the two images would be displayed in sequence and in synchronization with sources whose light is directed toward the two viewers. One image is presented on the spatial light modulator 48 in a first phase, and a second image is presented on the spatial light modulator 48 in a second phase different from the first phase. In correspondence with the first and second phases, the output illumination is adjusted to provide first and second viewing windows 26, 44 respectively. An observer with both eyes in window 26 will perceive a first image while an observer with both eyes in window 44 will perceive a second image.

Figure 9:
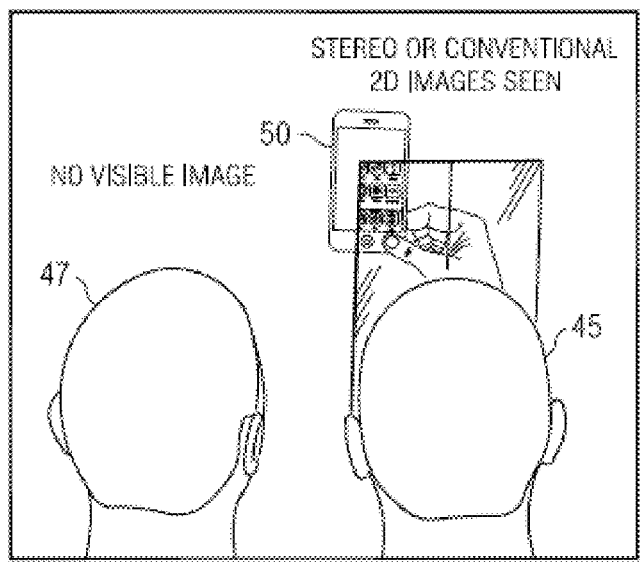
FIG. 9 is a schematic diagram illustrating a privacy directional display device, in accordance with the present disclosure.

FIG. 9 is a schematic diagram illustrating a privacy directional display device which includes an imaging directional backlight. 2D display systems may also utilize directional backlighting for security and efficiency purposes in which light may be primarily directed at the eyes of a first viewer 45 as shown in FIG. 9. Further, as illustrated in FIG. 9, although first viewer 45 may be able to view an image on device 50, light is not directed towards second viewer 47. Thus second viewer 47 is prevented from viewing an image on device 50. Each of the embodiments of the present disclosure may advantageously provide autostereoscopic, dual image or privacy display functions.

Figure 10:
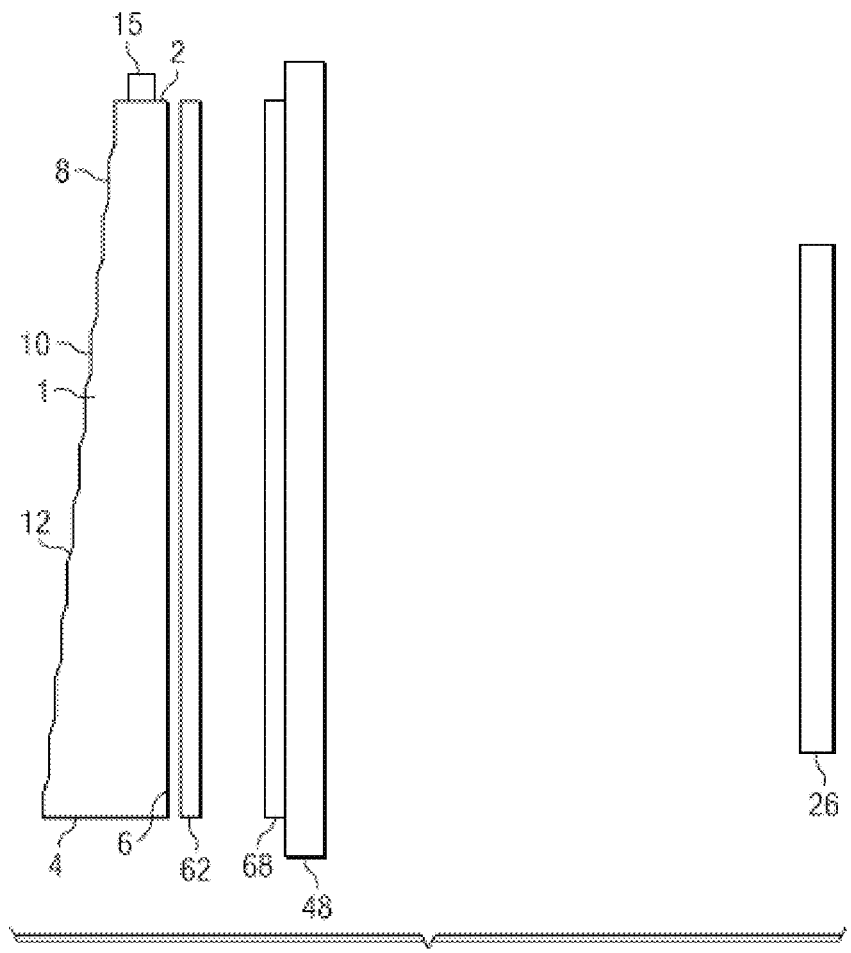
FIG. 10 is a schematic diagram illustrating in side view, the structure of a time multiplexed directional display device, in accordance with the present disclosure.

FIG. 10 is a schematic diagram illustrating in side view the structure of a time multiplexed directional display device as an example including an imaging directional backlight. Further, FIG. 10 shows in side view an autostereoscopic directional display device, which may include the stepped waveguide 1 and a Fresnel lens 62 arranged to provide the viewing window 26 in a window plane 106 at a nominal viewing distance from the spatial light modulator for a substantially collimated output across the stepped waveguide 1 output surface. A vertical diffuser 68 may be arranged to extend the height of the window 26 further. The light may then be imaged through the spatial light modulator 48. The illuminator array 15 may include light emitting diodes (LEDs) that may, for example, be phosphor converted blue LEDs, or may be separate RGB LEDs. Alternatively, the illuminator elements in illuminator array 15 may include a uniform light source and spatial light modulator arranged to provide separate illumination regions. Alternatively the illuminator elements may include laser light source(s). The laser output may be directed onto a diffuser by means of scanning, for example, using a galvo or MEMS scanner. In one example, laser light may thus be used to provide the appropriate illuminator elements in illuminator array 15 to provide a substantially uniform light source with the appropriate output angle, and further to provide reduction in speckle. Alternatively, the illuminator array 15 may be an array of laser light emitting elements. Additionally in one example, the diffuser may be a wavelength converting phosphor, so that illumination may be at a different wavelength to the visible output light.

A further wedge type directional backlight is generally discussed by U.S. Pat. No. 7,660,047 which is herein incorporated by reference in its entirety. The wedge type directional backlight and optical valve further process light beams in different ways. In the wedge type waveguide, light input at an appropriate angle will output at a defined position on a major surface, but light rays will exit at substantially the same angle and substantially parallel to the major surface. By comparison, light input to a stepped waveguide of an optical valve at a certain angle may output from points across the first side, with output angle determined by input angle. Advantageously, the stepped waveguide of the optical valve may not require further light re-direction films to extract light towards an observer and angular non-uniformities of input may not provide non-uniformities across the display surface.

There will now be described some waveguides, directional backlights and directional display devices that are based on and incorporate the structures of FIGS. 1 to 10 above. Except for the modifications and/or additional features which will now be described, the above description applies equally to the following waveguides, directional backlights and display devices, but for brevity will not be repeated. The waveguides described below may be incorporated into a directional backlight or a directional display device as described above. Similarly, the directional backlights described below may be incorporated into a directional display device as described above.

Figure 11:
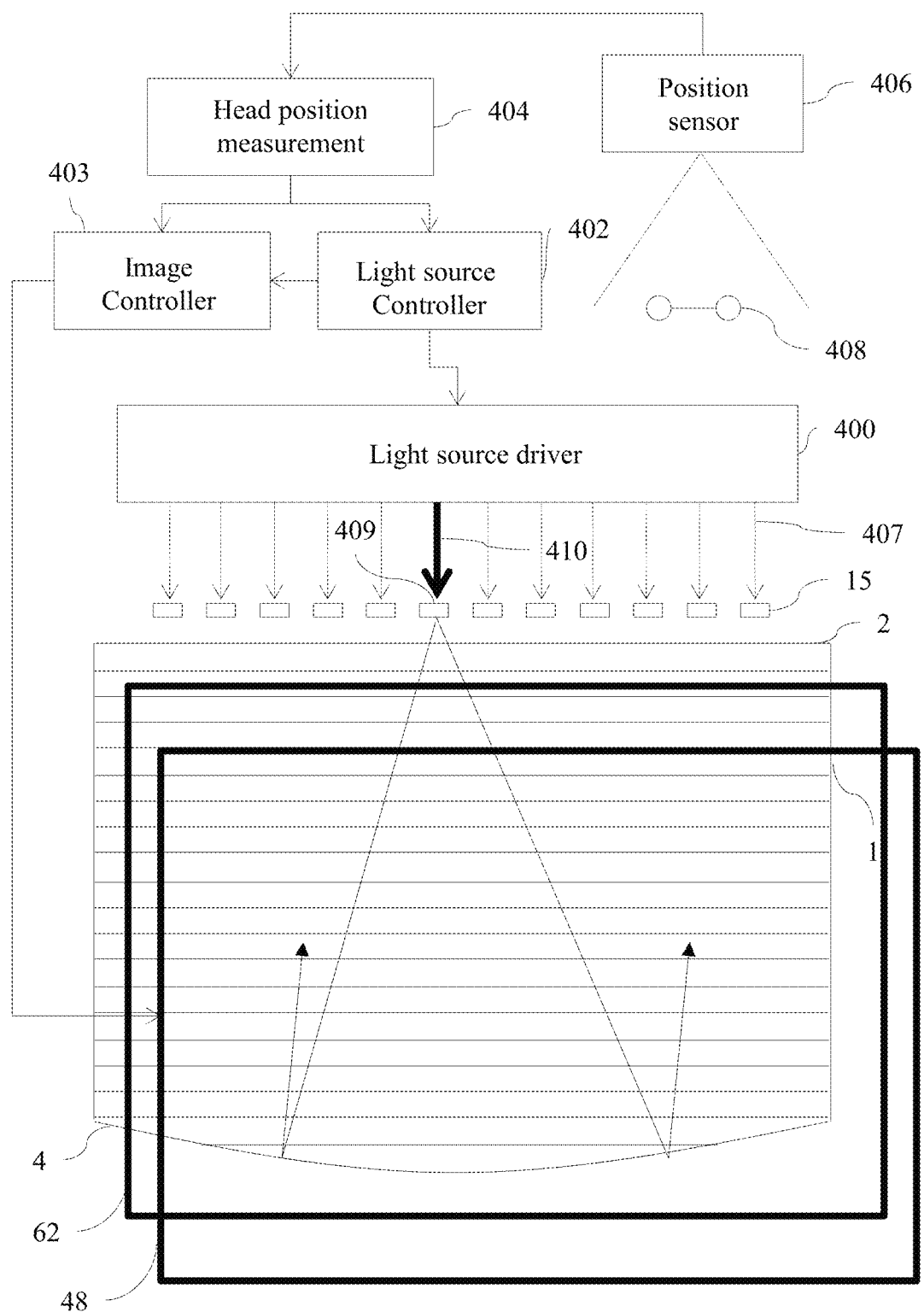
FIG. 11 is a schematic diagram illustrating a directional display apparatus comprising a directional display device and a control system, in accordance with the present disclosure.

FIG. 11 is a schematic diagram illustrating a directional display apparatus comprising a directional display device and a control system. The arrangement and operation of the control system will now be described and may be applied, with changes as necessary, to each of the display devices disclosed herein. The directional backlight comprises a waveguide 1 and an array 15 of illumination elements 15a-15n arranged as described above. The control system is arranged to selectively operate the illumination elements 15a-15n to direct light into selectable viewing windows.

The reflective end 4 converges the reflected light. Fresnel lens 62 may be arranged to cooperate with reflective end 4 to achieve viewing windows at a viewing plane. Transmissive spatial light modulator 48 may be arranged to receive the light from the directional backlight. The image displayed on the SLM 48 may be presented in synchronization with the illumination of the light sources of the array 15.

The control system may comprise a sensor system arranged to detect the position of the observer 99 relative to the display device 100. The sensor system comprises a position sensor 406, such as a camera arranged to determine the position of an observer 408; and a head position measurement system 404 that may for example comprise a computer vision image processing system. The position sensor 406 may comprise known sensors including those comprising cameras and image processing units arranged to detect the position of observer faces. Position sensor 406 may further comprise a stereo sensor arranged to improve the measure of longitudinal position compared to a monoscopic camera. Alternatively position sensor 406 may comprise measurement of eye spacing to give a measure of required placement of respective arrays of viewing windows from tiles of the directional display.

The control system may further comprise an illumination controller and an image controller 403 that are both supplied with the detected position of the observer supplied from the head position measurement system 404.

The illumination controller comprises an LED controller 402 arranged to determine which light sources of array 15 should be switched to direct light to respective eyes of observer 408 in cooperation with waveguide 1; and an LED driver 400 arranged to control the operation of light sources of light source array 15 by means of drive lines 407. The illumination controller 74 selects the illuminator elements 15 to be operated in dependence on the position of the observer detected by the head position measurement system 72, so that the viewing windows 26 into which light is directed are in positions corresponding to the left and right eyes of the observer 99. In this manner, the lateral output directionality of the waveguide 1 corresponds with the observer position.

The image controller 403 is arranged to control the SLM 48 to display images. To provide an autostereoscopic display, the image controller 403 and the illumination controller may operate as follows. The image controller 403 controls the SLM 48 to display temporally multiplexed left and right eye images and the LED controller 402 operates the light sources 15 to direct light into viewing windows in positions corresponding to the left and right eyes of an observer synchronously with the display of left and right eye images. In this manner, an autostereoscopic effect is achieved using a time division multiplexing technique. In one example, a single viewing window may be illuminated by operation of light source 409 (which may comprise one or more LEDs) by means of drive line 410 wherein other drive lines are not driven as described elsewhere.

The head position measurement system 404 detects the position of an observer relative to the display device 100. The LED controller 402 selects the light sources 15 to be operated in dependence on the position of the observer detected by the head position measurement system 404, so that the viewing windows into which light is directed are in positions corresponding to the left and right eyes of the observer. In this manner, the output directionality of the waveguide 1 may be achieved to correspond with the viewer position so that a first image may be directed to the observer's right eye in a first phase and directed to the observer's left eye in a second phase.

Figure 12:
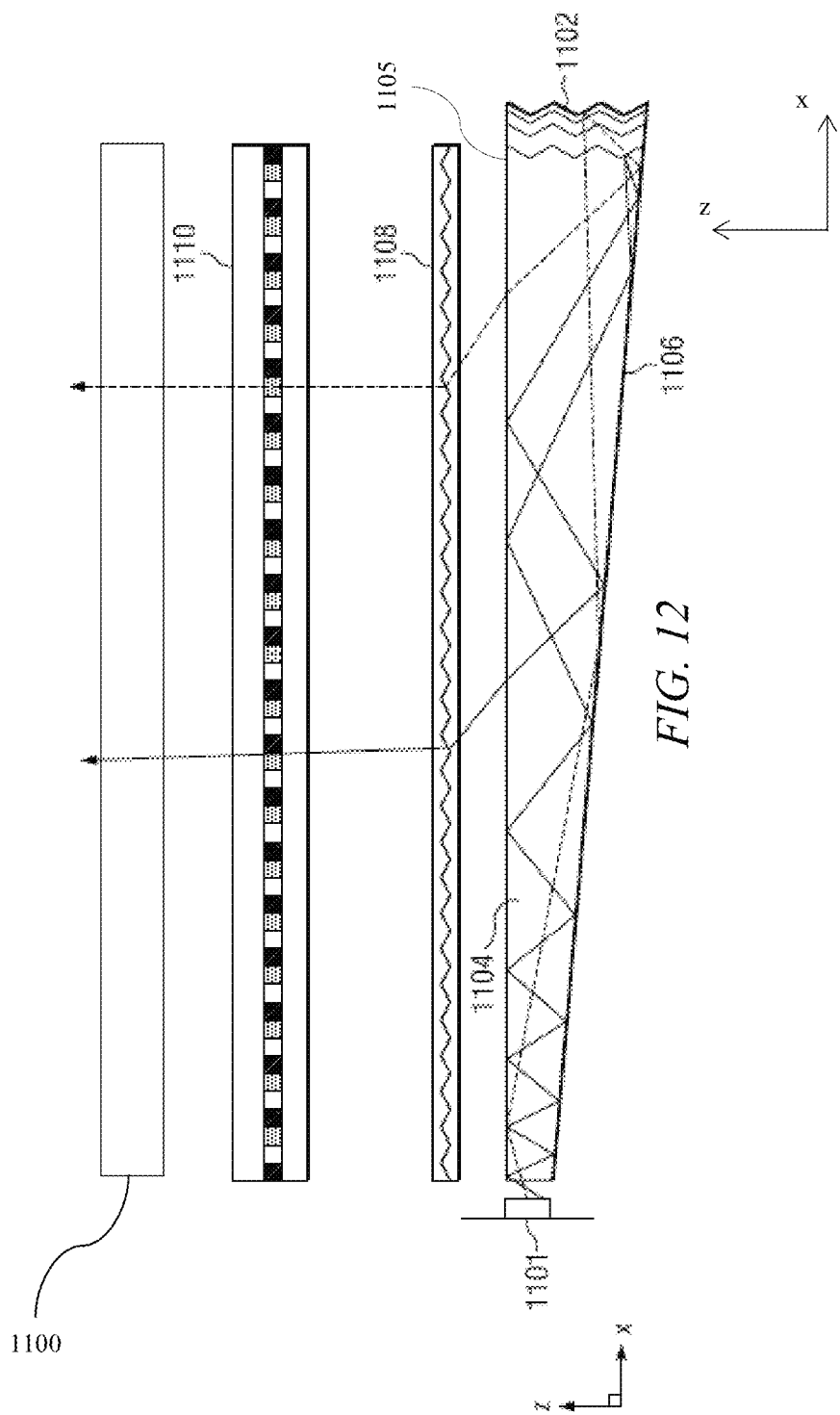
FIG. 12 is a schematic diagram illustrating in side view, the structure of a directional display device comprising a wedge waveguide, in accordance with the present disclosure.

FIG. 12 is a schematic diagram illustrating in side view, the structure of a directional display device comprising a wedge directional backlight comprising a wedge waveguide 1104 with faceted mirror end 1102. The first guide surface 1105 of the waveguide 1104 is arranged to guide light by total internal reflection and the second guide surface 1106 is substantially planar and inclined at an angle to direct light in directions that break the total internal reflection for outputting light through the first guide surface 1105. The display device further comprises a deflection element 1108 extending across the first guide surface 1105 of the waveguide 1104 for deflecting light from array 1101 of light sources towards the normal to the first guide surface 1105. Further the waveguide 1104 may further comprise a reflective end 1102 for reflecting input light back through the waveguide 1104, the second guide 1106 surface being arranged to deflect light as output light through the first guide surface 1105 after reflection from the reflective end 1102. The reflective end has positive optical power in the lateral direction (y-axis) in a similar manner to the reflective end shown in FIG. 5 for example. Further facets in the reflective end 1102 deflect the reflected light cones within the waveguide 1104 to achieve output coupling on the return path. Thus viewing windows are produced in a similar manner to that shown in FIG. 11. Further the directional display may comprise a spatial light modulator 1110 and parallax element 1100 aligned to the spatial light modulator 1110 that is further arranged to provide optical windows. A control system 72 similar to that shown in FIG. 11 may be arranged to provide control of directional illumination providing viewing windows 26 and windows 109 from the parallax element and aligned spatial light modulator.

Thus a first guide surface may be arranged to guide light by total internal reflection and the second guide surface may be substantially planar and inclined at an angle to direct light in directions that break that total internal reflection for outputting light through the first guide surface, and the display device may further comprise a deflection element extending across the first guide surface of the waveguide for deflecting light towards the normal to the first guide surface.

Figure 13:
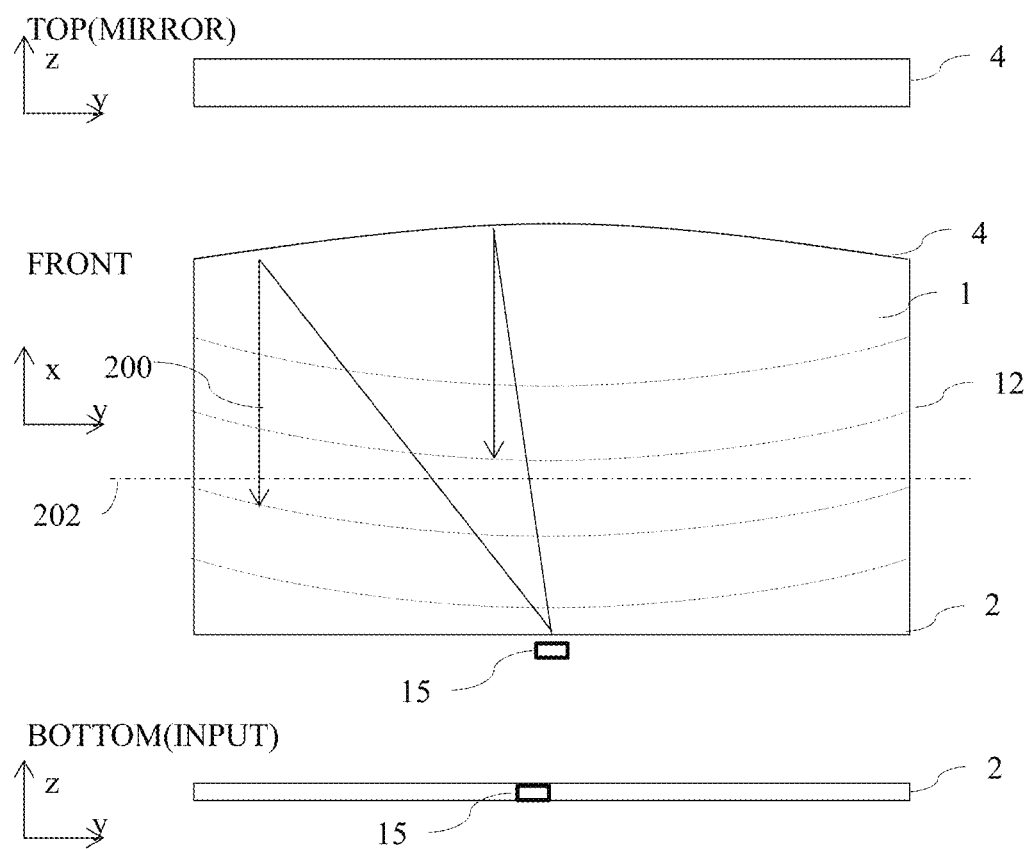
FIG. 13 is a schematic diagram illustrating in top, front and bottom views a stepped imaging waveguide comprising a continuously curved mirror end and rectangular mirror and input ends, in accordance with the present disclosure.

FIG. 13 is a schematic diagram illustrating in top, front and bottom views a stepped imaging waveguide comprising a continuously curved mirror end 4 and rectangular mirror end 4 and input end 2. Light source 15 illuminates the input aperture of the directional imaging waveguide such as stepped waveguide 1. Light rays 200 are reflected by curved mirror 4 and are collimated. Across line 202, the output light reflected by facets 12 may have a luminance profile with respect to position across the width of the waveguide 1.

Figure 14:
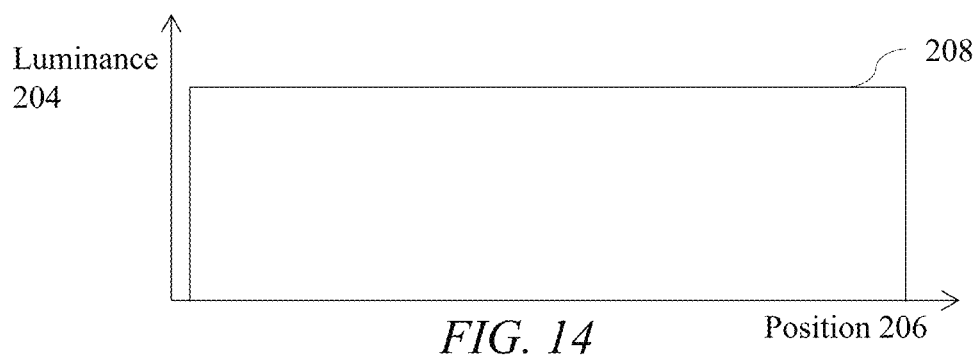
FIG. 14 is a graph illustrating variation of luminance with lateral position for the waveguide arrangements of FIG. 13, in accordance with the present disclosure.

FIG. 14 is a graph illustrating variation of luminance 204 with lateral position 206 across the waveguide 1 for the waveguide arrangements of FIG. 13. Profile 208 that is substantially flat is achieved. Advantageously, high lateral uniformity is provided for a central light source 15 of array of light sources 15$a$-$n$.

The continuous curve to the mirror end 4 increases the footprint of the waveguide in comparison to conventional scattering waveguides, increasing bezel size. It would be desirable to reduce the bezel of the waveguide 1 while maintaining lateral uniformity of profile 208.

In the present embodiments, the uniformity profile 208 across the line 202 represents the spatial uniformity across the waveguide 1. This is separate to the angular uniformity across the array of optical windows. Desirably a backlight is arranged to provide high spatial uniformity, typically greater than 70% across the display area. However, the same backlight may provide angular uniformity in wide angle mode that may be greater than 20% across a +/−45 degrees angular range. In Privacy, 3D, high efficiency and outdoors operation modes, the angular uniformity may be greater than 2% across a +/−45 degrees. Thus spatial and angular uniformity are different properties. The present embodiments are arranged to provide desirable spatial uniformity for directional backlight with controllable angular uniformity in a lateral direction.

Figure 15:
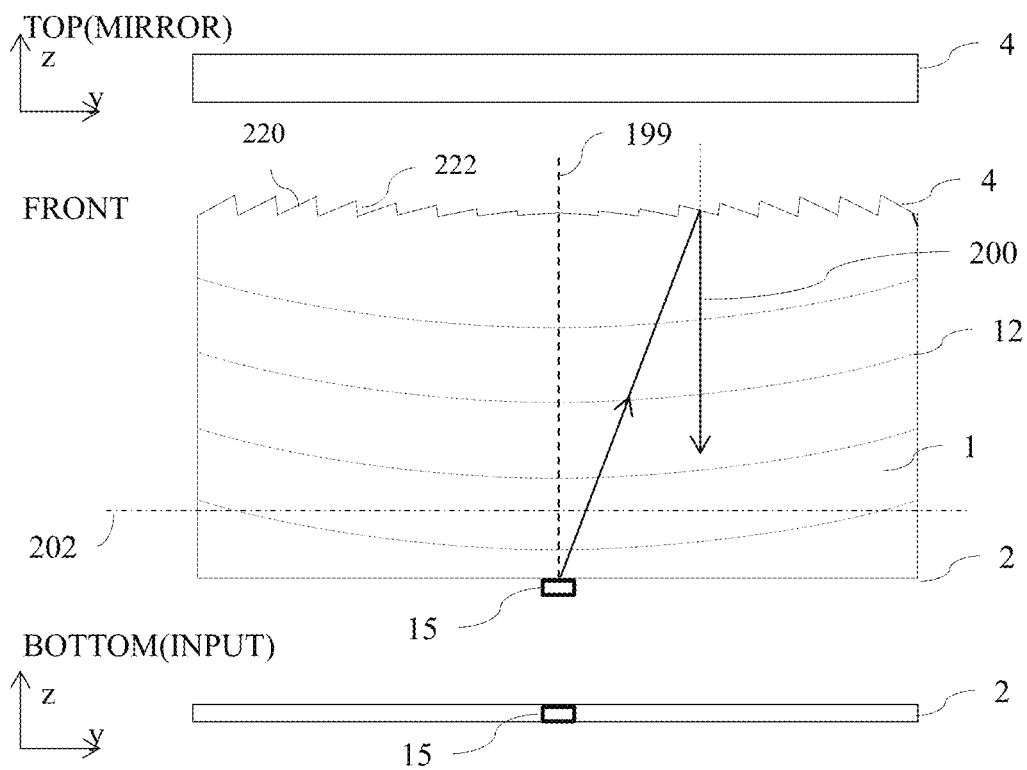
FIG. 15 is a schematic diagram illustrating in top, front and bottom views a stepped imaging waveguide comprising a Fresnel reflector end and rectangular mirror and input ends, in accordance with the present disclosure.

FIG. 15 is a schematic diagram illustrating in top, front and bottom views a stepped imaging waveguide 1 comprising a Fresnel reflector end 4 and rectangular mirror end 4 and input end 2. Fresnel reflector has an optical axis 199. Fresnel reflector may comprise facets 220 arranged to achieve a collimating function to light rays 200 and drafts 222. After reflection from curved facets 12, optical windows 26 are provided as described elsewhere herein.

Thus a directional waveguide 1 comprising: an input end 2; first and second opposed, laterally extending guide surfaces 6, 8 for guiding light along the waveguide 1; and a reflective end 4 facing the input end 2 for reflecting the input light back along the waveguide 1, the second guide surface 8 being arranged to deflect the reflected input light through the first guide surface 6 as output light, and the waveguide 1 being arranged to direct the output light into optical windows 26 in output directions that are distributed in a lateral direction (y-axis) in dependence on the input position of the input light.

Figure 16:
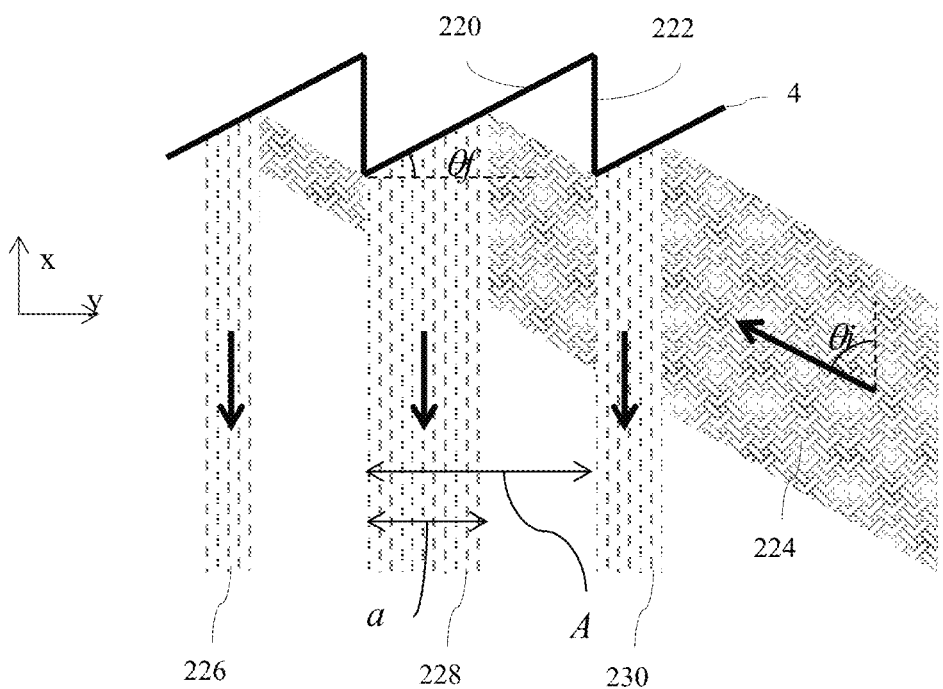
FIG. 16 is a schematic diagram illustrating in front view reflection efficiency at the facets of a Fresnel reflector, in accordance with the present disclosure.

FIG. 16 is a schematic diagram illustrating in front view light loss at the facets of a Fresnel reflector end 4. The reflective end 4 is thus a Fresnel reflector comprising alternating reflective facets 220 and draft facets 222, the reflective facets providing the Fresnel reflector with positive optical power. Thus substantially collimated light rays 200 may be provided for source 15 by the Fresnel reflector. Off-axis light beam 224 is incident on the facets 220 that are shadowed by drafts 222. Thus across pitch A of the facets 220, reflected beam 228 of width a is provided. The reflection efficiency may then be given by the ratio a/A:

$$\frac{a}{A} = \frac{\cos(\theta i)}{\cos(\theta i - 2 \cdot \theta f)} \qquad \text{eqn. 1}$$

where $\theta_i$ is the incident angle and $\theta_f$ is the facet 220 angle. Thus for a central light source 15 the efficiency reduces with lateral position 206.

The reduction in efficiency increases with facet angle for light that is near vertically collimated and introduces a center/edge non-uniform head-on brightness. Lateral non-uniformities may be reduced by various methods as described in U.S. patent application Ser. No. 15/097,750 filed Apr. 13, 2016, herein incorporated by reference in its entirety.

The lateral uniformity and efficiency of a directional waveguide with a reflective end may be determined by the structure of the applied reflective coating including thickness and area coverage. It would be desirable to provide facets of a Fresnel mirror that are efficiently coated.

Figure 17:
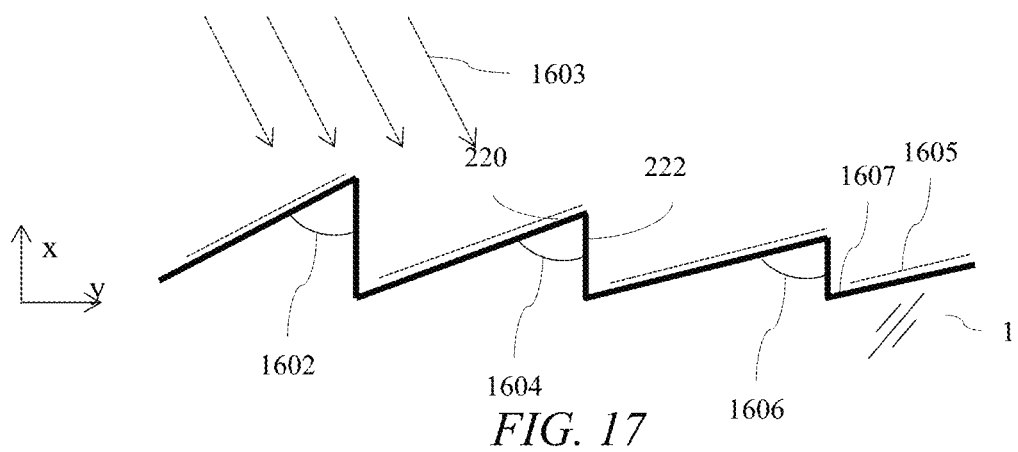
FIG. 17 is a schematic diagram illustrating in front view a coating method for a Fresnel reflector with fixed draft angle, in accordance with the present disclosure.

FIG. 17 is a schematic diagram illustrating in front view a coating method for a Fresnel reflector with fixed draft angle, that is the angle of draft facet 222 with respect to the x-axis direction is substantially constant. As the angle of the reflective facets 220 varies with lateral position across the width of a Fresnel reflector, then the internal angles 1602, 1604, 1606 between the draft facet 222 and reflective facet 220 vary across the width of the Fresnel reflector.

During the coating of the reflective layer 1605, coating material 1603 may be provided with certain directionality, for example in an evaporation coating apparatus. Such directionality of coating may provide regions 1607 that are less well coated than other regions. Regions 1607 may be at the low point of the reflective facet, as shown in FIG. 18 this degrades reflection efficiency of the coated facet 220.

Figure 18:
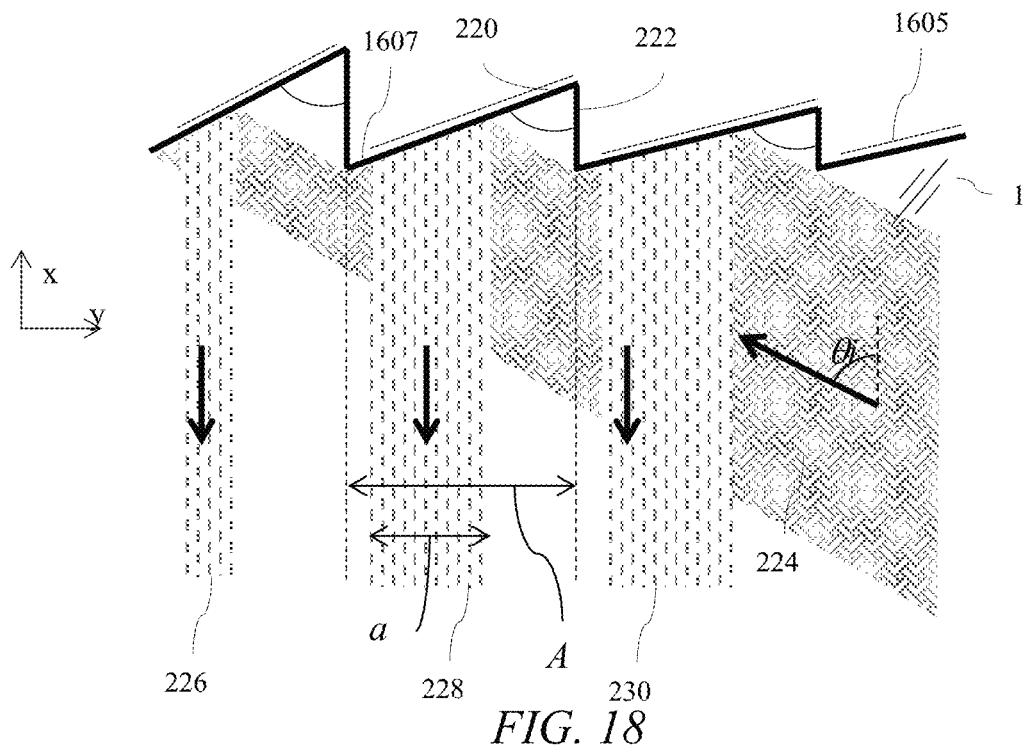
FIG. 18 is a schematic diagram illustrating in front view reflection efficiency at the facets of a Fresnel reflector with incomplete metallization of reflective facets, in accordance with the present disclosure.

FIG. 18 is a schematic diagram illustrating in front view reflection efficiency at the facets of a Fresnel reflector with incomplete metallization of reflective facets. In operation light cone 224 that is incident and angle θi on the reflective facets 220 is reflected into beams 226, 228, 230. The width a may be reduced, and thus the efficiency a/A may be reduced. Further the roll-off of efficiency with lateral position is degraded in comparison to well coated surfaces and thus the lateral uniformity is further degraded.

It would be desirable to increase efficiency and lateral uniformity using directional coating methods.

Figure 19:
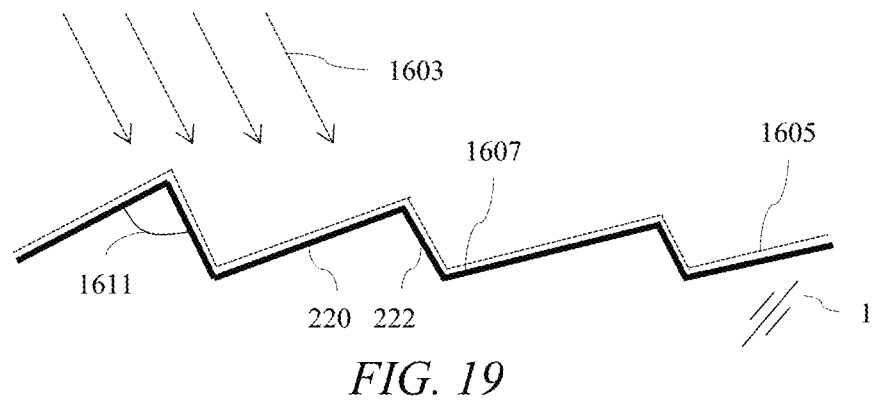
FIG. 19 is a schematic diagram illustrating in front view a coating method for a Fresnel reflector with variable draft angle, in accordance with the present disclosure.

FIG. 19 is a schematic diagram illustrating in front view a coating method for a Fresnel reflector with variable draft angle. Facets 222 may have a constant internal angle 1611, thus the draft facets are not vertical and coating layer 1605 efficiency may be improved, particularly in the region 1607 at the low point of the coated facet 220.

It would be desirable to provide Fresnel mirror facet shape that has high yield during injection molding processes.

Figure 20:
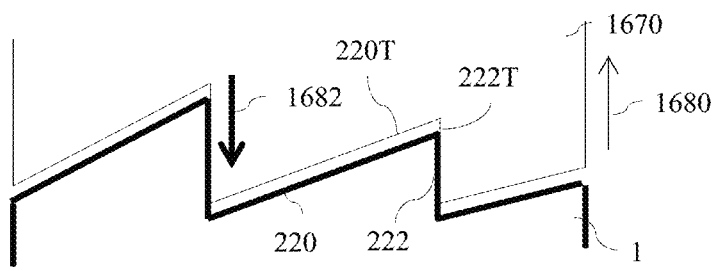
FIG. 20 and FIG. 21 are schematic diagrams illustrating in front view cutting of molds for a reflective end for first and second draft angles, in accordance with the present disclosure.
Figure 21:
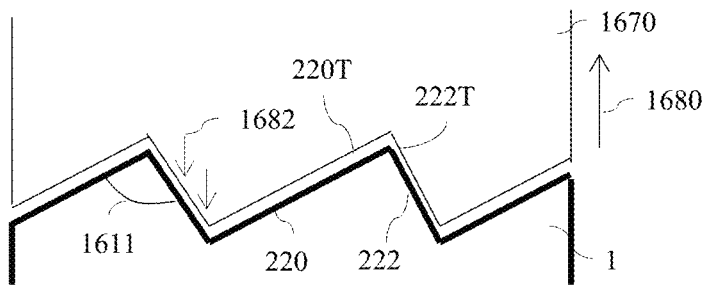

FIGS. 20-21 are schematic diagrams illustrating in front view cutting of molds for a reflective end for first and second draft angles. FIG. 20 shows mold 1670 that may for example be nickel or copper, and is formed with an inverted structure to the waveguide 1. After injection of material such as PMMA or polycarbonate, then the mold 1670 is detached from the waveguide 1 by relative movement in direction 1680. Such movement causes high resistance force 1682 at the draft facet 222 that may damage the extracted part and/or tool during extraction. In comparison as shown in FIG. 222, reflective facets (prior to coating) and draft facets 222 that have a constant internal angle 1611 have reduced extraction pressure over the area of the draft facet, thus reducing potential damage to waveguide 1 and tool 1670, advantageously improving extraction yield.

It would be desirable to reduce cutting time for tool 1670.

Figure 22:
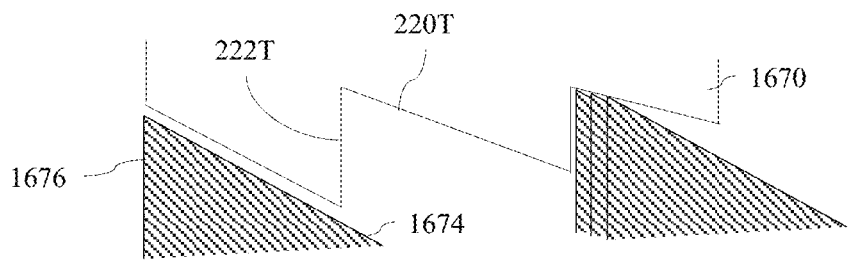
FIG. 22 and FIG. 23 are schematic diagrams illustrating in front view release of a reflective end from a mold during a mold release step for first and second draft angles, in accordance with the present disclosure.
Figure 23:
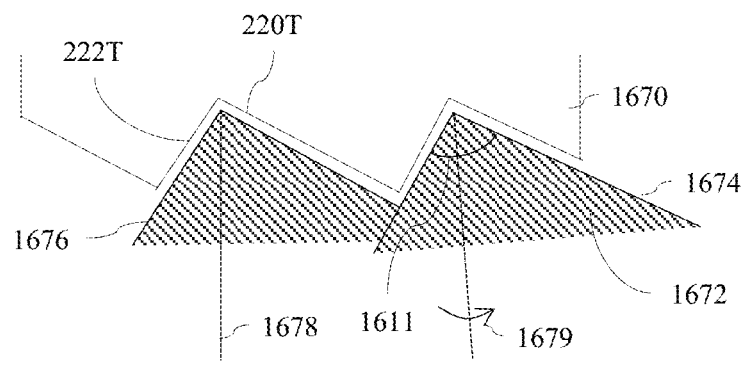

FIGS. 22-23 are schematic diagrams illustrating in front view release of a reflective end from a mold during a mold release step for first and second draft angles. As shown in FIG. 22 for substantially parallel draft tool facets 222T, then cutting tool such as a diamond 1676 is required to provide multiple passes across the tool surface 220T, increasing cutting time and potential for tool misalignment and tooling artefacts. In comparison as shown in FIG. 23, for constant internal angle 1611 then a single diamond 1672 can be used with axis 1678 direction that rotates by angle 1679 between cuts, each cut providing a single pair of tool draft facet 222T and tool facet 220T surfaces. Advantageously cut time may be reduced.

Figure 24:
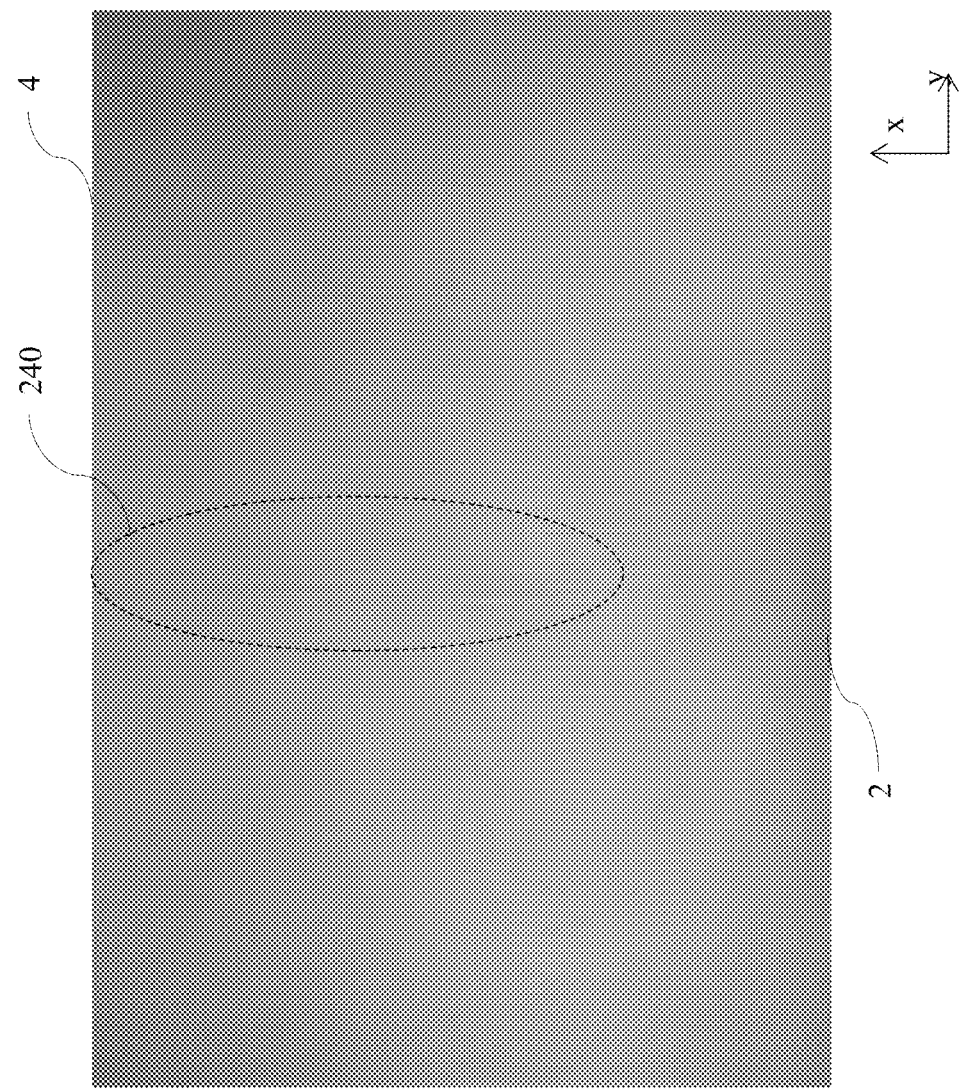
FIG. 24 is a photograph illustrating patterning artifact arising from a tooling quantization error in the center of a Fresnel reflector, in accordance with the present disclosure.

FIG. 24 is a photograph illustrating patterning artifact arising from a tooling quantization error in the center of a Fresnel reflector, when imaged from an off-axis position. In region 240, vertical bright and dark lines can be seen that appear to emanate from the center of the Fresnel reflector. Such lines rotate with viewing position. It would be desirable to remove the appearance of such lines to provide higher uniformity.

It would be desirable to provide a Fresnel mirror that can be provided from tooling and replication processes that have a minimum achievable reproducible step height between adjacent facets.

Figure 25:
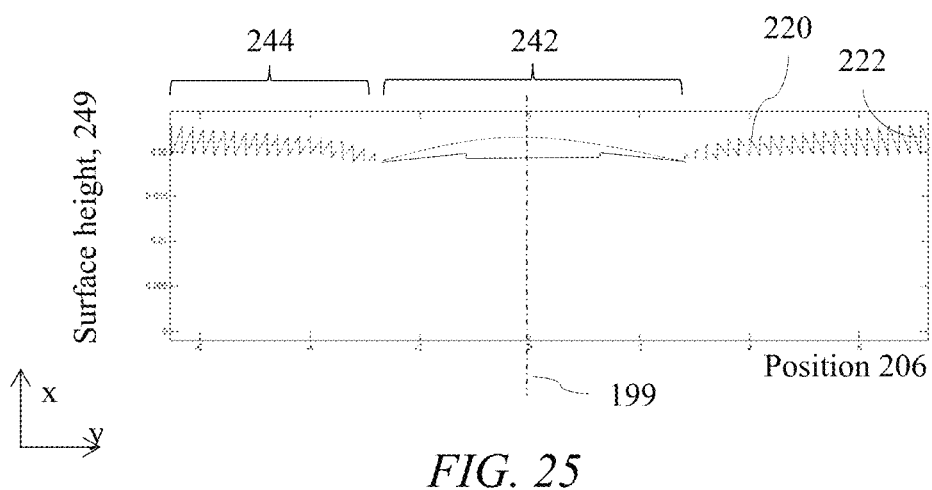
FIG. 25 is a schematic graph illustrating the height of facets in the center of a Fresnel mirror comprising a central region with facets of increased width compared to the outer regions, in accordance with the present disclosure.

FIG. 25 is a schematic graph illustrating the height of facets in the center of a Fresnel mirror comprising a central region with facets of increased width compared to the outer regions. In the central region, the step height change between facets reduces. Such small step heights are not easily reproducible in conventional processes for injection molding of optical waveguides. For example, minimum desirable step height may be 1 µm.

A plot of Fresnel reflector surface height 249 against lateral position 206 is shown for a tooled part that has a minimum quantized step height, but that is arranged to match the profile of a smooth surface. Thus, in an outer region 244 the facets 220 and draft facet 222 regions of the Fresnel reflector can be provided with a regular pitch. However, in the central region 242, the quantization of cutting of the tool means that the separation between the steps may be increased to provide the facet 220 and draft facets 222. In the region 242 the draft height is the same as the quantization height of the tooling method, for example, the minimum achievable cutting height.

Figure 26:
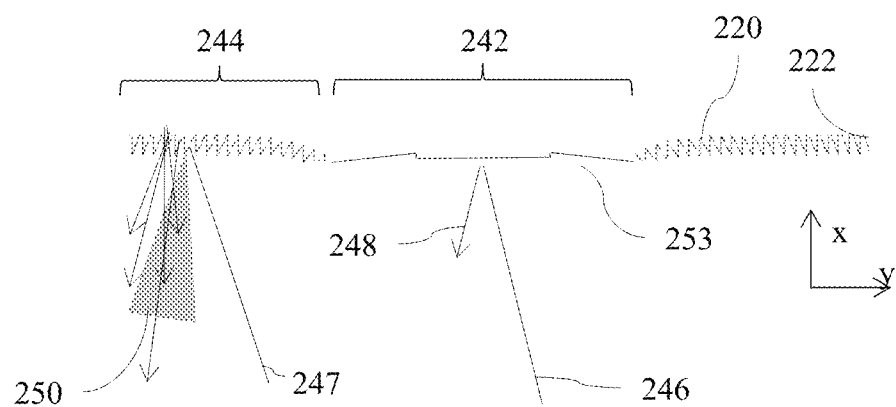
FIG. 26 is a schematic diagram illustrating in front view diffraction of light from the facets of the Fresnel mirror of FIG. 25, in accordance with the present disclosure.

FIG. 26 is a schematic diagram illustrating in front view diffraction of light from the facets of the Fresnel mirror of FIG. 25, being the reflection of light from the structure of FIG. 25. Light rays 246 in the center region of the Fresnel reflector are subjected to relatively low levels of diffraction because of the low phase structure and reflected as rays 248 by Fresnel reflector facets relatively un-diffracted. By way of comparison rays 247 that are incident on outer regions 244 encounter phase structure from the facets 220 of the Fresnel reflector and are scattered into cone 250.

Figure 27:
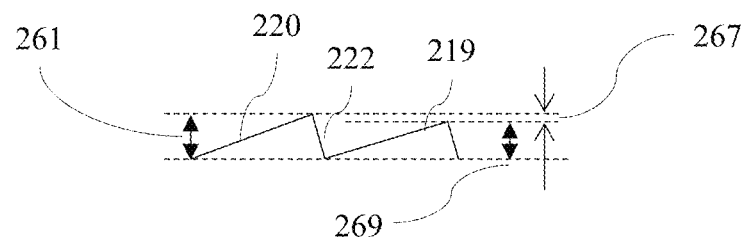
FIG. 27 is a schematic diagram illustrating in front view the change in phase height of adjacent facets of a Fresnel mirror, in accordance with the present disclosure.

FIG. 27 is a schematic diagram illustrating in front view the change in phase height of adjacent facets of a Fresnel mirror. The relative height of facets 220 and draft facets 222 in the direction parallel to the optical axis 199. Thus there is typically a small phase shift of reflected light due to step 267 between adjacent facets 219, 220 of the Fresnel mirror in region 244. However in the central region 242, no phase shift may be provided. Thus for reflected the diffraction properties may vary between regions 242, 244.

Figures 28, 29:
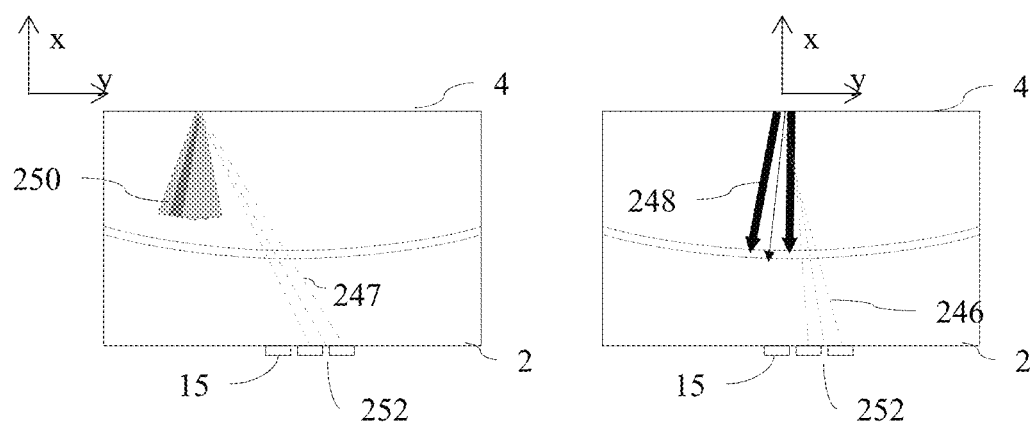
FIG. 28 and FIG. 29 are schematic diagrams illustrating in front view the origin of the patterning artifact of FIG. 24, in accordance with the present disclosure.

FIGS. 28-29 are schematic diagrams illustrating in front view the origin of the patterning artifact of FIG. 24. FIG. 28 shows the imaging of light source array 15 with gaps 252 between the respective light sources of array 15. The blur created by cones 250 blurs the gaps between the light sources, acting in a similar manner to a diffuser at the plane of the Fresnel reflector and thus a patterning artifact is not seen. However in the central region, the diffraction is not present, thus the gaps 252 remain visible to the observer as patterning of rays 248. Thus the lack of diffraction in the center of the Fresnel reflector may provide visibility of gaps between light sources, and visual patterning across the field.

It would be desirable to remove the visibility of the patterning artifact from the center of the Fresnel reflector.

Figure 30A:
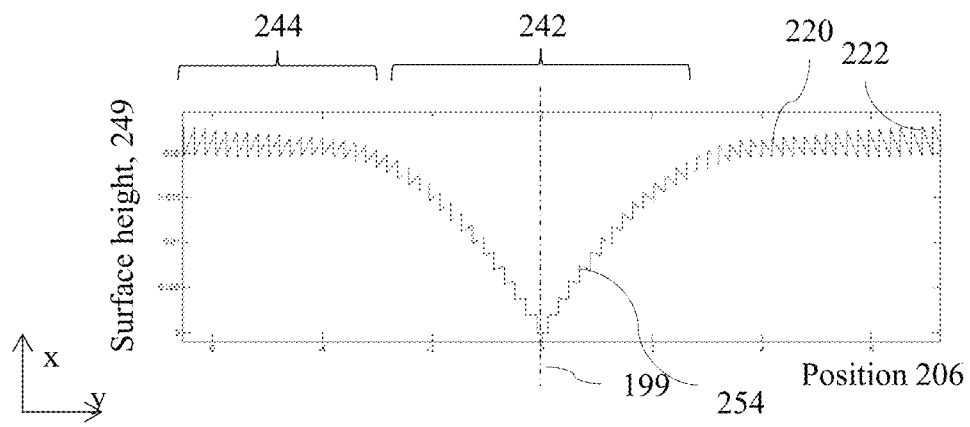
FIG. 30A is a schematic graph illustrating a correction of the patterning artifact of FIG. 24, in accordance with the present disclosure.

FIG. 30A is a schematic graph illustrating a correction of the patterning artifact of FIG. 24. A directional waveguide 1 may comprise an input end 2; first and second opposed, laterally extending guide surfaces 6, 8 for guiding light along the waveguide; and a reflective end 4 facing the input end 2 for reflecting the input light back along the waveguide 1, the second guide surface 8 being arranged to deflect the reflected input light through the first guide surface 6 as output light, and the waveguide 1 being arranged to direct the output light into optical windows 26 in output directions that are distributed in a lateral direction in dependence on the input position of the input light. The reflective end 4 is a Fresnel reflector comprising alternating reflective facets 220 and draft facets 222, the reflective facets 220 providing the Fresnel reflector with positive optical power, and, in at least a center region 242 of the Fresnel reflector, the depth of the draft facets 222 parallel to the optical axis of the reflective end being greater than the depth of the reflective facets 220.

Figure 30B:
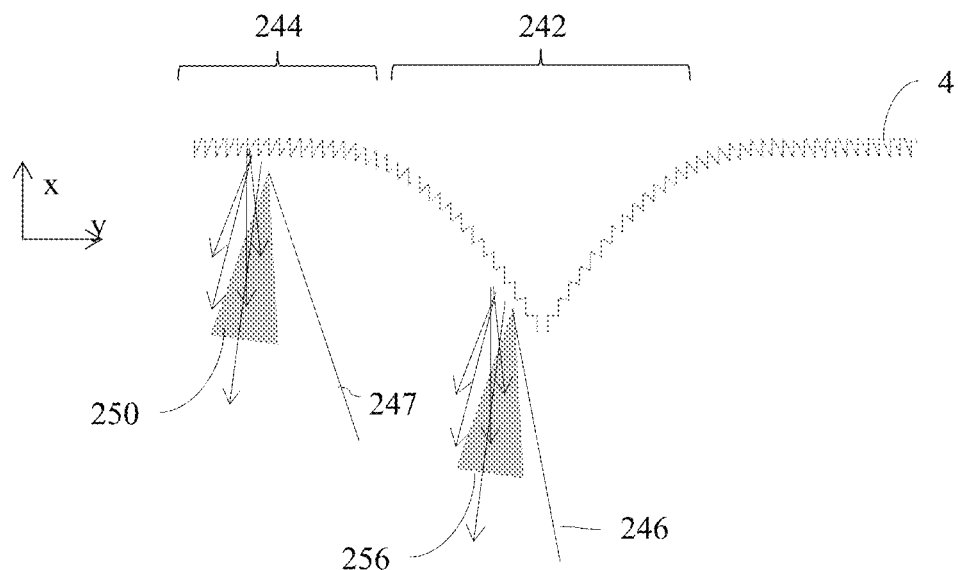
FIG. 30B is a schematic diagram illustrating in front view diffraction of light from the facets of the Fresnel mirror of FIG. 30A, in accordance with the present disclosure.

FIG. 30B is a schematic diagram illustrating the reflection of light from the structure of FIG. 30A. Light rays 246 in the center region of the Fresnel reflector are subjected to substantially the same diffraction effects as the rays 247 at the edges of the Fresnel reflector. Thus light cones 250, 256 are provided with substantially the same diffusion effects. The width of the reflective facets laterally across the reflective end may be at most 0.5 mm, and preferably at most 0.25 mm.

Figure 31:
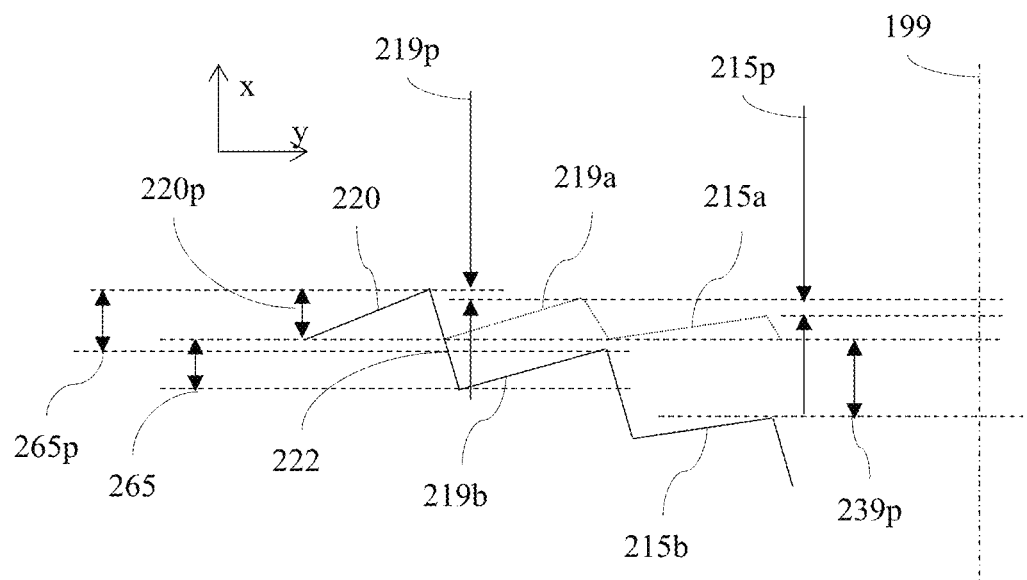
FIG. 31 is a schematic diagram illustrating in front view the change in phase height of adjacent facets of a Fresnel mirror in a central region of FIG. 30A, in accordance with the present disclosure.

FIG. 31 is a schematic diagram illustrating a detail of the relative height of adjacent facets in a central region of a phase modified Fresnel mirror. Facets 220, 219a, 215a represent the location of facets in an uncorrected Fresnel mirror during operation of a manufactured waveguide such facets have small phase steps and further may not be accurately reproduced. Thus diffraction is reduced in the region of small steps between adjacent facets.

Facets 219b and 215b illustrate modified facet locations. Thus step 219p between facet 220 and 219a has been increased to phase step 265p between facets 220 and 219b. Further step 215p between facets 219a and 215a has been increased to step 239p between facets 219b and 215b.

The draft facet 222 surfaces may be parallel to the optical axis 199 or may be inclined to provide more straightforward release during molding of the waveguide 1. The pitch of the reflective facets laterally across the reflective end may be constant. The depth 265 of each of the draft facets may be at least 0.5 µm.

Thus an additional step height 265 may be provided in the central region between adjacent facets 220, 219b. The additional step height 265 may be different between different adjacent facets. The depth of each of the draft facets may be at least 0.5 µm.

The diffraction properties of adjacent facets may be determined by the relative phase steps between said facets. The steps 219p, 215p thus comprise phase heights for a given wavelength which may be for example be 530 µm. The physical height 265 may have the same phase height as the phase height of the step 219p. Thus the height 265 may be greater than a given value such as 1µm but may vary in height such that the phase height of the step is the same as the phase height of the step 219p that would have been in the unmodified structure.

Advantageously the phase structure may be substantially matched to the phase structure of a perfectly reproduced structure, thus minimizing streak artefacts from the center of the Fresnel reflector at end 4.

Figure 32:
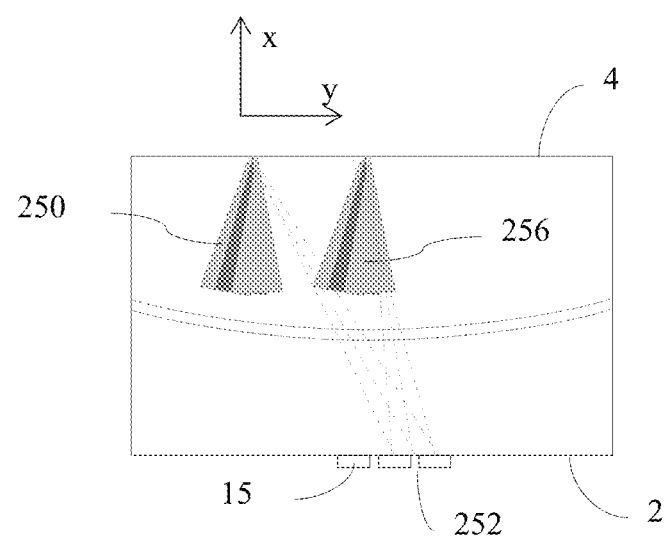
FIG. 32 is a schematic diagram illustrating in front view a correction of the patterning artifact of FIG. 24, in accordance with the present disclosure.

FIG. 32 is a schematic diagram illustrating in front view a correction of the patterning artifact of FIG. 24. Thus light cones 256, 250 created by diffraction in regions 242, 244 of the Fresnel reflector both serve to provide diffusion of the gaps between the light sources. Advantageously the uniformity of the output is improved in comparison to the arrangement of FIG. 25.

Figure 33A:
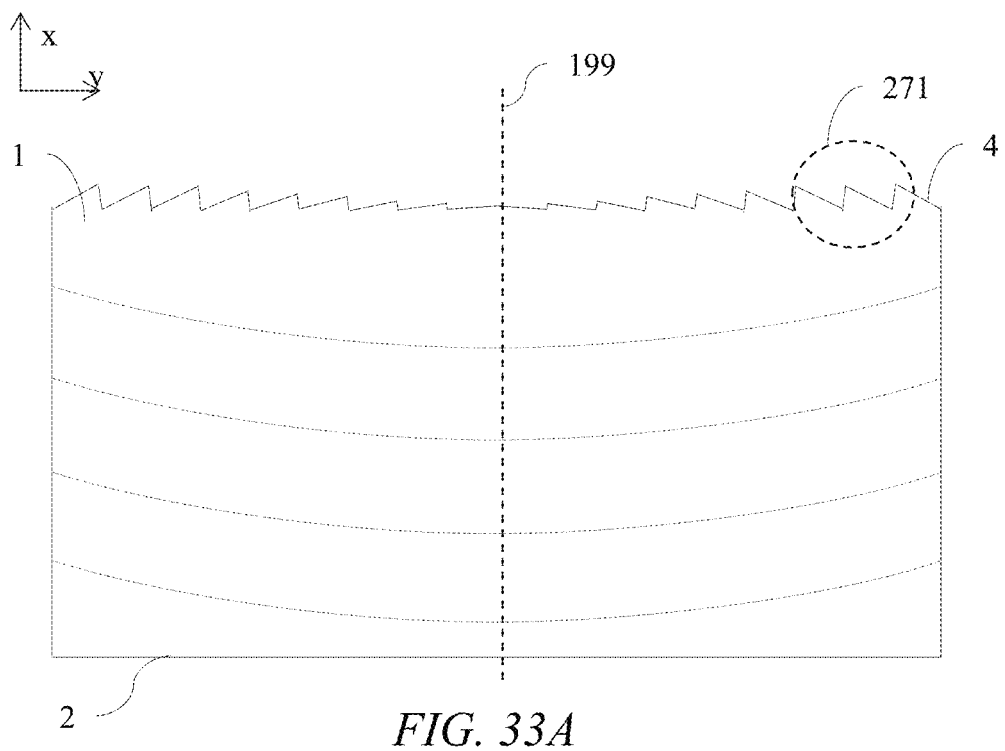
FIG. 33A and FIG. 33B are schematic diagrams illustrating a further Fresnel reflector design arranged to modify diffusion characteristics of the Fresnel mirror, in accordance with the present disclosure.
Figure 33B:
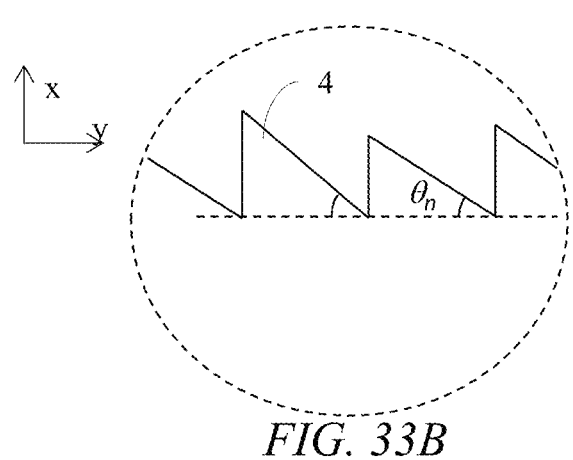

FIGS. 33A-33B are schematic diagrams illustrating a further Fresnel reflector design arranged to modify diffusion characteristics of the Fresnel mirror. In particular, at regions 271 near to the edge of the Fresnel reflector, some random orientation of angle may be provided to give a tilt angle of the nth facet 220 of $\theta_n$ wherein:

$$\theta_n = \theta f + \delta\theta \sim \text{rand} \qquad \text{eqn.4}$$

where θf is the unrandomized facet angle, rand is a pseudo random number between 0 and 1, and δθ is approximately θdiff/10; where θdiff is the full width half maximum of the system diffuser function in the plane parallel to the LEDs, and may be between 10 and 30 degrees for example.

Advantageously the diffusion of the Fresnel reflector can be controlled across its width to improved control of lateral diffusion, improving display uniformity along line 202 with viewing angle.

In further embodiments, the pitch of the facets of the Fresnel reflector may be varied. The variation may be in a random manner. Advantageously this reduces effects due to diffraction that can cause vertically striped artefacts.

It would be desirable to provide a directional display that for off-axis viewing in Privacy mode has substantially uniform luminance that is minimized across the display area.

Figure 34A:
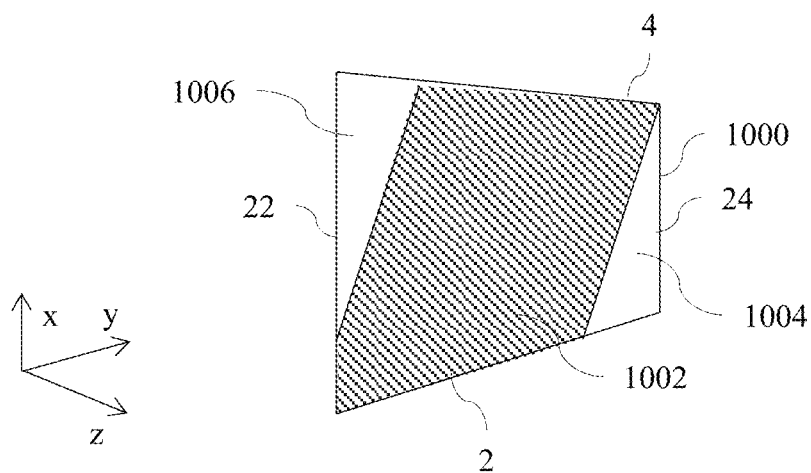
FIG. 34A is a schematic diagram illustrating in perspective front view, the location of bright triangles in a directional display operating in Privacy mode as seen for an observer in an off-axis viewing position, in accordance with the present disclosure.

FIG. 34A is a schematic diagram illustrating in perspective front view, the location of bright triangles in a directional display operating in Privacy mode as seen for an observer in an off-axis viewing position. In FIG. 34A, off axis viewing may be illustrated as a trapezoidal image appearance, corresponding to the visual appearance of off-axis viewing of a display including perspective effects. Off-axis viewing in Privacy mode may for example be illustrated by display appearance at angles of 45°, although other viewing angles may also be considered.

FIG. 34A further describes artefacts that are present in the privacy and wide angle modes of directionally illuminated display systems where the draft facets 222 are substantially parallel and substantially parallel to the x-axis across the width of the Fresnel reflector at reflective end 4 of the waveguide 1.

In privacy mode of operation, image area 1000 comprises a central region 1002 with low luminance and higher luminance artefact regions 1004, 1006 that are typically triangular and associated with corners of the area 1000. With input end 2 at the lower side and reflective end 4 at the upper side then an observer at 45° viewing from the left side of the display will see a brighter triangle artefact region 1006 near the top left hand corner and side 22 and bright triangle artefact region 1004 in the bottom right hand corner and side 24. Such regions 1004, 1006 are undesirable and degrade privacy performance. Further in wide angle mode, such triangles may create non-uniformities and streak artefacts.

It would be desirable to reduce the increased luminance of regions 1004, 1006 with respect to region 1002, thus improving appearance and increasing the privacy (reducing luminance) of the off-axis image.

Figure 34B:
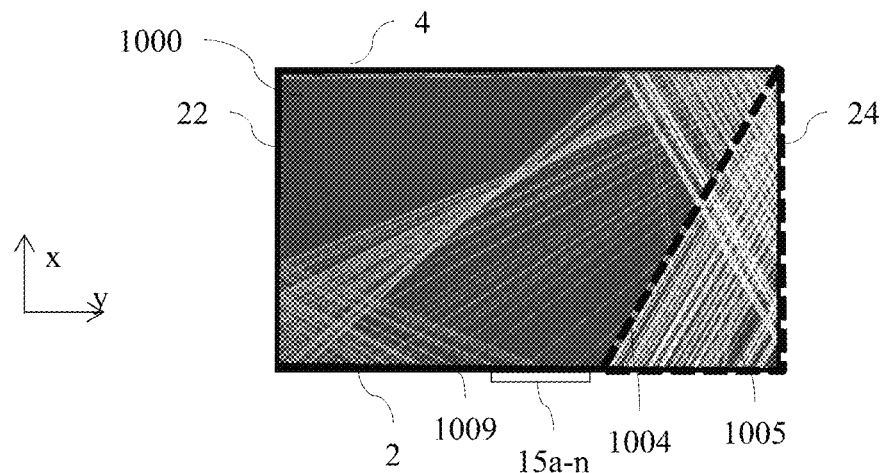
FIG. 34B and FIG. 34C are schematic diagrams illustrating in front view, optical raytraces illustrating the formation of bright triangles in a directional display operating in Privacy mode as seen for an observer in an off-axis viewing position, in accordance with the present disclosure.
Figure 34C:
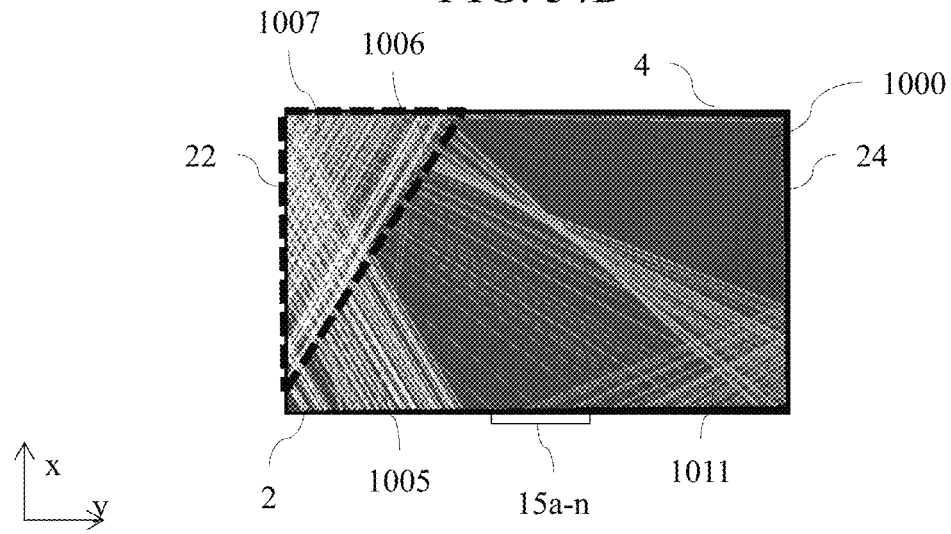

FIGS. 34B-C are schematic diagrams illustrating in front view, optical raytraces illustrating the formation of bright triangles in a directional display operating in Privacy mode as seen for an observer in an off-axis viewing position.

For convenience of illustration, for example as shown in FIG. 34B, the off-axis image is shown as rectangular where perspective effects have been removed. However, the raytraces refer to an image as seen by an observer that may have perspective appearance as shown in FIG. 34A.

FIG. 34B further illustrates a raytrace wherein the draft facets 222 of the Fresnel reflector are parallel to the x-axis and are substantially parallel across the width of the reflective end.

FIG. 34B illustrates the formation of region 1004. For the illustrative purpose of the raytrace, parallel rays 1005 corresponding to rays in the waveguide that after exit are viewed at 45° from the left side are input at input end 2. Rays 1005 are propagated through the waveguide 1 as rays back towards the input end 2. In the Privacy mode, array 15*a-n* of light sources is operated in the central region of the input side 2. If a ray 1009 intersects with a light source of array 15*a-n* at the input end 2, then an observer at 45° will observe illumination of bright triangle in region 1004.

FIG. 34C illustrates the formation of region 1006. For the illustrative purpose of the raytrace, parallel rays 1007 (that are the rays 1005 reflected at side 22) corresponding to rays in the waveguide that after exit are viewed at 45° from the left side are input at input end 2. Rays 1007 are propagated through the waveguide 1 as rays back towards the input end 2. If a ray 1011 intersects with a light source of array 15*a-n* at the input end 2, then an observer at 45° will observe illumination of bright triangle in region 1006.

It would be desirable to remove rays 1009, 1011 that intersect with array 15*a-n*, thus removing light from the light source array 15*a-n* that is directed into regions 1004, 1006.

The origin of the rays 1009, 1011 will now be described in more detail with respect to reflection from draft facets 222 of the Fresnel reflector.

FIGS. 35-39 are schematic diagrams illustrating in front view, ray paths that contribute to bright triangles in a directional display operating in Privacy mode as seen for an observer in an off-axis viewing position. FIGS. 35-38 are illustrated in a manner similar to FIGS. 34B-C in that they represent the image 1000 seen by an off-axis observer to the left side of the display but are shown with perspective cues removed for convenience of illustration.

Figure 35:
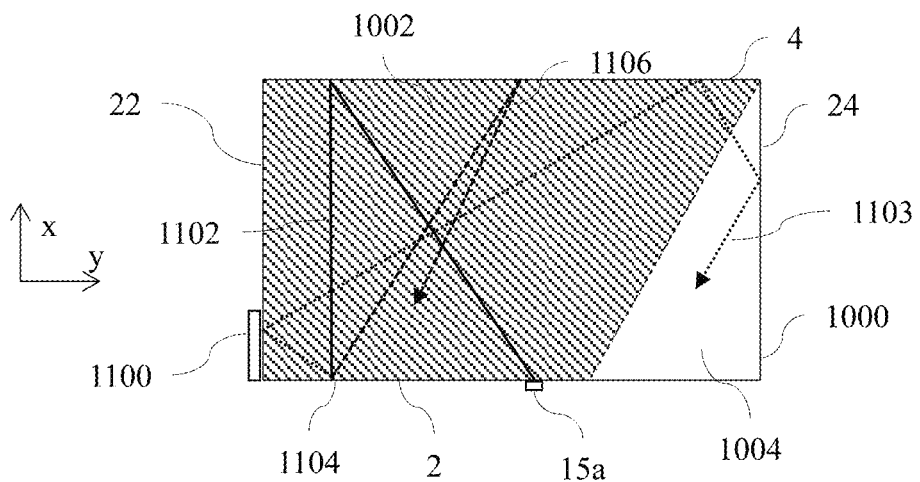
FIG. 35, FIG. 36, FIG. 37, FIG. 38, and FIG. 39 are schematic diagrams illustrating in front view, ray paths that contribute to bright triangles in a directional display operating in Privacy mode as seen for an observer in an off-axis viewing position, in accordance with the present disclosure.

FIG. 35 illustrates in front view a stray light ray 1102 from light source 15*a-n*. Light ray 1102 reflects from reflective end 4, and again at input side 2 at position 1104. Reflection at position 1104 may be due to Fresnel reflections, total internal reflection from input microstructures, reflections from light source packages and other stray light reflections. Position 1104 then represents a virtual light source that injects light rays 1103 back into the waveguide 1. Light ray 1103 may be incident on side 22 that may further comprise a side mirror 1100 as described in more detail in U.S. patent application Ser. No. 15/097,750 filed Apr. 13, 2016, herein incorporated by reference in its entirety. After reflection from reflective end 4, light ray 1103 may be output by extraction at light extraction features 12 into region 1004. Undesirably the luminance of regions 1004 and 1002 may be increased. Such rays 1103, 1106 may be reduced in intensity by reducing the reflectivity of the input side in region 1104 described in more detail in U.S. Patent Publication No. 2013/0307946, herein incorporated by reference in its entirety.

Figure 36:
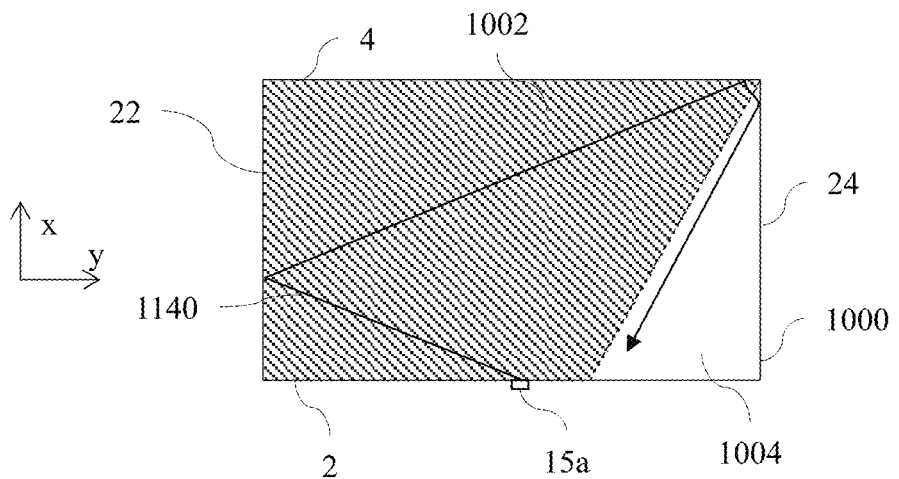

FIG. 36 illustrates in front view a stray light ray 1140 from light source 15*a*. Ray 1140 is reflected from side 22 and from end 4. After total internal reflection at side 24 then light is extracted by features 12 within the region 1004. Such light rays 1140 can be reduced in luminance by controlling the luminous intensity of light at high angles from the source 15*a* within the waveguide 1, by design of input microstructure at side 2 in the region of source 15*a*.

Figure 37:
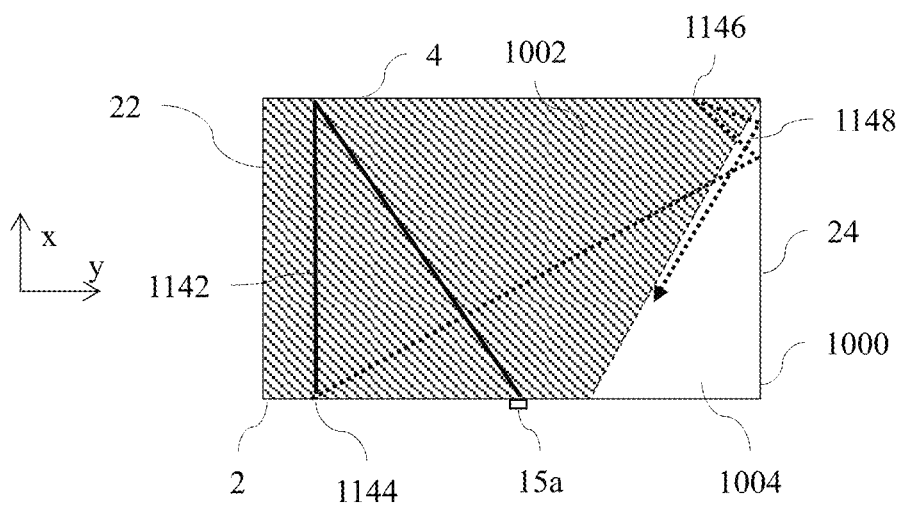

FIG. 37 illustrates in front view a stray light ray 1142 from light source 15*a*. Light ray 1142 may be reflected at input side 1144 as ray 1148. Ray 1148 may be reflected at side 24 and is incident on region 1146 of the Fresnel reflector at reflective end 4. As will be described herein, some rays may be reflected back towards the side 24 and are then directed into region 1004 where they are extracted by the extraction features 12 towards an off-axis observer.

Figure 38:
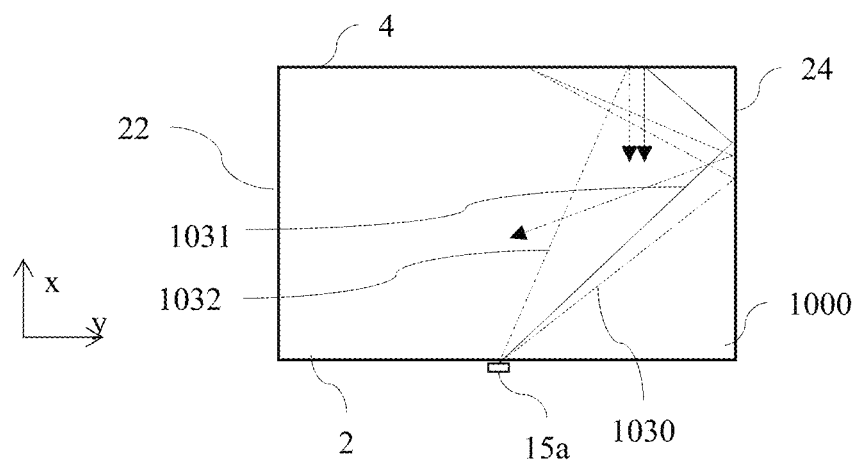
Figure 39:
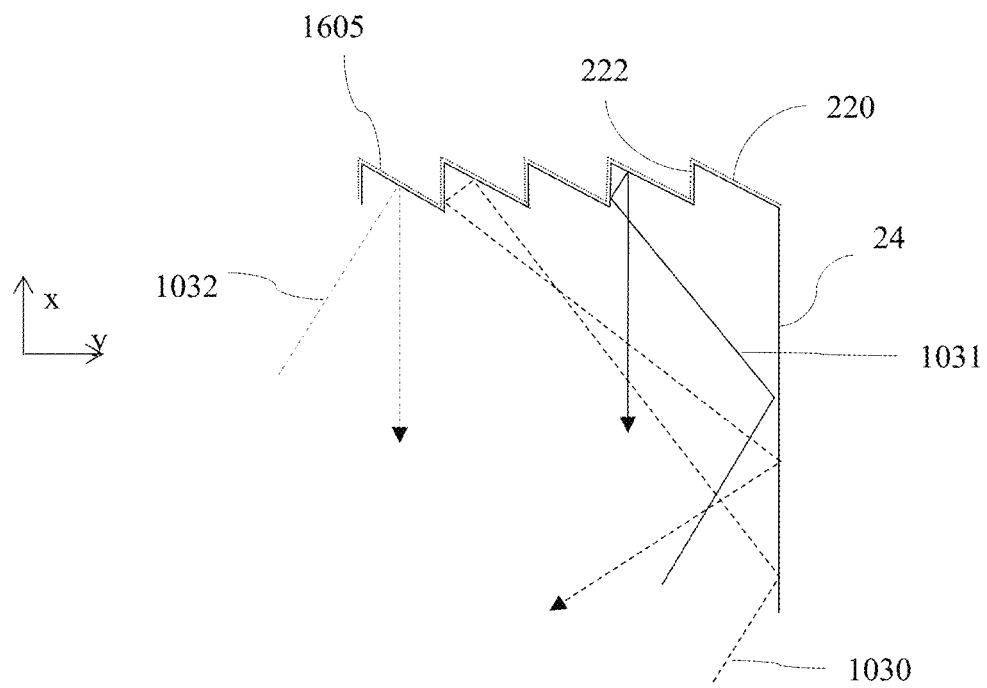

FIGS. 38-39 illustrate in front view light rays 1030, 1031, 1032 from light source 15*a* that are incident on the reflective end 4 that comprises a Fresnel reflector with substantially vertical drafts 222 and reflective coating 1605 formed on both reflective facet 220 and draft facet 222. Light ray 1032, is a primary light ray for on-axis viewing and is reflected directly from reflective facet 220. Light ray 1031 is incident on side 24 and draft facet 222 before facet 220 so that the final direction is the same as ray 1032 and provides useful light for on-axis viewing.

In comparison, light ray 1030 that is reflected from side 24 and is incident on the reflective facet 220 before the draft facet 222 is reflected back towards the side 24. At side 24 some light may be transmitted (not shown), however some light may be reflected back into the waveguide 1, and contribute to regions 1004, 1006 as illustrated in FIGS. 34B-C and FIG. 37.

It would be desirable to reduce the luminance in regions 1004, 1006 due to rays 1030 that reflect from reflective facet 220 before draft facet 222.

Figure 40A:
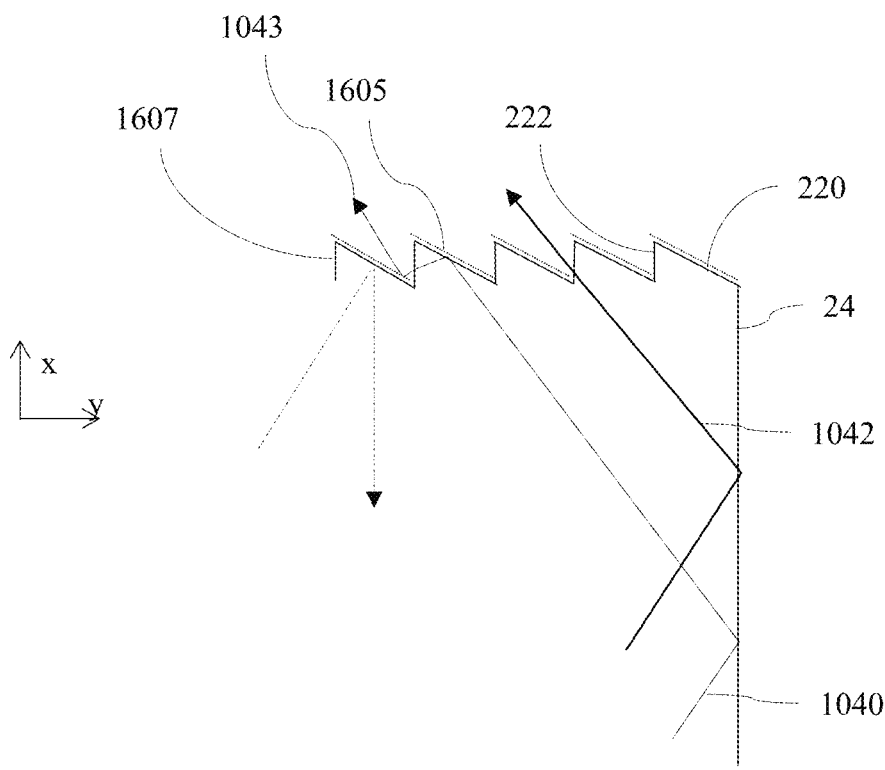
FIG. 40A and FIG. 40B are schematic diagrams illustrating in front view, ray paths in a waveguide comprising reflectively coated reflective facets and draft facets that have a reduced reflectance, in accordance with the present disclosure.
Figure 40B:
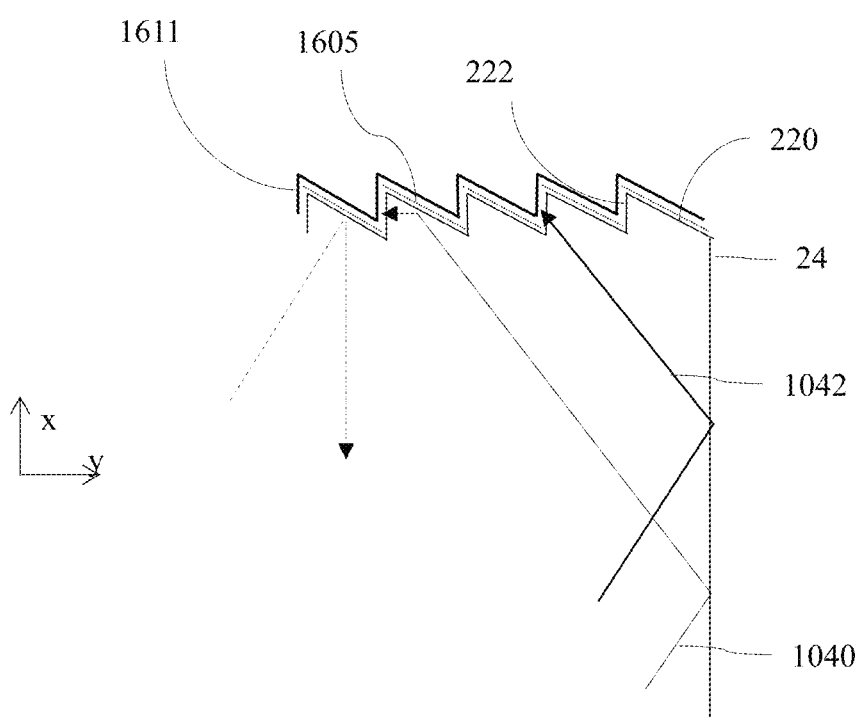

FIGS. 40A-40B are schematic diagrams illustrating in front view, arrangements of draft facets that reduce luminance from ray paths that contribute to bright triangles in a directional display by reducing the reflectivity of the drafts 222.

FIG. 40A illustrates uncoated or partially coated draft facets 222, thus the reflectivity of the drafts 222 is reduced in comparison to the arrangement of FIG. 39 and ray 1043 is incident on the facet after reflection from side 24 is transmitted through the draft facet 222 because of no coating, or reduced coating reflectivity in region 1607. Further, ray 1042 may be directly transmitted through the draft. Thus the draft facets 222 are arranged to have a lower reflectivity than the reflective facets 220.

In embodiments where double reflected rays act to illuminate undesirable regions 1004, 1006 of a display such light can be minimized by reducing the reflectivity of the draft facets 222 without affecting the primary function of the Fresnel reflector that is provided by the reflective facets 220.

Advantageously, the luminance of rays 1043 is reduced, and the bright triangles in regions 1004, 1006 may be reduced, thus improving privacy uniformity.

The reflectivity of the coating in region 1607 may be reduced using directional coating methods such as illustrated in FIG. 17. Thus the draft facets 222 are not coated with the reflective material 1605. Alternatively the draft facets 222 are coated with a lower reflectivity in comparison with the reflective facets 220 by means of a thinner reflective layer, or partial area of coating coverage of a reflective coating in region 1607.

FIG. 40B illustrates a further embodiment wherein a light absorbing layer 1611 may be provided in addition to the reflective layer 1605. Such light absorbing layer may be an ink, pigment, or other absorbing material that may be formed on the reflective end 4 after forming the reflective layer 1605. Coating may comprise layer formation methods including evaporation, sputter, printing, dip coating, spray coating and other known application methods for reflective and absorbing layers.

Advantageously the intensity of rays 1030 as shown in FIG. 39 is reduced, and thus the luminance of bright triangles in regions 1004, 1006 is reduced. Image uniformity in Privacy mode is improved, and stray light reduced.

In other words, the undesirable bright triangles 1004, 1006 are produced by light that double reflects off the draft facets 222 and then reflective facets 220 of a Fresnel reflector at the reflective end 4 with near vertical drafts 222. To reduce this and other artefacts formed form the same double reflection it is possible to reduce the specular reflectivity of the draft surfaces. In some case the reflectivity can be reduced through not coating them with reflecting metal retaining their ~5% bare surface reflectivity for all but totally internally reflected light. In other cases selective coating with absorbing material may be considered. In both cases selective coating techniques can be realized with directional deposition such as evaporative methods.

Figure 40C:
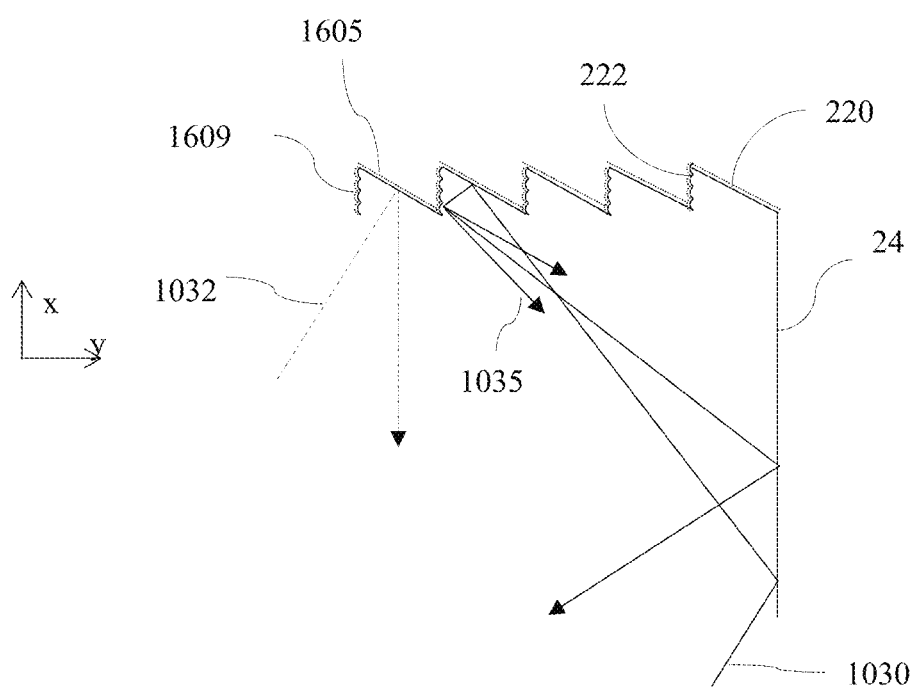
FIG. 40C is a schematic diagram illustrating in front view, ray paths in a waveguide comprising reflectively coated reflective facets and diffuse draft facets, in accordance with the present disclosure.

FIG. 40C is a schematic diagram illustrating in front view, ray paths in a waveguide comprising reflectively coated reflective facets and diffuse draft facets. Another method of reducing specular reflectivity of the draft surfaces is to introduce a diffusing surface structure which could also inhibit later coating methods. Thus draft facet 222 may be provided with a diffusing microstructure 1609. Such diffusion creates ray bundle 1035 that may further reduces the intensity of rays that are directed towards regions 1004, 1006. Advantageously uniformity and stray light for off-axis observers in privacy mode are improved.

It would be desirable to improve privacy performance with uniformly coated Fresnel reflector facets.

Figure 41:
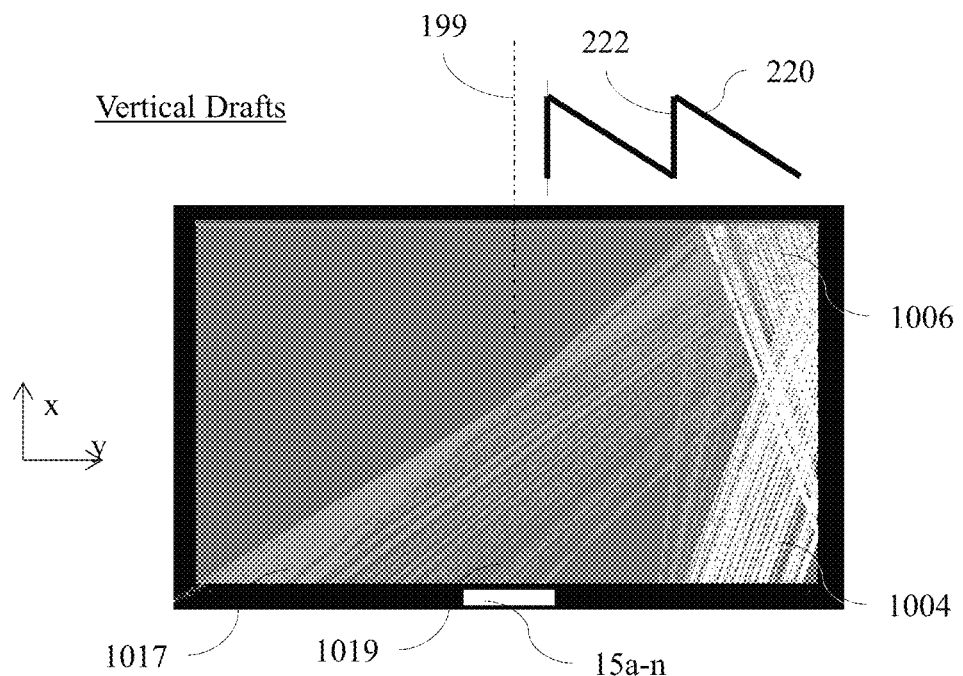
FIG. 41 is a schematic diagram illustrating in front view, an optical raytrace illustrating the formation of bright triangles in a directional display operating in Privacy mode as seen for an observer in an off-axis viewing position for rays that are incident on both draft and facet of a Fresnel mirror with a vertical draft facet, in accordance with the present disclosure.

FIG. 41 is a schematic diagram illustrating in front view, an optical raytrace illustrating the formation of bright triangles in a directional display operating in Privacy mode as seen for an observer in an off-axis viewing position for rays that are incident on both draft and facet of a Fresnel mirror with a vertical draft facet. As shown in FIGS. 34B-C for vertical draft facets 222 and combined in a single raytrace, the existence of rays 1019 that intersect with (i.e., emanate from) the central emission region from array 15a-n provides undesirable light that will be visible in the triangular regions 1004,1006.

Figure 42:
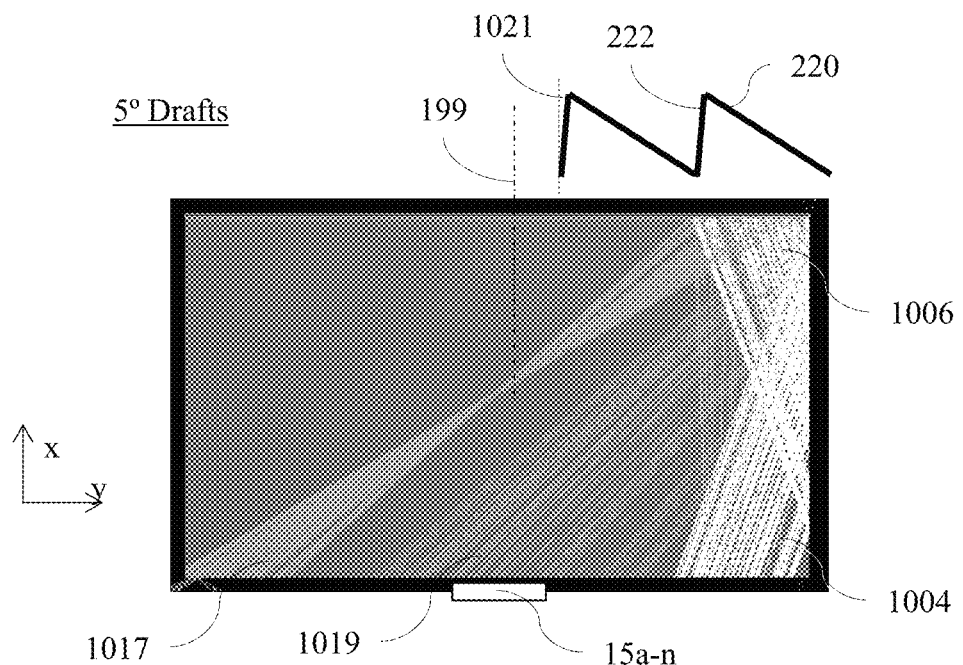
FIG. 42 is a schematic diagram illustrating in front view, an optical raytrace illustrating the formation of bright triangles in a directional display operating in Privacy mode as seen for an observer in an off-axis viewing position for rays that are incident on both draft and facet of a Fresnel mirror with an inclined draft facet, in accordance with the present disclosure.

FIG. 42 is a schematic diagram illustrating in front view, an optical raytrace illustrating the formation of bright triangles in a directional display operating in Privacy mode as seen for an observer in an off-axis viewing position for rays that are incident on both draft and facet of a Fresnel mirror with an inclined draft facet. Thus along the direction (x-axis) into the waveguide 1 away from the reflective end 4 (i.e., downwards in FIG. 42), the draft facets 222 from are inclined at an angle 1021 inwardly towards the optical axis 199 of the Fresnel reflector. Thus, the draft facets 22 shown in FIG. 42 as being on the right-hand side are inclined in the downwards direction inwardly towards the axis 199 from right to left. The draft facets 222 on the left-hand side (not shown in FIG. 42) are a mirror image and so are inclined in the downwards direction inwardly towards the axis 199 from left to right. The raytrace of FIG. 42 illustrates an angle 1021 of 5°. With such a vertical draft angle 1021, the density of rays hitting the central 15a-n region increases slightly, implying undesirably a slight increase in off-axis visibility of bright triangles in the privacy mode.

Figure 43:
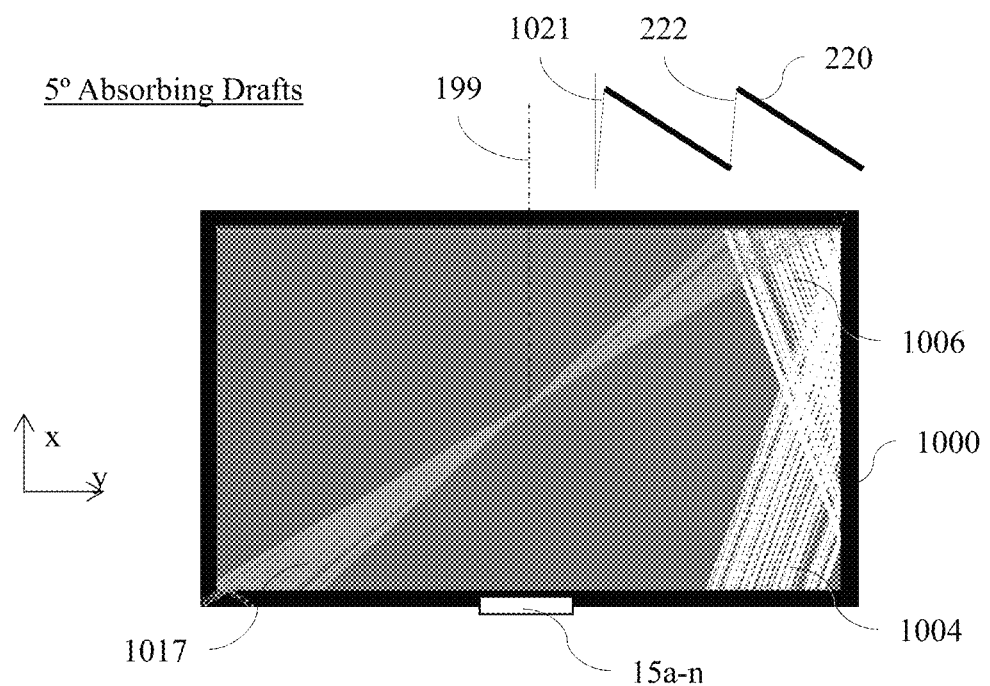
FIG. 43 is a schematic diagram illustrating in front view, an optical raytrace illustrating the formation of bright triangles in a directional display operating in Privacy mode as seen for an observer in an off-axis viewing position for rays that are incident on both draft and facet of a Fresnel mirror with an absorbing draft facet, in accordance with the present disclosure.

FIG. 43 is a schematic diagram illustrating in front view, an optical raytrace illustrating the formation of bright triangles in a directional display operating in Privacy mode as seen for an observer in an off-axis viewing position for rays that are incident on both draft and facet of a Fresnel mirror with an absorbing draft facet that is inclined at an angle 1021 of 5° to the optical axis 199. Interrupting the double reflection path of rays from reflective facet 220 then draft facet 222 by reducing the reflectivity of the drafts 1021 to zero thus removes those rays emanating from the central region 15a-n such that rays 1017 do not intersect with light sources 15a-n. Advantageously there would be no bright triangles in regions 1004, 1006 visible from ray path 1017.

It would be desirable to reduce luminance of regions 1004, 1006 for a uniformly coated Fresnel reflector.

Figure 44:
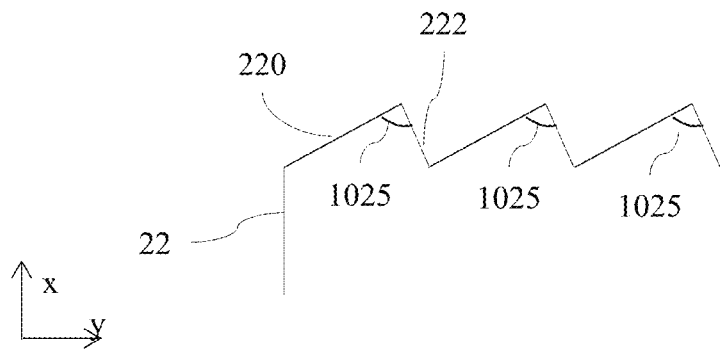
FIG. 44 is a schematic diagram illustrating in top view, a Fresnel reflector comprising a constant internal angle, in accordance with the present disclosure.

FIG. 44 is a schematic diagram illustrating in top view, a Fresnel reflector comprising a constant internal angle 1025 between the reflective facets 220 and draft facets 222. Thus the internal angles 1025 between adjacent draft facets 222 and reflective facets 220 are the same. Further, each reflective facet 220 may be laterally straight, i.e., straight in the lateral direction, which is horizontal in FIG. 44. Although each reflective facet 220 is straight, the reflective facets 220 have different inclinations in the lateral direction, which provides the overall curvature and optical power of the Fresnel reflector.

In the case where the facets and drafts are either structured or curved the internal angle would be defined as that between the average surface angles of two surfaces. Fixed internal angles less than 90 degrees may introduce undesirable 'overhanging' draft facets 222 for the very shallow angled facets close to the optical axis 199 of the Fresnel reflector preventing conventional mold release during manufacturing. The draft facet angle may preferably not be substantially greater than the angles of rays directly illuminating the Fresnel reflector from the region 15a-n as this can compromise performance. Such constraint may be achieved by an internal angle 1025 that is less than approximately 100 degrees.

Thus the angle 1025 between the draft facet 222 and reflective facet may be from 90 to 100 degrees and preferably from 90 to 95 degrees.

Advantageously, having the same draft/facet angle provides position independent control of those rays that reflect off both draft and facets. For example, when the draft/facet angle is close to a 90 degree right angle, double reflected rays (from reflective facet 220 and draft facet 222) retro-reflect within the waveguide 1 preserving any incident ray's propagation angle.

High angled light from central LED sources of array 15a-n incident on a retro-reflecting Fresnel reflector via the waveguide 1 sides 22, 24 would return at angles that cannot exit the waveguide 1 providing for an improved privacy display function. A further advantage of the near retro-reflection property is that it enables light from LEDs from array 15a-n to efficiently fill triangular void regions of the same physical side of the guide in wide angle mode as described in U.S. patent application Ser. No. 15/097,750 and U.S. Patent Publication No. 2013/0307831, herein incorporated herein by reference in its entirety. Advantageously privacy uniformity and stray light levels are improved by reducing luminance of regions 1004, 1006 without the need for complex coating methodologies.

Also a fixed facet/draft angle >90 degrees ensures non-vertical draft angles improving mold release when injection molding manufacturing techniques are used as described in FIG. 17.

Figure 45:
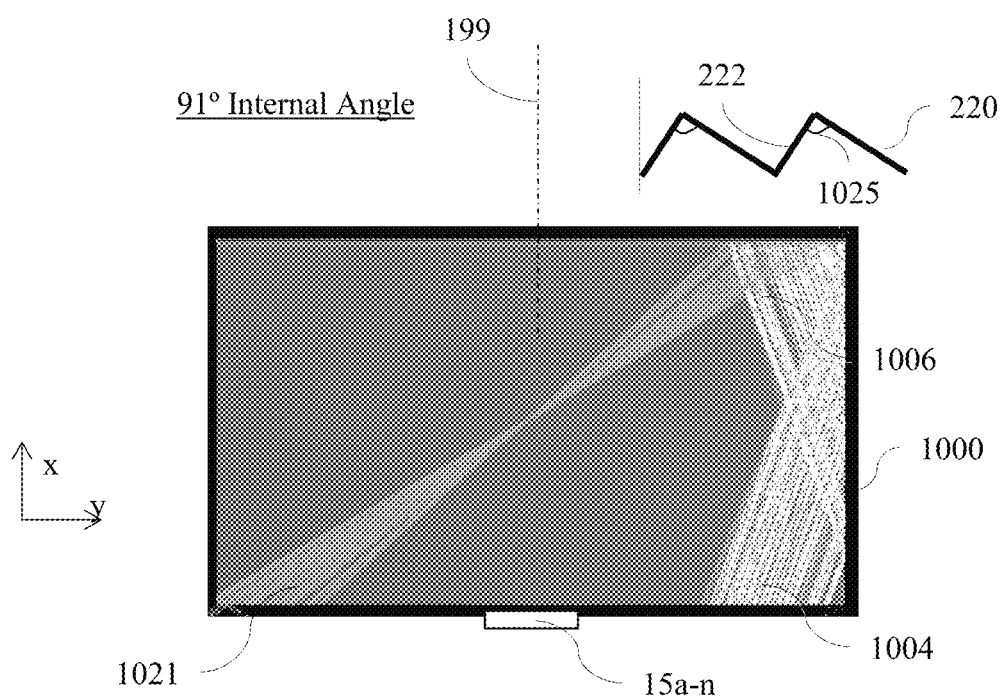
FIG. 45 is a schematic diagram illustrating in front view, an optical raytrace illustrating the formation of bright triangles in a directional display operating in Privacy mode as seen for an observer in an off-axis viewing position for rays that are incident on both draft and facet of a Fresnel mirror with a constant internal angle, in accordance with the present disclosure.

FIG. 45 is a schematic diagram illustrating in front view, an optical raytrace illustrating the formation of bright triangles in a directional display operating in Privacy mode as seen for an observer in an off-axis viewing position for rays that are incident on both draft facet 222 and reflective facet 220 of a Fresnel reflector with a constant internal angle 1021 of 91 degrees. Rays 1021 are not incident on light source array 15a-n and thus no light is directed from the array to bright triangles in regions 1004, 1006. Advantageously Privacy uniformity is improved.

It would be desirable to minimize streaking in wide angle mode that may be observed at the boundary of regions 1004, 1006 and region 1002 (as illustrated for example in FIG. 34A) for off-axis viewing.

Figure 46:
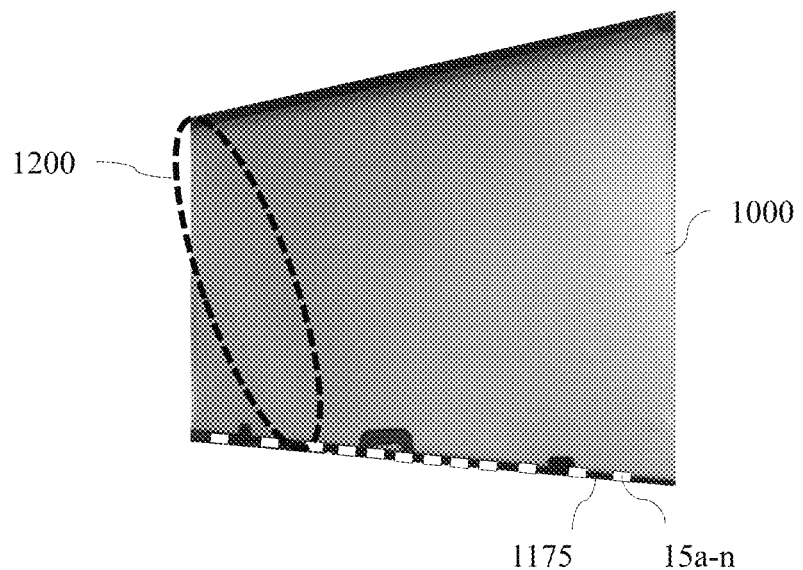
FIG. 46 and FIG. 47 are photographs illustrating streak artefacts for off axis viewing of a directional display with planar Fresnel mirror facets, in accordance with the present disclosure.
Figure 47:
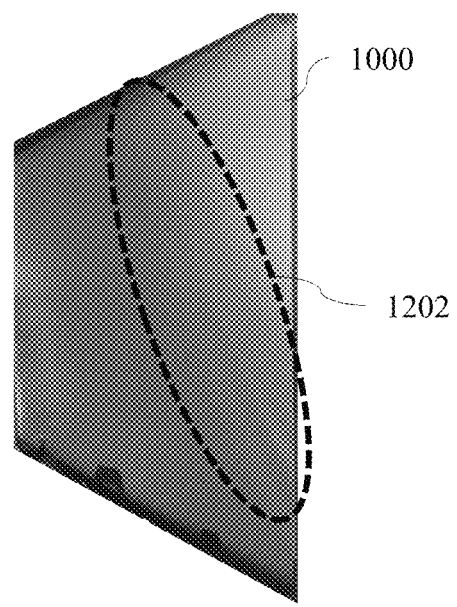

FIGS. 46-47 are photographs illustrating streak artefacts for off axis viewing of a directional display optical stack as will be described in FIG. 58 comprising planar Fresnel mirror reflective facets 220. The photographs are taken at high off-axis angle from the right hand side in wide angle mode where all LEDs of a light source array 15a-n are illuminating the waveguide 1. For illustrative purposes, light source array 15a-n with gaps 1175 is marked on the photograph.

The highlighted artefacts 1200, 1202 in both photos arise from the discrete spatial distribution of the LED sources in the array 15a-n, with gaps 1175 between LEDs. The artefacts 1200, 1202 may arise from insufficient diffusion of the light in the area diffuser in optical stack 2208 of FIG. 58. Introducing more diffusion in the form of further diffusing sheets after the output of the waveguide has a small effect as the artefacts 1200, 1202 stem from aberrated, angular tolerant one dimensional images of the sources of the array 15a-n. Further area diffusers may increase stray light and thus degrade the privacy levels seen by off-axis observers.

It would be desirable to provide further diffusion of the discrete light sources of the array 15a-n to remove streak artefacts 1200, 1202.

Figure 48:
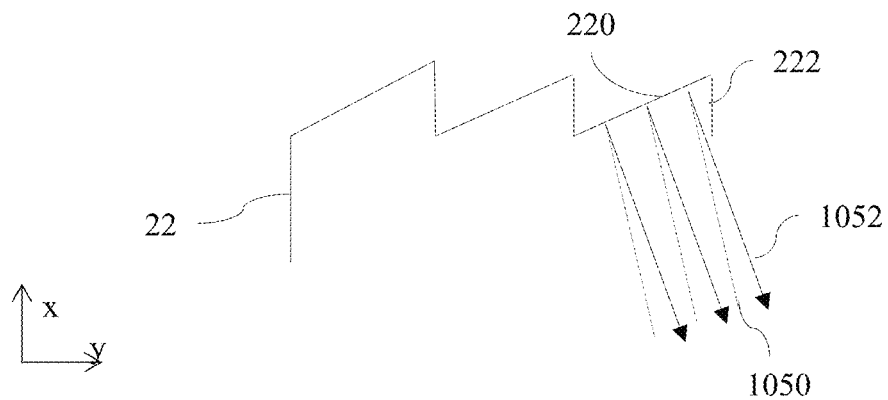
FIG. 48 is a schematic diagram illustrating in top view, a Fresnel reflector comprising vertical drafts and planar reflecting facets, in accordance with the present disclosure.

FIG. 48 is a schematic diagram illustrating in top view, a Fresnel reflector comprising vertical drafts and planar reflecting facets. Parallel incident light rays 1050 are reflected as rays 1052 that remain parallel across the width of the reflective facets 220.

Figure 49:
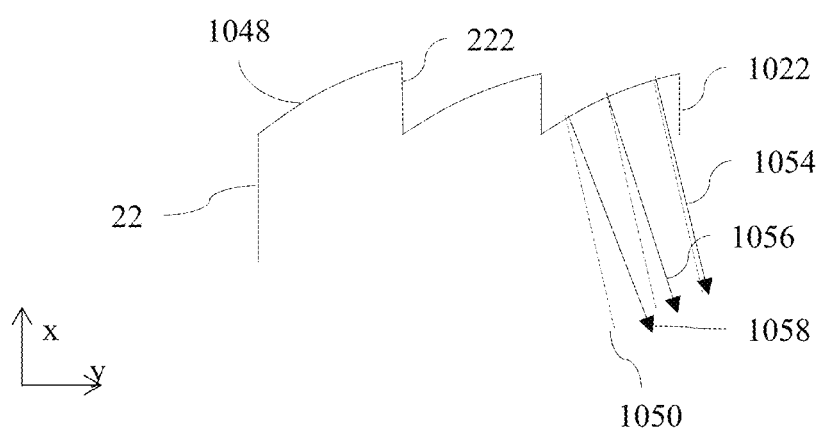
FIG. 49 is a schematic diagram illustrating in top view, a Fresnel reflector comprising vertical drafts and curved reflecting facets, in accordance with the present disclosure.

FIG. 49 is a schematic diagram illustrating in top view, a Fresnel reflector comprising vertical drafts and curved reflecting facets 1048. Thus each reflective facet 1048 is laterally curved, i.e., curved in the lateral direction, which is horizontal in FIG. 4. The lateral curvature means that for parallel input rays 1050, reflected rays 1054, 1056, 1058 are no longer parallel and the lateral curvature introduces diffusion. Such diffusion provides diffusion of the discrete light sources of the array 15a-n and advantageously may reduce or remove visibility of artefacts 1200, 1202. Although each reflective facet 220 is laterally curved, that lateral curvature does not provide the overall optical power. However, the curved reflective facets 220 have different inclinations in the lateral direction, which does provides the overall curvature and optical power of the Fresnel reflector. The radius of curvature of the individual reflective facets is different from the nominal radius of curvature of the overall Fresnel reflector caused by the differing inclinations in the lateral direction.

Figure 50:
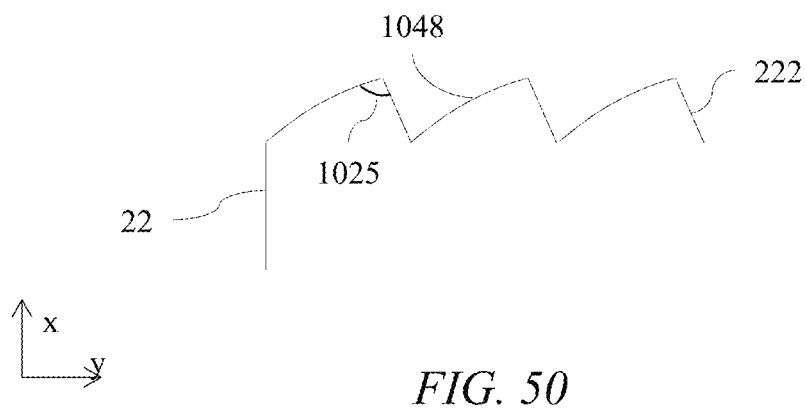
FIG. 50 is a schematic diagram illustrating in top view, a Fresnel reflector comprising planar drafts, curved reflecting facets and a constant internal angle, in accordance with the present disclosure.

FIG. 50 is a schematic diagram illustrating in top view, a Fresnel reflector comprising planar drafts, curved reflecting facets and a constant internal angle. Advantageously, streak artefacts 1200, 1202 and bright triangle regions 1004, 1006 may be reduced or removed. Further manufacturing yield may be improved due to improved mold release.

Figure 51:
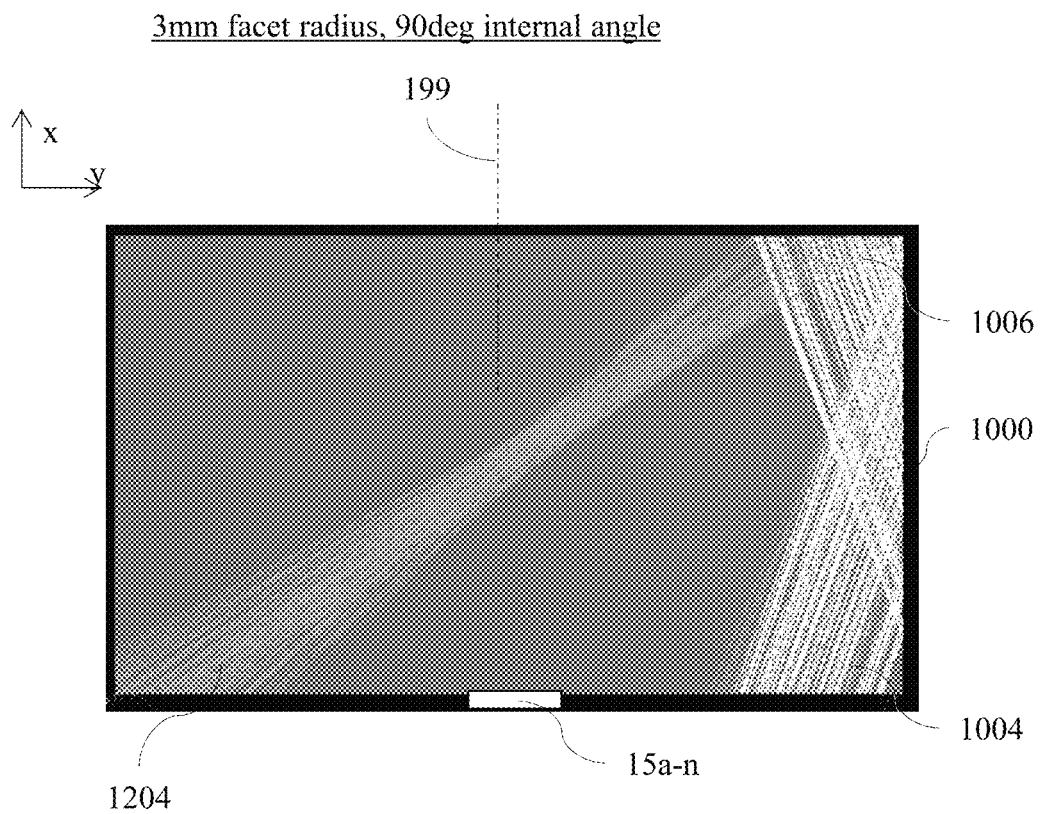
FIG. 51 is a schematic diagram illustrating in front view, an optical raytrace illustrating the formation of bright triangles in a directional display operating in Privacy mode as seen for an observer in an off-axis viewing position for rays that are incident on both draft and facet of a Fresnel mirror with a constant internal angle and curved reflective facets, in accordance with the present disclosure.

FIG. 51 is a schematic diagram illustrating in front view, an optical raytrace illustrating the formation of bright triangles in a directional display operating in Privacy mode as seen for an observer in an off-axis viewing position for rays that are incident on both draft facet 222 and reflective facet 1048 of a Fresnel reflector that is uniformly coated, with a constant internal angle 1025 and curved reflective facets 1048 and planar draft facets 222.

The curvature of the facets advantageously achieves sufficient spreading of rays to fill the angular gap between discrete LED sources of array 15a-n, thus reducing visibility of artefacts 1200, 1202 that are particularly visible in wide angle mode while not introducing unwanted bright triangle artefacts in regions 1004, 1006 that are particularly visible in privacy mode. This is confirmed by the lack of centrally emanating rays in this figure, with rays 1204 being located some distance away from array 15a-n.

In the illustrative embodiment of FIG. 51, the radius of curvature of the reflective facets 220 is 3 mm with a facet pitch of 0.2 mm and a waveguide height of 180 mm. The radius of the reflective facet 220 is not arranged to provide imaging of the light sources of the array of light sources. The absolute radius of curvature of a reflective facet 220 is substantially smaller than the radius of curvature of the respective reflective facet 220, if the facet 220 were to have a radius that is the same as the effective radius of the Fresnel mirror in the lateral direction. In other words, the radius of the reflective facet is arranged to achieve diffusion of the discrete light sources 15a-n; and the variation of nominal angle of the reflective facets in the lateral direction across the Fresnel mirror is arranged to achieve imaging of the light sources of the array 15.

Figure 52:
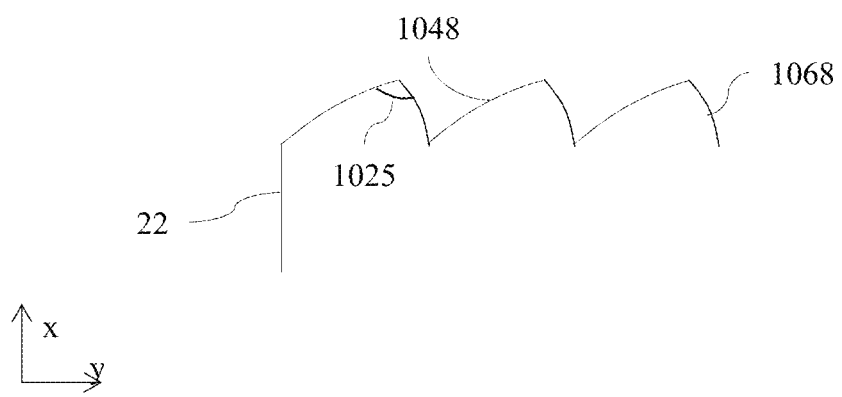
FIG. 52 is a schematic diagram illustrating in top view, a Fresnel reflector comprising curved drafts, curved reflecting facets and a constant internal angle, in accordance with the present disclosure.

FIG. 52 is a schematic diagram illustrating in top view, a Fresnel reflector comprising curved draft facets 1068, curved reflecting facets 1047 and a constant internal angle. Such curvature of reflective facets 1048 and draft facets 1048 may be provided by a cutting diamond with two curved polished surfaces.

Advantageously, further diffusion can be provided of discrete sources 15a-n in wide angle mode.

Figure 53:
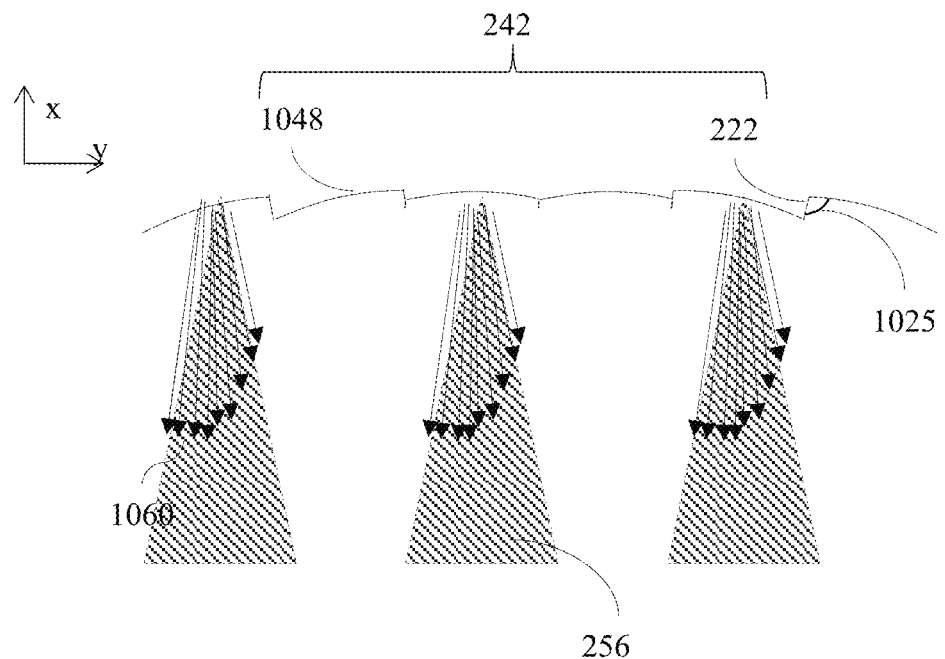
FIG. 53 is a schematic diagram illustrating in top view, the central region of a Fresnel reflector comprising curved reflecting facets and a constant internal angle, in accordance with the present disclosure.

FIG. 53 is a schematic diagram illustrating in top view, the central region 242 of a Fresnel reflector comprising curved reflecting facets 1048 and a constant internal angle 1025. The arrangement of FIGS. 30A-30B may be difficult to achieve during preparation of molding tool due to alignment of cutting equipment in the center region as the cut direction flips horizontally. Curved reflecting facets 1024 may provide increased diffusion with cone angle 256 due to ray fans 1060 from each reflecting facets, and diffuse central diffraction artefacts. Advantageously tool cutting tolerance may therefore be relaxed and cutting cost reduced.

Figure 54:
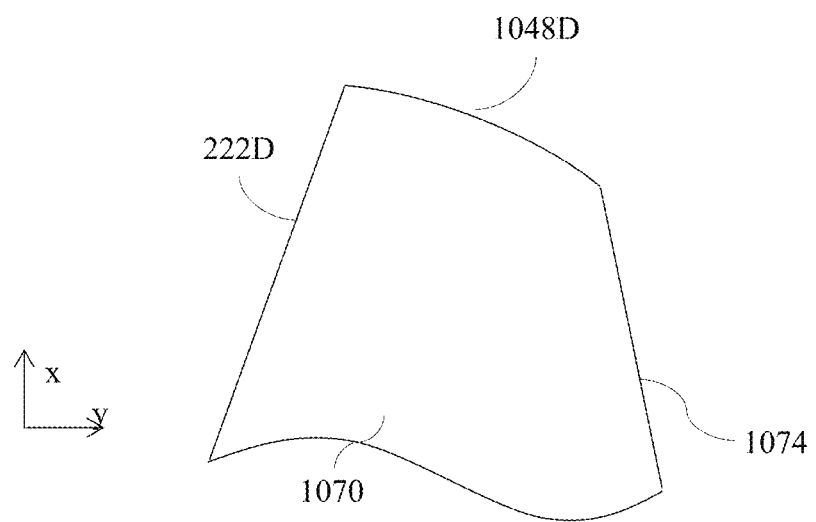
FIG. 54 is a schematic diagram illustrating in top view, a diamond for cutting curved facets and planar draft of a Fresnel mirror tool, in accordance with the present disclosure.

FIG. 54 is a schematic diagram illustrating in top view, a diamond for cutting curved facets and planar draft of a Fresnel mirror tool. Diamond 1070 may be provided with curved cutting surface 1048D and 222D for forming reflecting facet 1048 and draft facet 222 respectively. Surface 1074 may be provided to achieve convenient diamond insertion into the molding tool blank during cutting.

It may be desirable to form reflecting facets 220 that provide diffusion using a molding tool that is fabricated using diamonds that have either (i) planar surfaces or (ii) single curved radii surfaces.

Figure 55:
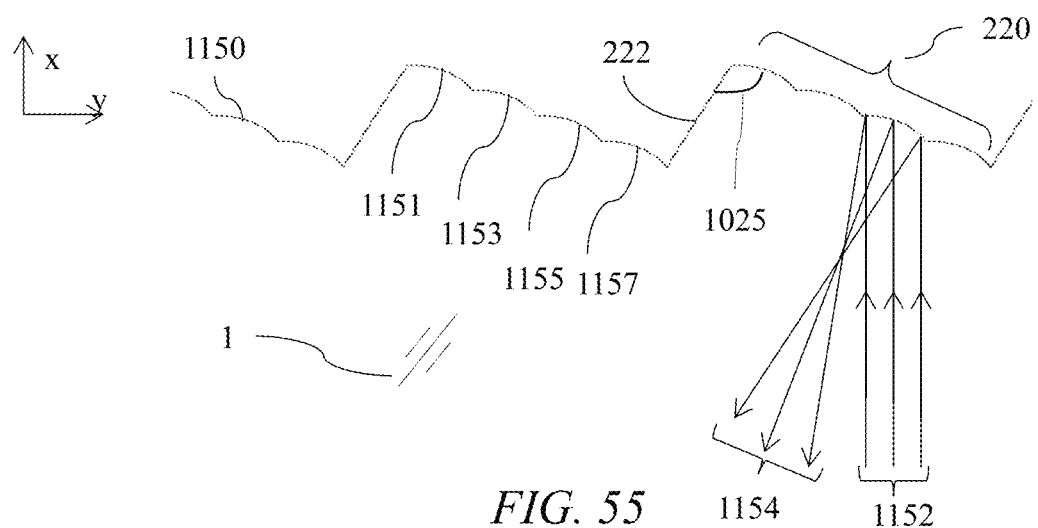
FIG. 55 is a schematic diagram illustrating in top view of a Fresnel reflector comprising concave microstructured facets, in accordance with the present disclosure.

FIG. 55 is a schematic diagram illustrating in top view reflective facets 220 and drafts 222 of a Fresnel reflector in which each reflective facet has a microstructure 1150 arranged to provide lateral angular diffusion of the light reflected therefrom. The microstructure may comprise a plurality of curved sub-facets 1151, 1153, 1155, 1157 that are illustrated in FIG. 55 as being concave cylindrical facets with the same pitch. In operation, incident parallel light rays 1152 are diffused after reflection into cone 1154, thus providing a diffusing function at the Fresnel reflector. Introducing microstructure 1150 elements to the facet 220 surface causes diffusion that acts to fill in gaps in the ray bundles that emanate from the discrete LED sources of array 15a-n with gaps 1175 as shown in FIG. 46. Diffusing light at the Fresnel reflector provides ray distribution filling prior to the light collimation reducing the optical aberrations that can limit the filling effect of diffusing sheets at high angles. Advantageously, streaks may be reduced for high angle viewing in wide angle mode. Further, a constant internal angle 1025 may be provided to reduce the visibility of bright triangles in regions 1004, 1006 as described elsewhere herein. Alternatively, the draft facet may be maintained at a constant angle, with the diffusion from the reflecting facet 220 providing adequate diffusion to reduce bright triangle visibility.

Advantageously, in comparison to the arrangement of FIG. 50 for example, microstructure 1150 elements are more easily defined and created with the tools used for mass production.

Figure 56:
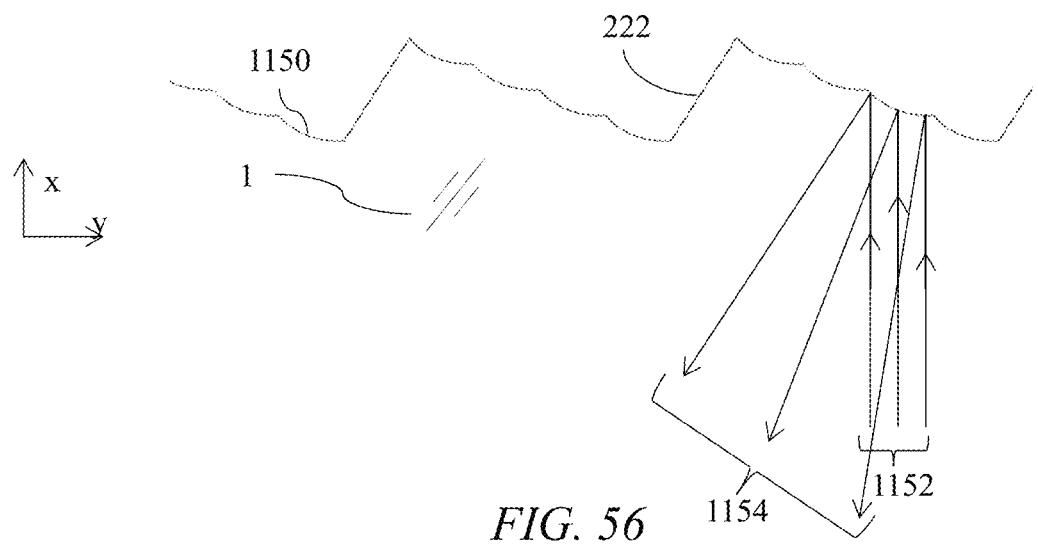
FIG. 56 is a schematic diagram illustrating in top view of a Fresnel reflector comprising convex microstructured facets, in accordance with the present disclosure.

FIG. 56 is a schematic diagram illustrating in top view facets 1150 and drafts 1022 of a Fresnel reflector in which each reflective facet 1022 has an alternative convex microstructure arranged to provide lateral angular diffusion of the light reflected therefrom.

Figure 57:
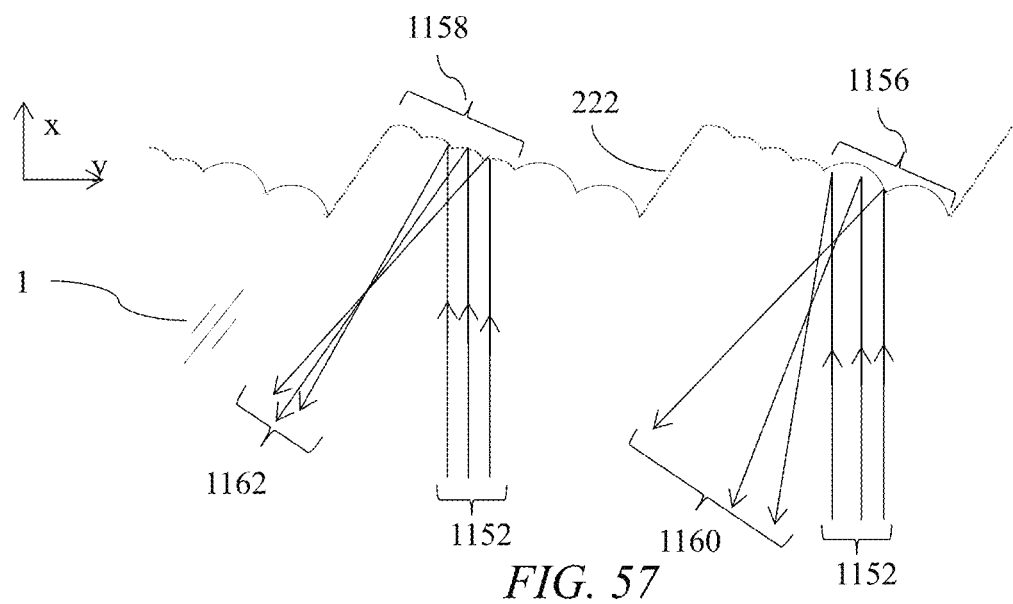
FIG. 57 is a schematic diagram illustrating in top view of a Fresnel reflector comprising microstructured facets with multiple diffusion characteristics across a facet, in accordance with the present disclosure.

FIG. 57 is a schematic diagram illustrating in top view facets 1150 and drafts 1022 of a Fresnel reflector in which each reflective facet 1022 has an alternative spatially mixed microstructure arranged to provide lateral angular diffusion of the light reflected therefrom. Thus region 1156 of reflecting facet 220 may have a first microstructure arranged to provide a first diffusion cone 1160 and a second region 1158 may have a second microstructure arranged to provide a second diffusion cone 1162. The size of the diffusion cones 1160, 1162 may be controlled by means of adjusting the pitch of a constant radius cutting diamond during tool manufacture. Alternatively two different diamond radii may be used.

Advantageously, the amount of diffusion from the Fresnel reflector can be tuned to optimize efficiency and uniformity.

Figure 58:
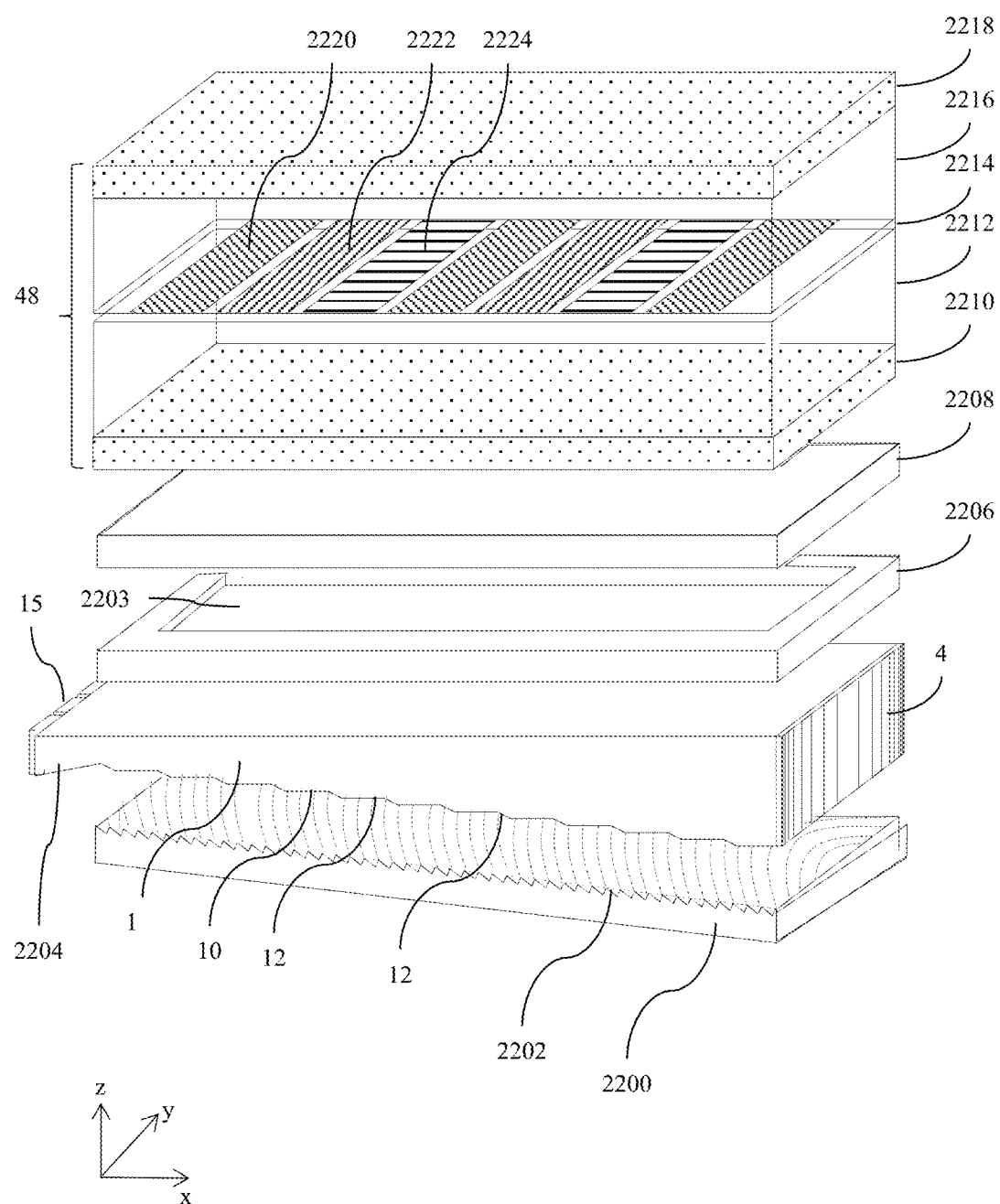
FIG. 58 is a schematic diagram illustrating in perspective view, the structure of a directional display device comprising an directional backlight arranged with a spatial light modulator, in accordance with the present disclosure.

FIG. 58 is a schematic diagram illustrating in perspective view, the structure of a directional display device comprising a waveguide 1 arranged with a spatial light modulator 48. Reflective end 4 may be provided by a Fresnel mirror. Taper region 2204 may be arranged at the input to the waveguide 1 to increase input coupling efficiency from the light sources 15a-15n of the array of illuminator elements 15 and to increase illumination uniformity. Shading layer 2206 with aperture 2203 may be arranged to hide light scattering regions at the edge of the waveguide 1. Rear reflector 2200 may comprise facets 2202 that are curved and arranged to provide viewing windows 26 from groups of optical windows provided by imaging light sources of the array 15 to the window plane 106. Optical stack 2208 may comprise reflective polarizers, retarder layers and diffusers. Rear reflectors 2200 and optical stack 2208 are described further in U.S. patent application Ser. No. 14/186,862, filed Feb. 21, 2014, entitled "Directional backlight" (U.S. Patent Publication No. 2014/0240828) incorporated herein by reference in its entirety.

Spatial light modulator 48 may comprise a liquid crystal display that may comprise an input polarizer 2210, TFT glass substrate 2212, liquid crystal layer 2214, color filter glass substrate 2216 and output polarizer 2218. Red pixels 2220, green pixels 2222 and blue pixels 2224 may be arranged in an array at the liquid crystal layer 2214. White, yellow, additional green or other color pixels (not shown) may be further arranged in the liquid crystal layer to increase transmission efficiency, color gamut or perceived image resolution.

In the embodiment of FIG. 58, injection of input light into the waveguide is along the long edge. The physical size of the LED packages of the array 15 and scatter from waveguide and other surfaces near the input end 2 limit the minimum bezel width that can be achieved. It would be desirable to reduce the width of the side bezel along the long edges of the waveguide.

FIGS. 59A-D are schematic diagrams illustrating in perspective, front, side and perspective views respectively, an optical valve comprising a light source 1317a arranged to achieve an on-axis optical window.

Figure 59A:
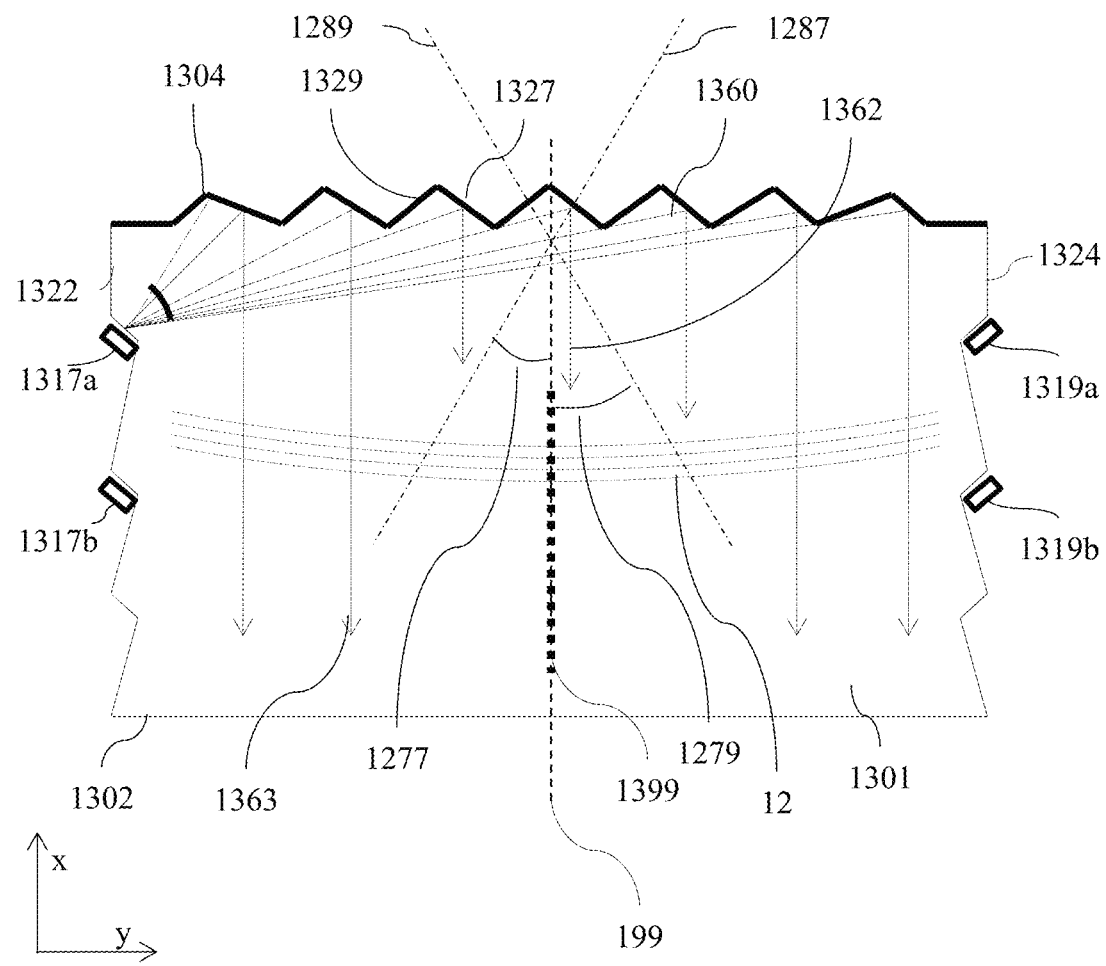
FIG. 59A is a schematic diagram illustrating in front view, an optical valve comprising a side light source arranged to achieve an on-axis optical window, in accordance with the present disclosure.
Figure 59B:
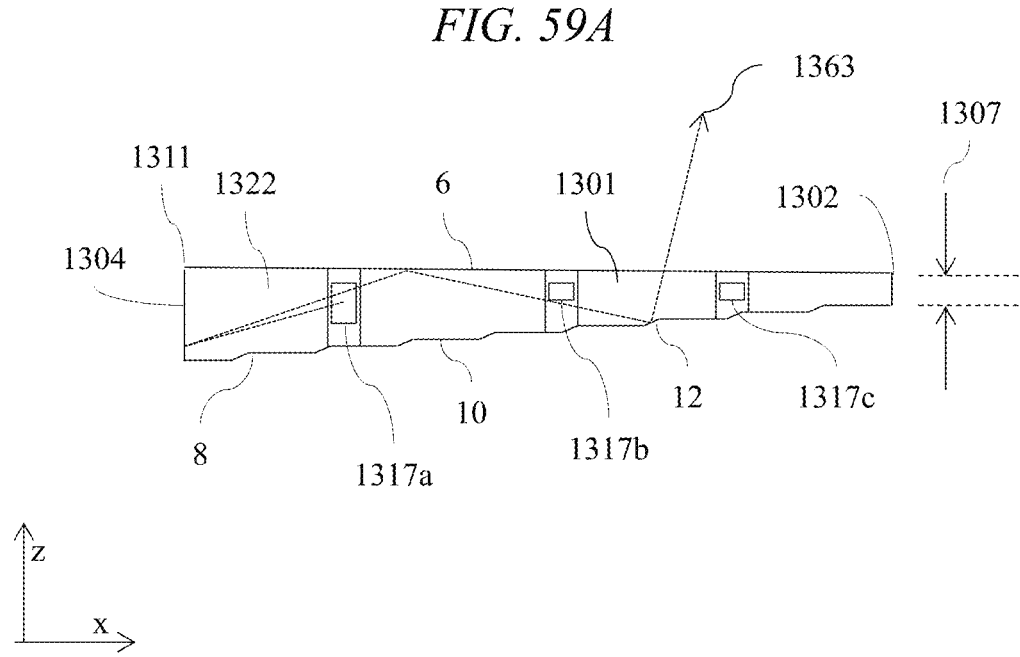
FIG. 59B is a schematic diagram illustrating in side view, an optical valve comprising a side light source arranged to achieve an on-axis optical window, in accordance with the present disclosure.
Figure 59C:
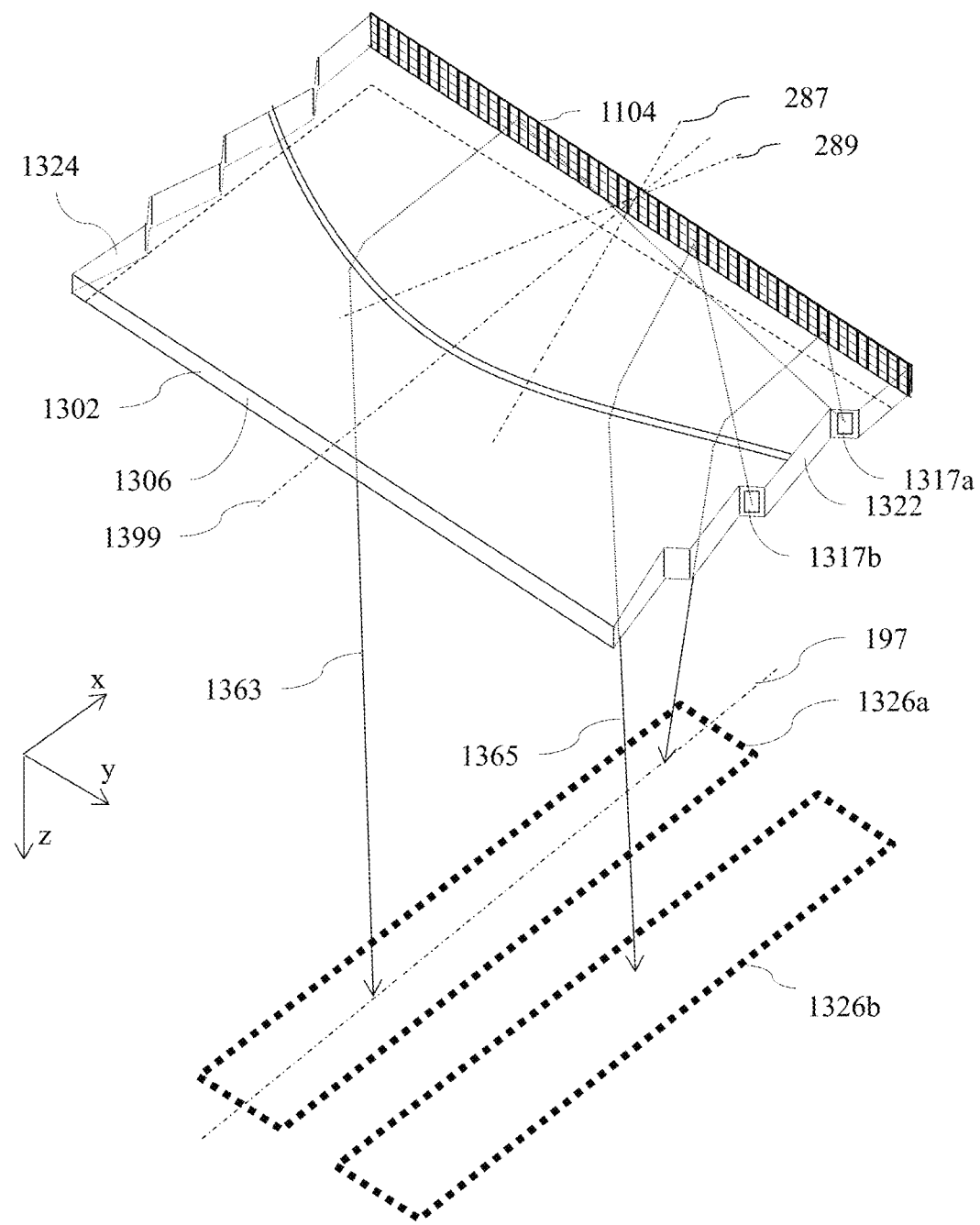
FIG. 59C is a schematic diagram illustrating in perspective view, the formation of first and second optical windows by edge and side light sources with a valve with arrangement similar to that shown in FIGS. 59A-B, in accordance with the present disclosure.
Figure 59D:
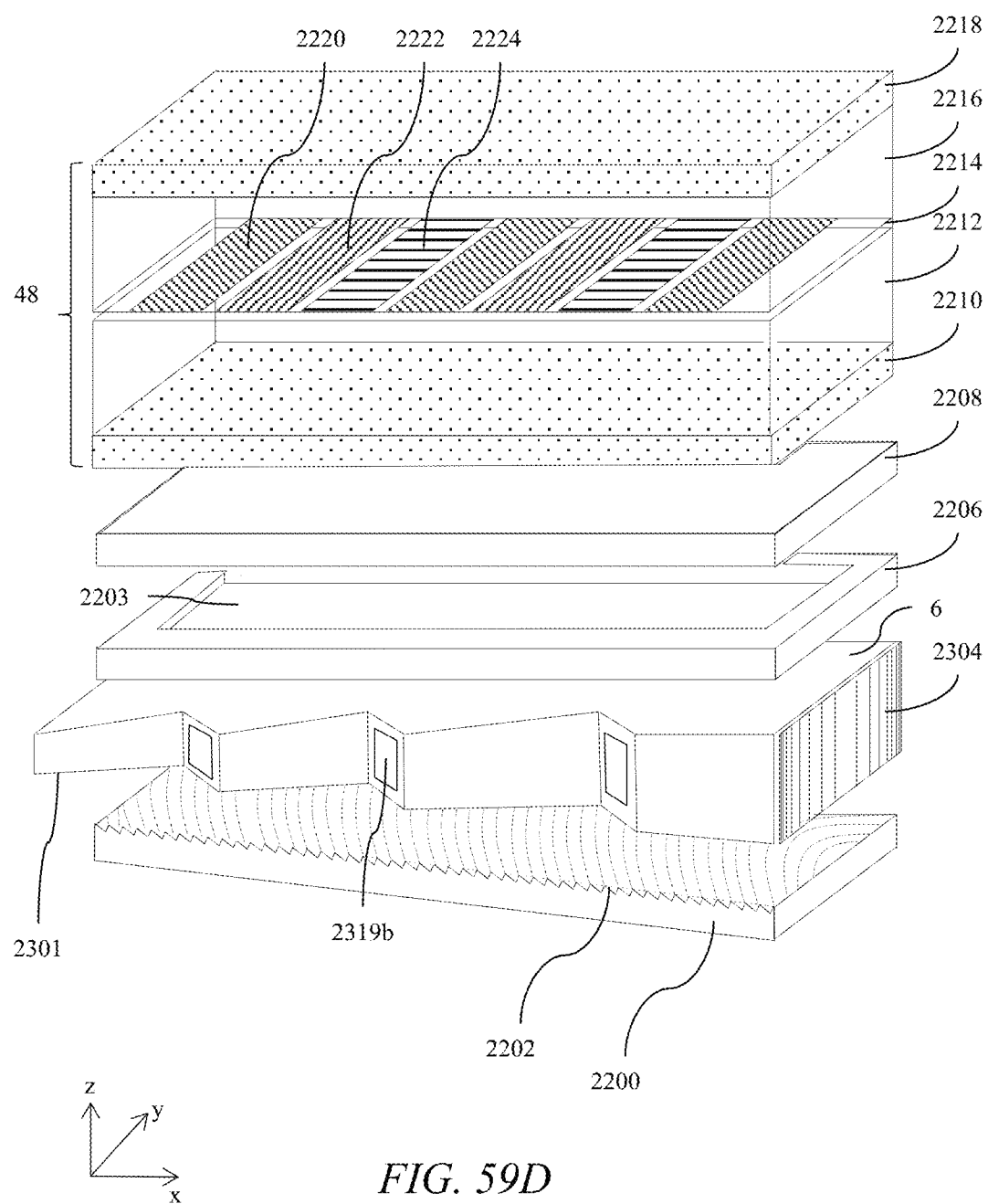
FIG. 59D is a schematic diagram illustrating in perspective view, the structure of a directional display device comprising a directional backlight comprising a side light source arranged with a spatial light modulator, in accordance with the present disclosure.

FIG. 59A illustrates in top view the propagation of light rays from light source arrays 1319a-n and 1317a-n arranged on the short side of a directional waveguide. FIG. 59B similarly illustrates in side view the propagation of rays from light source array 1317a-n. FIG. 59C illustrates in perspective view the formation of optical windows by light source array 1317a-n. FIG. 59D illustrates in perspective view a display apparatus comprising an optical stack comprising a waveguide as illustrated in FIGS. 59A-C.

As described in U.S. Provisional Patent Application No. 62/167,203, to which this application claims priority, a directional display device may comprise a waveguide 1301 that further comprises a reflective end 1304 that is elongated in a lateral direction (y-axis), the first and second guide surfaces 6, 8 extending from laterally extending edges of the reflective end 1304, the waveguide 1301 further comprising side surfaces 1322, 1324 extending between the first and second guide surfaces 6, 8, and wherein the light sources include an array 1317 of light sources 1317a-n arranged along a side surface 1322 to provide said input light through that side surface 1322, and the reflective end 1304, comprises first and second facets 1327, 1329 alternating with each other in the lateral direction, the first facets 1327 being reflective and forming reflective facets of a Fresnel reflector having positive optical power in the lateral direction, the second facets 1329 forming draft facets of the Fresnel reflector, the Fresnel reflector 1304 having an optical axis 1287 that is inclined towards the side surface 1322 in a direction in which the Fresnel reflector 1304 deflects input light from the array of light sources 1317 into the waveguide 1301. Thus angle 1277 is non-zero. Similarly the second facets 1329 may be reflective and form reflective facets of a Fresnel reflector having positive optical power in the lateral direction, the Fresnel reflector 1304 having an optical axis 1289 that is inclined towards the side surface 1324 in a direction in which the Fresnel reflector 1304 deflects input light from the array of light sources 1319 into the waveguide 1301.

Illustrative light ray 1363 from source 1317a may be arranged to provide optical window 1326a and light ray 1365 from source 1317b may be arranged to provide optical window 1326b. Other layers such as diffusers, prismatic reflection films, retarders and spatial light modulators may be arranged in series with the waveguide 1301 in a similar manner to that described for waveguide 1 in the arrangement of FIG. 58 for example.

Advantageously a thin backlight with low bezel size may be achieved. Such an arrangement has light sources that are not arranged on the long sides of the waveguide 1301 and thus may have small form factor. Further light sources 1317 and 1319 may be arranged with overlapping optical windows, and thus display luminance may be increased.

It would be further desirable to achieve uniform illumination of a waveguide with a narrow bezel along the edges of the waveguide in wide angle mode of operation. The embodiments described elsewhere herein may be applied to either the long side light source array input of FIG. 59A or the short side light source array input of FIGS. 59B-E.

Advantageously uniform display appearance may be achieved in directional displays with a narrow long side bezel. Such displays may be used in mobile displays such as cell phones or tablets as well as laptops, TV and monitors.

The embodiments related to stepped waveguide directional backlights may be applied with changes as necessary to the wedge directional backlight as described herein.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

Also incorporated by reference herein in their entireties are U.S. Patent Publication Nos. 2013/0335821 and 2014/0009508.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A directional waveguide comprising:
an input end;
first and second opposed, laterally extending guide surfaces for guiding light along the waveguide; and
a reflective end facing the input end for reflecting the input light back along the waveguide, the second guide surface being arranged to deflect the reflected input light through the first guide surface as output light, and the waveguide being arranged to direct the output light into optical windows in output directions that are distributed in a lateral direction in dependence on the input position of the input light,
wherein the reflective end is a Fresnel reflector comprising alternating reflective facets and draft facets, the reflective facets providing the Fresnel reflector with positive optical power laterally, and, in at least a center region of the Fresnel reflector, the depth of the draft facets parallel to the optical axis of the reflective end is greater than the depth of the reflective facets such that diffraction effects from the reflective facets in the center region of the Fresnel reflector are the same as diffraction effects from the reflective facets in edge regions of the Fresnel reflector outside the center region of the Fresnel reflector.

2. A directional waveguide according to claim 1, wherein the pitch of the reflective facets laterally across the reflective end is constant.

3. A directional waveguide according to claim 1, wherein the width of the reflective facets laterally across the reflective end is at most 0.5 mm.

4. A directional waveguide according to claim 1, wherein the height of the reflective end between the first and second guide surfaces has a profile that is flat.

5. A directional waveguide according to claim 1, wherein the first guide surface is arranged to guide light by total internal reflection and the second guide surface comprises a plurality of light extraction features oriented to direct light guided along the waveguide in directions allowing exit through the first guide surface as the output light and intermediate regions between the light extraction features that are arranged to guide light along the waveguide.

6. A directional waveguide according to claim 5, wherein the second guide surface has a stepped shape in which said light extraction features are facets between the intermediate regions.

7. A directional waveguide according to claim 5, wherein the light extraction features have positive optical power in the lateral direction.

8. A directional backlight comprising:
a directional waveguide according to claim 1; and
an array of input light sources arranged at different input positions in a lateral direction across the input end of the waveguide and arranged to input input light into the waveguide.

9. A directional display device comprising:
a directional backlight according to claim 8; and
a transmissive spatial light modulator arranged to receive the output light from the waveguide and to modulate it to display an image.

10. A directional display apparatus comprising:
a directional display device according to claim 9; and
a control system arranged to control the light sources.

11. The directional backlight of claim 8, wherein the input light sources are arranged such that the optical windows overlap.

12. A directional waveguide according to claim 1, wherein each reflective facet is laterally straight.

13. A directional waveguide according to claim 1, wherein each reflective facet is laterally curved.

14. A directional waveguide according to claim 1, wherein each reflective facet has a microstructure arranged to provide lateral angular diffusion of the light reflected therefrom.

15. A directional waveguide according to claim 1, wherein the depth of each of the draft facets is at least 0.5 μm.

* * * * *